US007913278B2

(12) United States Patent
Ellis et al.

(10) Patent No.: US 7,913,278 B2
(45) Date of Patent: Mar. 22, 2011

(54) INTERACTIVE TELEVISION PROGRAM GUIDE WITH REMOTE ACCESS

(75) Inventors: Michael D. Ellis, Boulder, CO (US); William L. Thomas, Bixby, OK (US); Joel G. Hassell, Arvada, CO (US); Thomas R. Lemmons, Sand Springs, OK (US); David M. Berezowski, Tulsa, OK (US); Robert A. Knee, Lansdale, PA (US); Robert H. McCoy, Broken Arrow, OK (US)

(73) Assignee: United Video Properties, Inc., Tulsa, OK (US)

( * ) Notice: Subject to any disclaimer, the term of this patent is extended or adjusted under 35 U.S.C. 154(b) by 735 days.

(21) Appl. No.: 11/820,587

(22) Filed: Jun. 19, 2007

(65) Prior Publication Data

US 2008/0010655 A1   Jan. 10, 2008

Related U.S. Application Data

(63) Continuation of application No. 11/246,392, filed on Oct. 7, 2005, which is a continuation of application No. 10/927,814, filed on Aug. 26, 2004, which is a continuation of application No. 09/354,344, filed on Jul. 16, 1999, now abandoned.

(60) Provisional application No. 60/097,527, filed on Aug. 21, 1998, provisional application No. 60/093,292, filed on Jul. 17, 1998.

(51) Int. Cl.
*H04N 5/445* (2006.01)
*H04N 7/173* (2006.01)
*H04N 1/16* (2006.01)

(52) U.S. Cl. ............... 725/37; 725/38; 725/39; 725/51; 725/86; 725/133; 725/110; 725/120; 725/141

(58) Field of Classification Search .................... 386/46, 386/83; 725/58, 78, 90–91, 131–133, 139–141, 725/151–153, 115
See application file for complete search history.

(56) References Cited

U.S. PATENT DOCUMENTS

| 4,264,924 A | 4/1981 | Freeman |
| 4,264,925 A | 4/1981 | Freeman et al. |
| 4,355,415 A | 10/1982 | George et al. |
| 4,429,385 A | 1/1984 | Cichelli et al. |
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,630,108 A | 12/1986 | Gomersall |

(Continued)

FOREIGN PATENT DOCUMENTS

CA   2232003   6/2002

(Continued)

OTHER PUBLICATIONS

U.S. Appl. No. 08/900,417, filed Mar. 2002, Daniels.*

(Continued)

*Primary Examiner* — Son P Huynh
(74) *Attorney, Agent, or Firm* — Ropes & Gray LLP

(57) ABSTRACT

An interactive television program guide with remote access is provided. The interactive television program guide is implemented on interactive television program guide equipment. A remote program guide access device is connected to the interactive television program guide equipment by a remote access link to provide a user with remote access to program guide functions.

35 Claims, 35 Drawing Sheets

U.S. PATENT DOCUMENTS

| | | |
|---|---|---|
| 4,694,490 A * | 9/1987 | Harvey et al. .................. 380/234 |
| 4,706,121 A | 11/1987 | Young |
| 4,718,107 A | 1/1988 | Hayes |
| 4,751,578 A | 6/1988 | Reiter |
| 4,761,684 A | 8/1988 | Clark et al. |
| 4,787,063 A | 11/1988 | Muguet |
| 4,847,698 A | 7/1989 | Freeman |
| 4,847,700 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,945,563 A | 7/1990 | Horton et al. |
| 4,959,720 A | 9/1990 | Duffield et al. |
| 4,965,825 A | 10/1990 | Harvey et al. |
| 4,977,455 A | 12/1990 | Young |
| 4,994,908 A | 2/1991 | Kuban et al. |
| 5,001,554 A | 3/1991 | Johnson et al. |
| 5,016,273 A | 5/1991 | Hoff |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,089,885 A | 2/1992 | Clark |
| 5,105,184 A | 4/1992 | Pirani et al. |
| 5,109,279 A | 4/1992 | Ando |
| 5,113,259 A | 5/1992 | Romesburg et al. |
| 5,132,992 A | 7/1992 | Yurt et al. |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,172,413 A | 12/1992 | Bradley et al. |
| 5,187,589 A | 2/1993 | Kono et al. |
| 5,195,134 A | 3/1993 | Inoue et al. |
| 5,200,822 A | 4/1993 | Bronfin et al. |
| 5,202,915 A | 4/1993 | Nishii |
| 5,210,611 A | 5/1993 | Yee et al. |
| 5,223,924 A | 6/1993 | Strubbe et al. |
| 5,233,423 A | 8/1993 | Jernigan et al. |
| 5,241,428 A | 8/1993 | Goldwasser et al. |
| 5,249,043 A | 9/1993 | Grandmougin |
| 5,253,066 A | 10/1993 | Vogel |
| 5,253,275 A | 10/1993 | Yurt et al. |
| 4,706,121 A | 12/1993 | Young |
| 5,285,284 A | 2/1994 | Takashima et al. |
| 5,296,931 A | 3/1994 | Na |
| 5,307,173 A | 4/1994 | Yuen et al. |
| 5,319,445 A | 6/1994 | Fitts |
| 5,323,234 A | 6/1994 | Kawasaki |
| 5,325,183 A | 6/1994 | Rhee |
| 5,335,277 A | 8/1994 | Harvey et al. |
| 5,353,121 A | 10/1994 | Young et al. |
| 5,359,367 A | 10/1994 | Stockill |
| 5,371,551 A | 12/1994 | Logan et al. |
| 5,377,317 A | 12/1994 | Bates et al. |
| 5,382,983 A | 1/1995 | Kwoh et al. |
| 5,398,074 A | 3/1995 | Duffield et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,440,678 A | 8/1995 | Eisen et al. |
| 5,442,389 A | 8/1995 | Blahut et al. |
| 5,455,570 A | 10/1995 | Cook et al. |
| 5,459,522 A | 10/1995 | Pint |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo et al. |
| 5,485,221 A | 1/1996 | Banker et al. |
| 5,502,504 A | 3/1996 | Marshall et al. |
| 5,517,257 A | 5/1996 | Dunn et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,662 A | 7/1996 | Adams et al. |
| 5,543,856 A | 8/1996 | Rosser et al. |
| 5,550,576 A | 8/1996 | Klosterman |
| 5,550,863 A | 8/1996 | Yurt et al. |
| 5,557,338 A | 9/1996 | Maze et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,568,272 A | 10/1996 | Levine |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,482 A | 1/1997 | Abraham |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,602,582 A | 2/1997 | Wanderscheid et al. |
| 5,606,374 A | 2/1997 | Bertram |
| 5,610,653 A | 3/1997 | Abecassis |
| 5,617,526 A | 4/1997 | Oran et al. |
| 5,619,247 A * | 4/1997 | Russo ........................... 725/104 |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,648,824 A | 7/1997 | Dunn et al. |
| 5,650,826 A | 7/1997 | Eitz et al. |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,655,214 A | 8/1997 | Mullett et al. |
| 5,657,072 A | 8/1997 | Aristides et al. |
| 5,657,414 A | 8/1997 | Lett et al. |
| 5,659,350 A | 8/1997 | Hendricks et al. |
| 5,659,367 A | 8/1997 | Yuen |
| 5,661,516 A | 8/1997 | Carles |
| 5,666,293 A | 9/1997 | Metz et al. |
| 5,666,498 A | 9/1997 | Amro |
| 5,666,645 A | 9/1997 | Thomas et al. |
| 5,675,390 A | 10/1997 | Schindler et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,689,666 A | 11/1997 | Berquist et al. |
| 5,692,214 A | 11/1997 | Levine |
| 5,694,163 A | 12/1997 | Harrison |
| 5,694,381 A | 12/1997 | Sako et al. |
| 5,696,824 A | 12/1997 | Walsh |

| Patent | Kind | Date | Inventor |
|---|---|---|---|
| 5,699,107 | A | 12/1997 | Lawler et al. |
| 5,710,601 | A | 1/1998 | Marshall et al. |
| 5,710,605 | A | 1/1998 | Nelson |
| 5,710,884 | A | 1/1998 | Dedrick |
| 5,715,020 | A | 2/1998 | Kuroiwa et al. |
| 5,717,452 | A | 2/1998 | Janin et al. |
| 5,724,091 | A | 3/1998 | Freeman et al. |
| 5,727,060 | A | 3/1998 | Young |
| 5,734,720 | A | 3/1998 | Salganicoff |
| 5,734,853 | A | 3/1998 | Hendricks et al. |
| 5,734,893 | A | 3/1998 | Li et al. |
| 5,742,905 | A | 4/1998 | Pepe et al. |
| 5,745,710 | A | 4/1998 | Clanton, III et al. |
| 5,748,191 | A | 5/1998 | Rozak et al. |
| 5,748,716 | A | 5/1998 | Levine |
| 5,748,732 | A | 5/1998 | Le Berre et al. |
| 5,751,282 | A | 5/1998 | Girard et al. |
| 5,752,159 | A | 5/1998 | Faust et al. |
| 5,754,771 | A | 5/1998 | Epperson et al. |
| 5,754,938 | A | 5/1998 | Herz et al. |
| 5,758,257 | A | 5/1998 | Herz et al. |
| 5,758,259 | A | 5/1998 | Lawler |
| 5,760,821 | A | 6/1998 | Ellis et al. |
| 5,768,528 | A | 6/1998 | Stumm |
| 5,771,275 | A | 6/1998 | Brunner et al. |
| 5,774,664 | A | 6/1998 | Hidary et al. |
| 5,774,666 | A | 6/1998 | Portuesi |
| 5,774,859 | A | 6/1998 | Houser et al. |
| 5,778,182 | A | 7/1998 | Cathey et al. |
| 5,781,226 | A | 7/1998 | Sheehan |
| 5,781,246 | A | 7/1998 | Alten et al. |
| 5,787,259 | A | 7/1998 | Haroun et al. |
| 5,788,507 | A | 8/1998 | Redford et al. |
| 5,790,198 | A | 8/1998 | Roop et al. |
| 5,790,202 | A | 8/1998 | Kummer et al. |
| 5,793,964 | A | 8/1998 | Rogers et al. |
| 5,796,952 | A | 8/1998 | Davis et al. |
| 5,798,785 | A | 8/1998 | Hendricks et al. |
| 5,801,787 | A | 9/1998 | Schein et al. |
| 5,802,284 | A | 9/1998 | Karlton et al. |
| 5,805,155 | A | 9/1998 | Allibhoy et al. |
| 5,805,204 | A | 9/1998 | Thompson et al. |
| 5,805,763 | A | 9/1998 | Lawler et al. |
| 5,805,804 | A | 9/1998 | Laursen et al. |
| 5,805,806 | A * | 9/1998 | McArthur ............... 709/250 |
| 5,808,608 | A | 9/1998 | Young et al. |
| 5,808,694 | A | 9/1998 | Usui et al. |
| 5,809,204 | A | 9/1998 | Young et al. |
| 5,812,123 | A | 9/1998 | Rowe et al. |
| 5,812,205 | A | 9/1998 | Milnes et al. |
| 5,812,930 | A | 9/1998 | Zavrel |
| 5,812,931 | A | 9/1998 | Yuen |
| 5,812,937 | A | 9/1998 | Takahisa et al. |
| 5,818,438 | A | 10/1998 | Howe et al. |
| 5,818,441 | A | 10/1998 | Throckmorton et al. |
| 5,819,019 | A | 10/1998 | Nelson |
| 5,819,156 | A | 10/1998 | Belmont |
| 5,822,123 | A | 10/1998 | Davis et al. |
| 5,828,420 | A | 10/1998 | Marshall et al. |
| 5,828,945 | A | 10/1998 | Klosterman |
| RE35,954 | E | 11/1998 | Levine |
| 5,838,314 | A | 11/1998 | Neel et al. |
| 5,844,620 | A | 12/1998 | Coleman et al. |
| 5,850,218 | A | 12/1998 | LaJoie et al. |
| 5,852,437 | A | 12/1998 | Wugofski et al. |
| 5,867,223 | A | 2/1999 | Schindler et al. |
| 5,867,233 | A | 2/1999 | Tanaka |
| 5,867,799 | A | 2/1999 | Lang et al. |
| 5,878,222 | A | 3/1999 | Harrison |
| 5,880,768 | A | 3/1999 | Lemmons et al. |
| 5,883,621 | A * | 3/1999 | Iwamura ............... 725/37 |
| 5,884,298 | A | 3/1999 | Smith, II et al. |
| 5,886,732 | A | 3/1999 | Humpleman |
| 5,901,366 | A | 5/1999 | Nakano et al. |
| 5,907,323 | A | 5/1999 | Lawler et al. |
| 5,914,746 | A | 6/1999 | Matthews, III et al. |
| 5,917,405 | A | 6/1999 | Joao |
| 5,926,624 | A | 7/1999 | Katz et al. |
| 5,929,849 | A | 7/1999 | Kikinis |
| 5,940,572 | A | 8/1999 | Balaban et al. |
| 5,945,988 | A | 8/1999 | Williams et al. |
| 5,956,025 | A * | 9/1999 | Goulden et al. ............... 715/716 |
| 5,959,592 | A | 9/1999 | Petruzzelli |
| 5,963,264 | A | 10/1999 | Jackson |
| 5,963,645 | A | 10/1999 | Kigawa et al. |
| 5,969,748 | A | 10/1999 | Casement et al. |
| 5,970,473 | A * | 10/1999 | Gerszberg et al. ............... 705/26 |
| 5,973,683 | A | 10/1999 | Cragun et al. |
| 5,977,964 | A | 11/1999 | Williams et al. |
| 5,982,411 | A | 11/1999 | Eyer et al. |
| 5,987,509 | A | 11/1999 | Portuesi |
| 5,988,078 | A | 11/1999 | Levine |
| 5,990,885 | A | 11/1999 | Gopinath |
| 5,991,799 | A | 11/1999 | Yen et al. |
| 5,991,832 | A | 11/1999 | Sato et al. |
| 6,002,394 | A | 12/1999 | Schein et al. |
| 6,002,450 | A | 12/1999 | Darbee et al. |
| 6,005,561 | A | 12/1999 | Hawkins et al. |
| 6,005,565 | A | 12/1999 | Legall et al. |
| 6,005,631 | A | 12/1999 | Anderson et al. |
| 6,006,257 | A | 12/1999 | Slezak |
| 6,009,153 | A | 12/1999 | Houghton et al. |
| 6,009,465 | A | 12/1999 | Decker et al. |
| 6,012,086 | A * | 1/2000 | Lowell ............... 709/218 |
| 6,020,880 | A | 2/2000 | Naimpally |
| 6,020,883 | A | 2/2000 | Herz et al. |
| 6,025,837 | A | 2/2000 | Matthews, III et al. |
| 6,025,869 | A | 2/2000 | Stas et al. |
| 6,035,339 | A | 3/2000 | Agraharam et al. |
| 6,038,367 | A | 3/2000 | Abecassis |
| 6,040,829 | A | 3/2000 | Croy et al. |
| 6,049,823 | A | 4/2000 | Hwang |
| 6,057,872 | A | 5/2000 | Candelore |
| 6,057,890 | A | 5/2000 | Virden et al. |
| 6,058,238 | A | 5/2000 | Ng |
| 6,064,980 | A | 5/2000 | Jacobi et al. |
| 6,075,568 | A | 6/2000 | Matsuura |
| 6,091,884 | A | 7/2000 | Yuen et al. |
| 6,097,441 | A | 8/2000 | Allport |
| 6,104,334 | A | 8/2000 | Allport |
| 6,130,726 | A * | 10/2000 | Darbee et al. ............... 348/734 |
| 6,133,910 | A | 10/2000 | Stinebruner |
| 6,133,912 | A | 10/2000 | Montero |
| 6,141,488 | A | 10/2000 | Knudson et al. |
| 6,144,401 | A | 11/2000 | Casement et al. |
| 6,144,702 | A | 11/2000 | Yurt et al. |
| 6,157,411 | A | 12/2000 | Williams et al. |
| 6,157,413 | A | 12/2000 | Hanafee et al. |
| 6,160,988 | A | 12/2000 | Shroyer |
| 6,163,316 | A | 12/2000 | Killian |
| 6,169,543 | B1 | 1/2001 | Wehmeyer |
| 6,172,674 | B1 | 1/2001 | Etheredge |
| 6,172,677 | B1 | 1/2001 | Stautner et al. |
| 6,177,931 | B1 | 1/2001 | Alexander et al. |
| 6,182,094 | B1 | 1/2001 | Humpleman et al. |
| 6,188,397 | B1 | 2/2001 | Humpleman |
| 6,192,340 | B1 | 2/2001 | Abecassis |
| 6,202,211 | B1 | 3/2001 | Williams, Jr. |
| 6,208,335 | B1 | 3/2001 | Gordon et al. |
| 6,208,384 | B1 | 3/2001 | Schultheiss |
| 6,208,799 | B1 | 3/2001 | Marsh et al. |
| 6,219,839 | B1 | 4/2001 | Sampsell |
| 6,233,389 | B1 | 5/2001 | Barton et al. |
| 6,233,734 | B1 | 5/2001 | Macrae et al. |
| 6,237,049 | B1 | 5/2001 | Ludtke |
| 6,239,794 | B1 | 5/2001 | Yuen et al. |
| 6,240,555 | B1 | 5/2001 | Shoff et al. |
| 6,263,501 | B1 | 7/2001 | Schein et al. |
| 6,263,507 | B1 * | 7/2001 | Ahmad et al. ............... 725/134 |
| 6,268,849 | B1 | 7/2001 | Boyer et al. |
| 6,275,648 | B1 | 8/2001 | Knudson et al. |
| 6,286,142 | B1 | 9/2001 | Ehreth |
| 6,288,716 | B1 | 9/2001 | Humpleman et al. |
| 6,292,624 | B1 | 9/2001 | Saib et al. |
| 6,298,482 | B1 | 10/2001 | Seidman et al. |
| 6,305,018 | B1 | 10/2001 | Usui et al. |
| 6,310,886 | B1 | 10/2001 | Barton |
| 6,311,011 | B1 | 10/2001 | Kuroda et al. |

| | | |
|---|---|---|
| 6,317,884 B1 | 11/2001 | Eames et al. |
| 6,324,338 B1 | 11/2001 | Wood et al. |
| 6,326,982 B1 | 12/2001 | Wu et al. |
| 6,327,418 B1 | 12/2001 | Barton |
| 6,331,877 B1 | 12/2001 | Bennington et al. |
| 6,336,099 B1 | 1/2002 | Barnett et al. |
| 6,357,043 B1 | 3/2002 | Ellis et al. |
| 6,367,080 B1 | 4/2002 | Enomoto et al. |
| 6,374,406 B2 * | 4/2002 | Hirata .................... 725/132 |
| 6,388,714 B1 | 5/2002 | Schein et al. |
| 6,396,544 B1 | 5/2002 | Schindler et al. |
| 6,397,080 B1 | 5/2002 | Viktorsson et al. |
| 6,437,836 B1 | 8/2002 | Huang et al. |
| 6,442,332 B1 | 8/2002 | Knudson et al. |
| 6,445,398 B1 | 9/2002 | Gerba et al. |
| 6,463,585 B1 | 10/2002 | Hendricks et al. |
| 6,473,559 B1 | 10/2002 | Knudson et al. |
| 6,486,892 B1 | 11/2002 | Stern |
| 6,493,875 B1 * | 12/2002 | Eames et al. .................... 725/81 |
| 6,505,348 B1 | 1/2003 | Knowles et al. |
| 6,509,908 B1 | 1/2003 | Croy et al. |
| 6,530,083 B1 | 3/2003 | Liebenow |
| 6,545,722 B1 * | 4/2003 | Schultheiss et al. ........... 348/552 |
| 6,557,031 B1 * | 4/2003 | Mimura et al. ................ 709/218 |
| 6,564,383 B1 | 5/2003 | Combs et al. |
| 6,571,279 B1 | 5/2003 | Herz et al. |
| 6,603,488 B2 * | 8/2003 | Humpleman et al. ......... 715/771 |
| 6,611,654 B1 * | 8/2003 | Shteyn ............................ 386/83 |
| 6,622,304 B1 * | 9/2003 | Carhart .......................... 725/74 |
| 6,670,971 B1 | 12/2003 | Oral et al. |
| 6,675,385 B1 | 1/2004 | Wang |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,732,372 B2 | 5/2004 | Tomita et al. |
| 6,738,978 B1 | 5/2004 | Hendricks et al. |
| 6,744,967 B2 | 6/2004 | Kaminski et al. |
| 6,760,537 B2 | 7/2004 | Mankovitz |
| 6,772,433 B1 | 8/2004 | LaJoie et al. |
| 6,788,882 B1 | 9/2004 | Geer et al. |
| 6,871,186 B1 | 3/2005 | Tuzhilin et al. |
| 6,925,567 B1 | 8/2005 | Hirata |
| 6,927,806 B2 | 8/2005 | Chan |
| 6,934,964 B1 | 8/2005 | Schaffer et al. |
| 6,973,669 B2 | 12/2005 | Daniels |
| 7,006,881 B1 | 2/2006 | Hoffberg et al. |
| 7,013,339 B2 | 3/2006 | Schwager et al. |
| 7,017,171 B1 | 3/2006 | Horlander et al. |
| 7,051,353 B2 | 5/2006 | Yamashita et al. |
| 7,084,780 B2 | 8/2006 | Nguyen et al. |
| 7,117,518 B1 | 10/2006 | Takahashi et al. |
| 7,134,131 B1 * | 11/2006 | Hendricks et al. ............... 725/31 |
| 7,152,236 B1 | 12/2006 | Wugofski et al. |
| 7,194,755 B1 * | 3/2007 | Nakata et al. ................... 725/78 |
| 7,224,886 B2 * | 5/2007 | Akamatsu et al. .............. 386/83 |
| 7,328,450 B2 | 2/2008 | Macrae et al. |
| 7,343,616 B1 | 3/2008 | Takahashi et al. |
| 7,480,929 B2 | 1/2009 | Klosterman et al. |
| 2001/0026533 A1 | 10/2001 | Schwager |
| 2002/0013941 A1 | 1/2002 | Ward, III et al. |
| 2002/0032907 A1 | 3/2002 | Daniels |
| 2002/0057892 A1 * | 5/2002 | Mano et al. ..................... 386/46 |
| 2002/0059599 A1 | 5/2002 | Schein et al. |
| 2002/0090203 A1 | 7/2002 | Mankovitz |
| 2002/0095673 A1 | 7/2002 | Leung et al. |
| 2002/0100044 A1 | 7/2002 | Daniels |
| 2002/0100052 A1 | 7/2002 | Daniels |
| 2002/0118676 A1 * | 8/2002 | Tonnby et al. ................. 370/352 |
| 2002/0129368 A1 | 9/2002 | Schlack et al. |
| 2002/0174424 A1 | 11/2002 | Chang et al. |
| 2002/0184626 A1 | 12/2002 | Darbee et al. |
| 2002/0194596 A1 | 12/2002 | Srivastava |
| 2003/0005445 A1 | 1/2003 | Schein et al. |
| 2003/0012555 A1 | 1/2003 | Yuen et al. |
| 2003/0031465 A1 | 2/2003 | Blake |
| 2003/0037336 A1 | 2/2003 | Leftwich |
| 2003/0040962 A1 | 2/2003 | Lewis |
| 2003/0079227 A1 | 4/2003 | Knowles et al. |
| 2003/0093329 A1 | 5/2003 | Gutta |
| 2003/0097227 A1 | 5/2003 | Bloch et al. |
| 2003/0131356 A1 | 7/2003 | Proehl et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2004/0031050 A1 | 2/2004 | Klosterman |
| 2004/0098744 A1 | 5/2004 | Gutta |
| 2004/0103439 A1 | 5/2004 | Macrae et al. |
| 2004/0194138 A1 | 9/2004 | Boylan et al. |
| 2005/0015804 A1 | 1/2005 | LaJoie et al. |
| 2005/0028218 A1 | 2/2005 | Blake |
| 2005/0193414 A1 | 9/2005 | Horvitz et al. |
| 2005/0251822 A1 | 11/2005 | Knowles et al. |
| 2005/0251827 A1 | 11/2005 | Ellis et al. |
| 2005/0265169 A1 | 12/2005 | Yoshimaru et al. |
| 2006/0031883 A1 | 2/2006 | Ellis et al. |
| 2006/0136966 A1 | 6/2006 | Folk |
| 2007/0157242 A1 | 7/2007 | Cordray et al. |
| 2007/0204308 A1 | 8/2007 | Nicholas et al. |
| 2008/0010655 A1 | 1/2008 | Ellis et al. |
| 2008/0013429 A1 | 1/2008 | Chen et al. |
| 2008/0184304 A1 | 7/2008 | Ellis et al. |
| 2008/0184313 A1 | 7/2008 | Knudson et al. |
| 2008/0184322 A1 | 7/2008 | Blake |
| 2008/0189742 A1 | 8/2008 | Ellis et al. |
| 2008/0189743 A1 | 8/2008 | Ellis et al. |
| 2008/0263600 A1 | 10/2008 | Olague et al. |
| 2009/0044226 A1 | 2/2009 | Ellis et al. |
| 2009/0241144 A1 | 9/2009 | LaJoie et al. |

FOREIGN PATENT DOCUMENTS

| | | |
|---|---|---|
| DE | 31 51 492 A1 | 7/1983 |
| DE | 44 31 438 A1 | 3/1996 |
| DE | 44 40 174 | 5/1996 |
| DE | 195 02 922 A1 | 8/1996 |
| DE | 195 31 121 A1 | 2/1997 |
| DE | 197 40 079 A1 | 3/1999 |
| EP | 0 560 593 | 9/1993 |
| EP | 0 682 452 | 11/1995 |
| EP | 0 753 964 | 1/1997 |
| EP | 0 774 853 A2 | 5/1997 |
| EP | 0 793 225 A2 | 9/1997 |
| EP | 0 795 994 | 9/1997 |
| EP | 0 805 594 A2 | 11/1997 |
| EP | 0 836 320 | 4/1998 |
| EP | 0 843 468 | 5/1998 |
| EP | 0 854 645 | 7/1998 |
| EP | 0 940 983 | 9/1999 |
| EP | 1 099 339 | 5/2001 |
| EP | 1 271 952 | 1/2003 |
| EP | 1 515 549 | 3/2005 |
| EP | 1 538 838 | 6/2005 |
| GB | 2 227 622 | 8/1990 |
| GB | 2 229 595 | 9/1990 |
| GB | 2 256 115 | 11/1992 |
| GB | 2265792 | 10/1993 |
| GB | 2275800 | 9/1994 |
| GB | 2 286 754 | 8/1995 |
| GB | 2 346 251 | 8/2000 |
| JP | 3-22770 | 1/1991 |
| JP | 8-56352 | 2/1996 |
| JP | 08-242436 | 9/1996 |
| JP | 09-065300 A | 3/1997 |
| JP | 9-102827 | 4/1997 |
| JP | 09-120686 A | 5/1997 |
| JP | 09-148994 A | 6/1997 |
| JP | 09-162818 A | 6/1997 |
| JP | 09-270965 A | 10/1997 |
| JP | 09-298677 | 11/1997 |
| JP | 11-317937 A | 11/1999 |
| WO | WO 87/03766 | 6/1987 |
| WO | WO-88/04507 | 6/1988 |
| WO | WO 89/03085 | 4/1989 |
| WO | WO-91/07050 A1 | 5/1991 |
| WO | WO-92/17027 | 10/1992 |

| | | |
|---|---|---|
| WO | WO 92/22983 | 12/1992 |
| WO | WO 94/14282 | 6/1994 |
| WO | WO-94/14284 | 6/1994 |
| WO | WO 94/15284 | 7/1994 |
| WO | WO 95/01056 | 1/1995 |
| WO | WO-95/01058 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO-95/32587 | 11/1995 |
| WO | WO 96/07270 | 3/1996 |
| WO | WO 96/13932 | 5/1996 |
| WO | WO 96/20555 | 7/1996 |
| WO | WO-96/26605 | 8/1996 |
| WO | WO-96/34491 | 10/1996 |
| WO | WO-96/36172 | 11/1996 |
| WO | WO-96/37075 | 11/1996 |
| WO | WO-96/41478 | 12/1996 |
| WO | WO-97/12486 A1 | 4/1997 |
| WO | WO 97/13368 | 4/1997 |
| WO | WO-97/19565 | 5/1997 |
| WO | WO-97/22207 A1 | 6/1997 |
| WO | WO 97/31480 | 8/1997 |
| WO | WO-97/33434 A1 | 9/1997 |
| WO | WO-97/34413 | 9/1997 |
| WO | WO 97/36422 | 10/1997 |
| WO | WO-97/46943 | 12/1997 |
| WO | WO 97/47106 | 12/1997 |
| WO | WO-97/47124 | 12/1997 |
| WO | WO 97/47143 | 12/1997 |
| WO | WO-97/48230 | 12/1997 |
| WO | WO 97/49237 | 12/1997 |
| WO | WO 97/50251 | 12/1997 |
| WO | WO-98/06219 | 2/1998 |
| WO | WO 98/10589 | 3/1998 |
| WO | WO 98/10598 | 3/1998 |
| WO | WO 98/16062 | 4/1998 |
| WO | WO 98/17064 | 4/1998 |
| WO | WO 98/26584 | 6/1998 |
| WO | WO-98/43183 | 10/1998 |
| WO | WO 98/56173 | 12/1998 |
| WO | WO 98/56176 | 12/1998 |
| WO | WO-99/03267 | 1/1999 |
| WO | WO 99/04570 | 1/1999 |
| WO | WO 99/14947 | 3/1999 |
| WO | WO 99/30491 | 6/1999 |
| WO | WO-99/45700 | 9/1999 |
| WO | WO-99/52279 | 10/1999 |
| WO | WO-99/57839 | 11/1999 |
| WO | WO 99/60783 | 11/1999 |
| WO | WO-99/66725 | 12/1999 |
| WO | WO-00/04706 | 1/2000 |
| WO | WO-00/04707 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-00/16548 | 3/2000 |
| WO | WO-00/28739 | 5/2000 |
| WO | WO-00/58833 | 10/2000 |
| WO | WO-00-58967 | 10/2000 |
| WO | WO-00/59214 | 10/2000 |
| WO | WO-00/59233 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-01/22729 | 3/2001 |
| WO | WO-01/46843 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-01/76239 | 10/2001 |
| WO | WO-01/76248 | 10/2001 |
| WO | WO-02/078317 | 10/2002 |
| WO | WO-03/098932 | 11/2003 |
| WO | WO-2004/054264 | 6/2004 |
| WO | WO-2005/091626 | 9/2005 |

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.
"DIRECTV Digital Satellite Receiver—Operating Instructions," Sony Electronics Inc. (2001).
"DIRECTV Receiver—Owner's Manual," DIRECTV, Inc. (2002).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"Electronic Programme Guide (EPG); Protocol for a TV Guide using electronic data transmission" by European Telecommunication Standards Institute, May 1997, Valbonne, France, publication No. ETS 300 707.
"Fall 2001 TiVo Service Update with Dual Tuner!," TiVo Inc. (2001).
"PTV Recorder Setup Guide," Philips (2000).
"RCA Satellite Receiver User's Guide," Thomson Multimedia Inc. (2001).
"Start Here," Sony, TiVo and DIRECTV (undated).
"Windows 98 Feature Combines TV, Terminal and the Internet," New York Times, Aug. 18, 1998.
Archived Intel Intercast's Website from Archieve. Org, "How Does It Work?", <http://web.archive.org/web/19990429214537/www.intercast.com/intercast/howitwks.htm>, Acessed on Jul. 8, 2008.
Archived Intel Intercast's Website from Archieve.Org, "What Is It?", <http://web.archive.org/web/19990422195517/www.intercast.com/intercast/whatisit.htm>, Acessed on Jul. 8, 2008.
Digital Video Broadcasting (DVB); DVB specification for data broadcasting, European Telecommunications Standards Institute, Draft EN 301 192 V1.2.1 (Jan. 1999).
DiRosa, S. "Pinochle's BIGSURF Netguide", Jul. 1995, Volute 3.1, pp. 260-270.
Hofmann, Neumann, Oberlies, and Schadwinkel, "Videotext Programmiert Videorecorder," Rundfunktechnische Mitteilungen, Nov.-Dec. 1982, pp. 254-257.
Rewind, replay and unwind with new high-tech TV devices, by Lawrence J. Magid, LA Times. This document was printed from the Internet on Jun. 6, 1999 and bears a date of May 19, 1999.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.
User's Guide RCA Color TV with TV Plus + Guide, 1997.
U.S. Appl. No. 60/019,351, filed Jun. 6, 1996, Williams.
U.S. Appl. No. 60/020,580, filed Jun. 26, 1996, Goldschmidt.
U.S. Appl. No. 60/024,435, filed Aug. 22, 1996, Goldschmidt.
U.S. Appl. No. 60/024,436, filed Aug. 22, 1996, Goldschmidt.
U.S. Appl. No. 60/024,452, filed Aug. 27, 1996, Goldschmidt.
Bach, U., et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach, U., et al, "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (Translation, pp. 1-7).
Office Actions and Corresponding Replies in relation to U.S. Appl. No. 10/251,670.
Office Actions and Corresponding Replies in relation to U.S. Appl. No. 10/718,187.
Office Actions and Corresponding Replies in relation to U.S. Appl. No. 11/600,944.
Examiner Interview Summary in U.S. Appl. No. 09/356,161 dated Aug. 10, 2005.
Final Office Action in U.S. Appl. No. 09/356,161 dated Jun. 17, 2005.
Final Office Action in U.S. Appl. No. 11/179,410 dated Apr. 27, 2009.

Final Office Action in U.S. Appl. No. 11/894,618 dated Aug. 3, 2009.
Hirtz Gentlemen: et al:, "Open TV: Betriebssystem Fuer Interaktives Fernsehen," Fernseh Und Kinotechnik, de vde Verlag GMBH, Berlin, vol. 50, No. 3, Mar. 1, 1996, pp. 84-89, XP 000581417, ISSN: 0015-0142 (Translation, pp. 1-9).
International Preliminary Examination Report, International Application No. PCT/US97/18664, Dec. 7, 1998, 10 pages.
Non-Final Office Action in U.S. Appl. No. 09/356,161 dated Oct. 7, 2004.
Non-Final Office Action in U.S. Appl. No. 11/179,410 dated Jul. 23, 2008.
Non-Final Office Action in U.S. Appl. No. 11/894,618 dated Oct. 1, 2008.
PCT Notification of Transmittal of International Search Report, International Application No. PCT/US00/05887, Aug. 2000, 2 pages.
Reply to Non-Final Office Action in U.S. Appl. No. 09/356,161 dated Mar. 7, 2005.
Reply to Non-Final Office Action in U.S. Appl. No. 11/179,410 dated Jan. 23, 2009.
Reply to Non-Final Office Action in U.S. Application No. 11/894,618 dated Apr. 6, 2009.
Request for Continued Examination and Reply to Final Office Action in U.S. Appl. No. 11/894,618 dated Feb. 3, 2010.
Supplementary European Search Report, Feb. 25, 2000, Application No. EP 97 91 0985.
U.S. Appl. No. 10/927,814, various Office Actions issued by the United States Patent Office and applicants' responses; as well as Request for Interference, Examiner Interview Summary and Applicant Summary of Interview with Examiner.
U.S. Appl. No. 11/179,410, Office Action issued by the United States Patent Office and applicants' response.
U.S. Appl. No. 11/894,741, Office Action dated Jun. 23, 2009 and Examiner Interview Summary dated Jun. 24, 2009.
U.S. Appl. No. 08/922,212, various Office Actions issued by the United States Office and applicants' responses along with a Notice of Abandonment.
U.S. Appl. No. 10/927,582, various Office Actions issued by the United States Patent Office and applicants' responses; as well as Request for Interference.
U.S. Appl. No. 11/246,392, various Office Actions issued by the United States Patent Office and applicants' response.
U.S. Appl. No. 11/894,741, various Office Actions issued by the United States Patent Office and applicants' response.
U.S. Appl. No. 10/241,112, various Office Actions issued by the United States Patent Office and applicants' responses along with Notice of Appeal.
Venditto, Gus, "Prodigy for Dummies," 1995, IDG Books, pp. 57-63 and p. 213.
Verknuepfung von TV mit INternet, Funkschau, De, Franzis—Verlag K.G. Munchen, vol. 68, No. 18 Aug. 16, 1996, pp. 70-71, XP 000631189, ISSN: 0016-2841 (Translation, pp. 1-3).
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"Jini™ Architecture Overview," by Jim Waldo, from the Internet at http://Java.sun.com/products/jini/whitepapers/architectureoverview.pdf/ printed on Jan. 25, 1999. The document bears a copyright date of 1998.
"Reaching your subscribers is a complex and costly process-until now," from the Internet at http://www.evolveproducts.com/info.html, printed on Dec. 28, 1998.
Curt Rogers, "Telcos vs. Cable TV: The Global View," Data Communications, No. 13, New York, pp. 75, 76, 78 and 80, Sep. 1995.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"Using StarSight 2," published before Apr. 19, 1995.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
Von Andreas Neumann, "WDR Online Aufbau Und Perspektiven Automatisierter Online-Dienste Im WDR," Rundfunktechnische Mitteilungen, vol. 41, pp. 56-66, Jun. 1997.
Von Gerhard Eitz, "Zukünftige Informations- Und Datenangebote Beim Digitalen Fernsehen—EPG Und "Lesezeichen"," Rundfunktechnische Mitteilungen, vol. 41, pp. 67-72, Jun. 1997.
Ochiai et al., "@randomTV: A New TV System," NEW C&C Media Research Laboratories, Mar. 17, 1998, pp. 3-302-3-303 (concise explanation included in Supp. IDS).

* cited by examiner

|  | PROGRAMMING 9:30-10:30 PM | | |
|---|---|---|---|
|  | 170 | | |
| MOVIES | | | |
|  | THE BIG RED ONE | CHANNEL 2 (CBS) | 8:30 - 10:30 |
|  | THE BLUES BROTHERS | CHANNEL 48 (VH-1) | 10:00 - 11:30  ⟵175 |
|  | GHOST  ⟵171 | CHANNEL 47 (HBO) | 9:30 - 10:00 |
|  | TERMINATOR | CHANNEL 7 (PPV) | 8:00 - 10:00 |
|  | TITANIC | CHANNEL 47 (HBO) | 10:00 - 1:30 |
|  | WHEN HARRY MET SALLY | CHANNEL 4 (NBC) | 9:00 - 11:00 |
| SPORTING EVENTS | | | |
|  | NEW YORK GIANTS | CHANNEL 8 (WXBR) | 8:00 - 10:00 |
|  | YANKEE BASEBALL | CHANNEL 11 (WLIW) | 8:00 - 11:00 |
| NEWS | | | |
|  | LOCAL NEWS | CHANNEL 17 (WLIR) | 9:30 - 10:00 |
|  | NEWS EXTRA | CHANNEL 5 (FOX) | 10:00 - 10:30 |
| ADULT | | | |
| 310 → 🔒 | PAY-PER-VIEW #1 | CHANNEL 49 (ADU) | 10:00 - 10:30 |
| 310 → 🔒 | PAY-PER-VIEW #2 | CHANNEL 49 (ADU) | 10:30 - 11:00 |

*FIG. 8*

| FAVORITE PROGRAMMING 9:30-10:30 PM | | |
|---|---|---|
| GHOST | CHANNEL 47 (HBO) | 9:30 - 10:00 |
| TERMINATOR | CHANNEL 7 (PPV) | 8:00 - 10:00 |
| THE BIG RED ONE | CHANNEL 2 (CBS) | 8:30 - 10:30 |
| THE BLUES BROTHERS | CHANNEL 48 (VH-1) | 10:00 - 11:30 |
| TITANIC | CHANNEL 47 (HBO) | 10:00 - 1:30 |
| WHEN HARRY MET SALLY | CHANNEL 4 (NBC) | 9:00 - 11:00 |

*FIG. 10*

INTERACTIVE TELEVISION PROGRAM GUIDE WITH REMOTE ACCESS

CROSS REFERENCE TO RELATED APPLICATIONS

This application is a continuation of U.S. patent application Ser. No. 11/246,392, filed Oct. 7, 2005, which is a continuation of U.S. patent application Ser. No. 10/927,814, filed Aug. 26, 2004, which is a continuation of U.S. patent application Ser. No. 09/354,344, filed Jul. 16, 1999, now abandoned which claims the benefit of U.S. Provisional Application No. 60/097,527, filed Aug. 21, 1998 and U.S. Provisional Application No. 60/093,292, filed Jul. 17, 1998, all of which are hereby incorporated by reference herein in their entireties.

BACKGROUND OF THE INVENTION

This invention relates to interactive television program guide video systems, and more particularly, to interactive television program guide systems that provide remote access to program guide functionality.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive television program guides allow the user to navigate through television program listings using a remote control. In a typical program guide, various groups of television program listings are displayed in predefined or user-defined categories. Listings are typically displayed in a grid or table.

Interactive television program guides are typically implemented on set-top boxes located in the homes of users. A typical set-top box is connected to the user's television and videocassette recorder. The program guide system is therefore not portable. As a result, the user cannot use the program guide to adjust program reminder settings, to select programs for recording, to purchase pay-per-view programs, or to perform other program guide functions without that user being physically located in the same room in the home.

On-line program guides allow users to view program listings using a web-browser. However, the on-line program guides that are available on the Internet do not provide the versatility of in-home program guides. For example, on-line program guides do not allow the user to set in-home reminders for programming, to adjust parental control settings, or to select programs for recording on the user's videocassette recorder.

On-line program guides have also been implemented that allow users to order pay-per-view programs. Such systems allow users to order programs via a web server as opposed to via the telephone or using impulse ordering. A third party takes orders via the internet, bills the user, and provides ordering information to the headend. The headend authorizes the user's set-top to view the ordered program using conventional signal denial or signal scrambling systems without coordinating the ordering of the pay-per-view program with an in-home guide. Ordering pay-per-view programs in this manner (i.e., without coordinating the order with an in-home guide), does not provide users with many of the benefits of ordering pay-per-views through an in-home guide, such as upcoming program reminders or missed program reminders. Users are also not prevented from attempting to order a pay-per-view program with a guide after the program has been ordered.

Program guides that run on personal computers are also available. Such programs guides are useful for users who wish to view program listings information, but who cannot readily access their set-top-box-based program guide. For example, another member of the user's household may be watching television and therefore dominating the use of the set-top box and television. Because there is no way for the user of such a personal computer program guide to coordinate the operation of the personal computer program guide with the operation of the set-top box program guide, the user of a personal computer program guide is not able to use the personal computer program guide to set in-home reminders for programming, to adjust parental control settings, to select programs for recording on the user's videocassette recorder, or to purchase pay-per-view programs.

Presently existing program guide systems therefore require that the user be physically present in the home to access important program guide features such as program reminders, parental control, and program recording.

It is therefore an object of the present invention to provide an interactive televison program guide system in which the program guide may be remotely accessed by the user. Such a system may allow the user to access important features of the user's in-home program guide from a remote location and set program guide settings for those features.

SUMMARY OF THE INVENTION

This and other objects of the present invention are accomplished in accordance with the principles of the present invention by providing an interactive television program guide system with remote access. A local interactive television program guide is implemented on interactive television program guide equipment. The interactive television program guide equipment is connected to one or more remote program guide access devices over a remote access link. A remote access interactive television program guide is implemented on the remote program guide access device. The remote program guide and remote program guide access devices provide users with the opportunity to remotely access features of the interactive television program guide on the interactive television program guide equipment and to remotely set program guide settings.

Any suitable interactive television program guide function or setting may be accessed. The remote access program guide may, for example, provide the user with an opportunity to remotely schedule a reminder for a program, remotely view television program listings, remotely select programming for recordings (storage), remotely play a stored program or a currently broadcasted program on the remote program guide access device, remotely set and navigate through favorites (e.g., favorite channels, program categories, services, etc.), and remotely set parental control settings.

The remote program guide access device may also provide the user with an opportunity to remotely perform additional functions such as sending and playing or displaying messages with the interactive television program guide, polling the interactive program guide for status information, and storing interactive television program guide data at the remote program guide access device.

Providing remote access to these and other features may allow users to control television related activity in ways and in situations in which the users could not do so before. A person who is caught in traffic in an automobile may, for example, access the program guide using appropriate voice commands to access listings for programs that the user anticipates he or she will not arrive home in time to view. The listings may be displayed on a screen, or recited back to the user in synthesized voice listings. The user may select any such programs for recording on their videocassette recorder or other storage device in the home, or on a server at a television distribution facility or other distribution facility. Systems in which users store programs on a remote server are described, for example, in Ellis et al. U.S. patent application Ser. No. 09/332,244, filed Jun. 11, 1999, which is hereby incorporated by reference herein in its entirety.

A parent may, for example, access the program guide while at work to see if a child is watching television. If the child should not be watching television, the parent may cause the program guide to display a message to the child (e.g., "Go do your homework!") and then may prevent viewing via a parental control feature. On the other hand, if television viewing is prevented by default (e.g., prevented until the parent arrives home), then the parent may remotely access the program guide to allow a child to watch television.

A person at work may, for example, receive a call from a spouse or other family member at home who explains to the person at work that the person at home cannot operate home television equipment as desired (e.g., "I can't program the VCR!"). The person at work may remotely access the program guide, poll for equipment status information, and perform the desired function.

If desired, non-program-guide applications may be implemented on the user television equipment. Such non-program-guide applications may include, for example, a web browser application, a home shopping application, a game application, an e-mail application, a chat application, a banking application, etc. These applications may be implemented on a set-top box within the user television equipment. The user may adjust the settings of such a non-program-guide application using a remote access device.

Further features of the invention, its nature and various advantages will be more apparent from the accompanying drawings and the following detailed description of the preferred embodiments.

BRIEF DESCRIPTION OF THE DRAWINGS

FIGS. 7 and 8 are illustrative remote program guide access device display screens in accordance with the principles of the present invention.

FIG. 10 is an illustrative favorites screen for display by a remote program guide access device in accordance with the principles of the present invention.

DETAILED DESCRIPTION OF THE PREFERRED EMBODIMENTS

Figure 1:
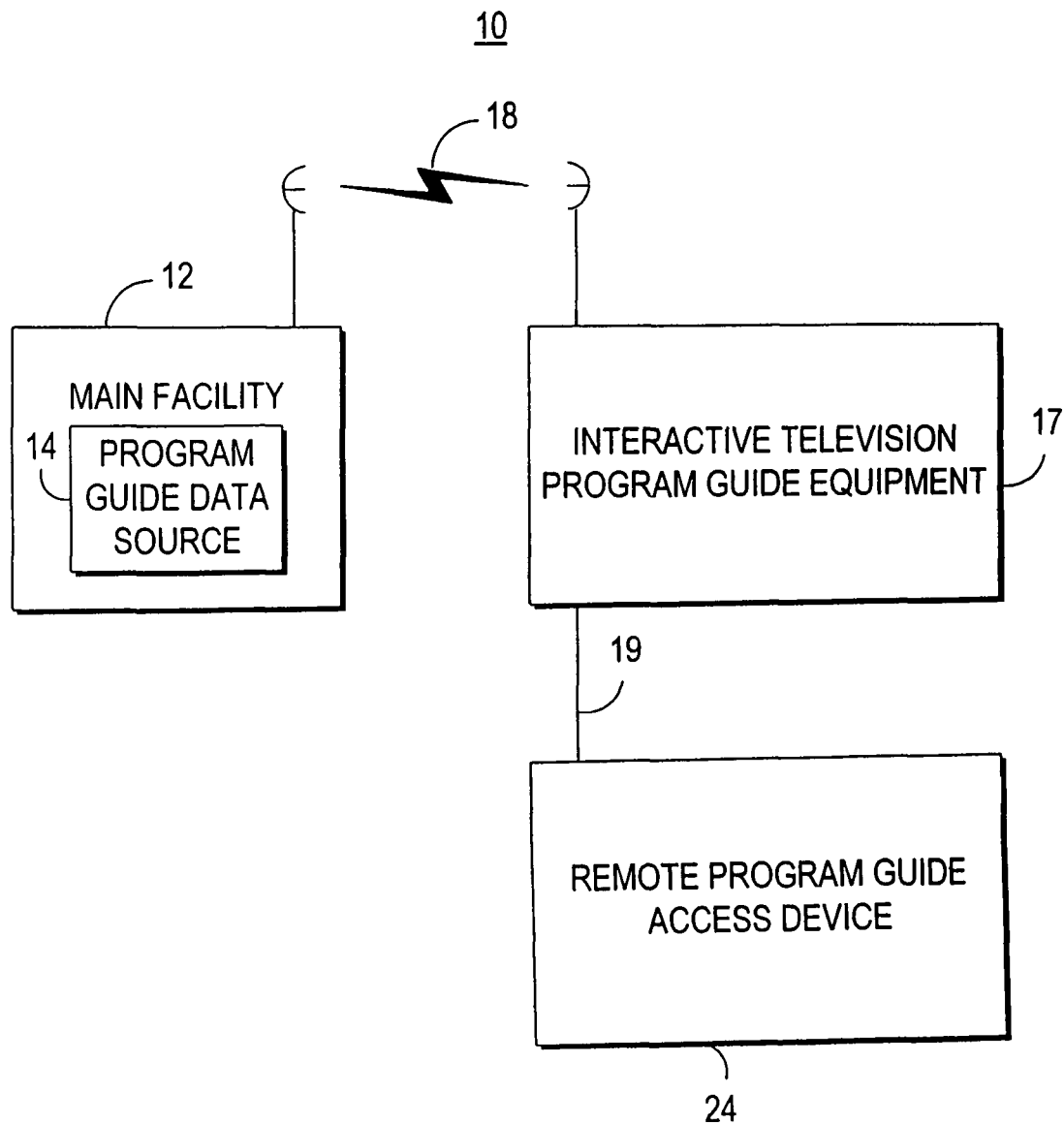
FIG. 1 is a schematic block diagram of an illustrative system in accordance with the present invention.

An illustrative system 10 in accordance with the present invention is shown in FIG. 1. Main facility 12 provides interactive television program guide data from program guide data source 14 to interactive television program guide equipment 17 via communications link 18. There are preferably numerous pieces or installations of interactive television program guide equipment 17, although only one is shown in FIG. 1 to avoid over-complicating the drawing. Link 18 may be a satellite link, a telephone network link, a cable or fiber optic link, a microwave link, a combination of such links, an Internet link, or any other suitable communications path.

The interactive television program guide data transmitted by main facility 12 to interactive television program guide equipment 17 may include television program listings data (e.g., program times, channels, titles, and descriptions) and other program guide data for additional services other than television program listings (e.g., pay-per-view information, weather information, associated Internet web links, computer software, etc.). Interactive television program guide equipment 17 may be connected to remote program guide access device 24 via remote access link 19. Interactive television program guide equipment may have more than one associated remote program guide access device 24, although only one such device 24 is shown in FIG. 1 to avoid overcomplicating the drawing.

An interactive television program guide is implemented on interactive television program guide equipment 17. Four illustrative arrangements for interactive television program guide equipment 17 is shown in FIGS. 2a-2d. As shown in FIGS. 2a-2d interactive television program guide equipment 17 may include program guide distribution equipment 21 located at television distribution facility 16 and user television equipment 22. Television distribution facility 16 may be any suitable distribution facility (e.g., a cable system headend, a broadcast distribution facility, a satellite television distribution facility, or any other suitable type of television distribution facility). Television distribution facility 16 may distribute program guide data that it received from main facility 12 to multiple users via communications path 20.

Program guide distribution equipment 21 may be any equipment suitable for providing program guide data to user television equipment 22. Program guide distribution equipment 21 may include, for example, suitable transmission hardware for distributing program guide data on a television channel sideband, in the vertical blanking interval of a television channel, using an in-band digital channel, using an out-of-band digital signal, or by any other suitable data transmission technique. Video signals (e.g., television programming) may also be provided by program guide distribution equipment 21 to user television equipment 22 over communications paths 20 on multiple television channels.

Figure 2A:
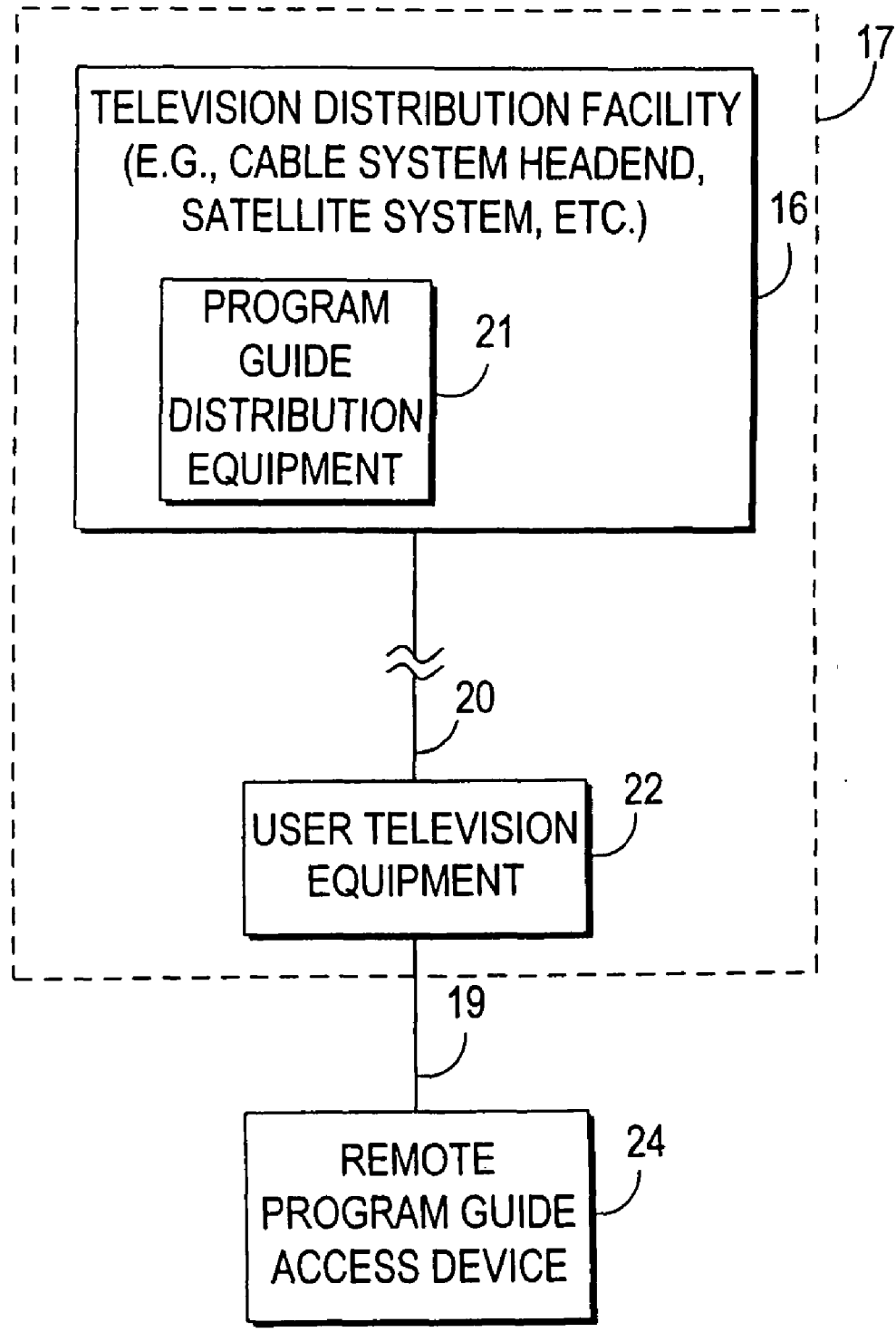
FIGS. 2a-2d show illustrative arrangements for the interactive television program guide equipment and remote program guide access device of FIG. 1 in accordance with the principles of the present invention.
Figure 2B:
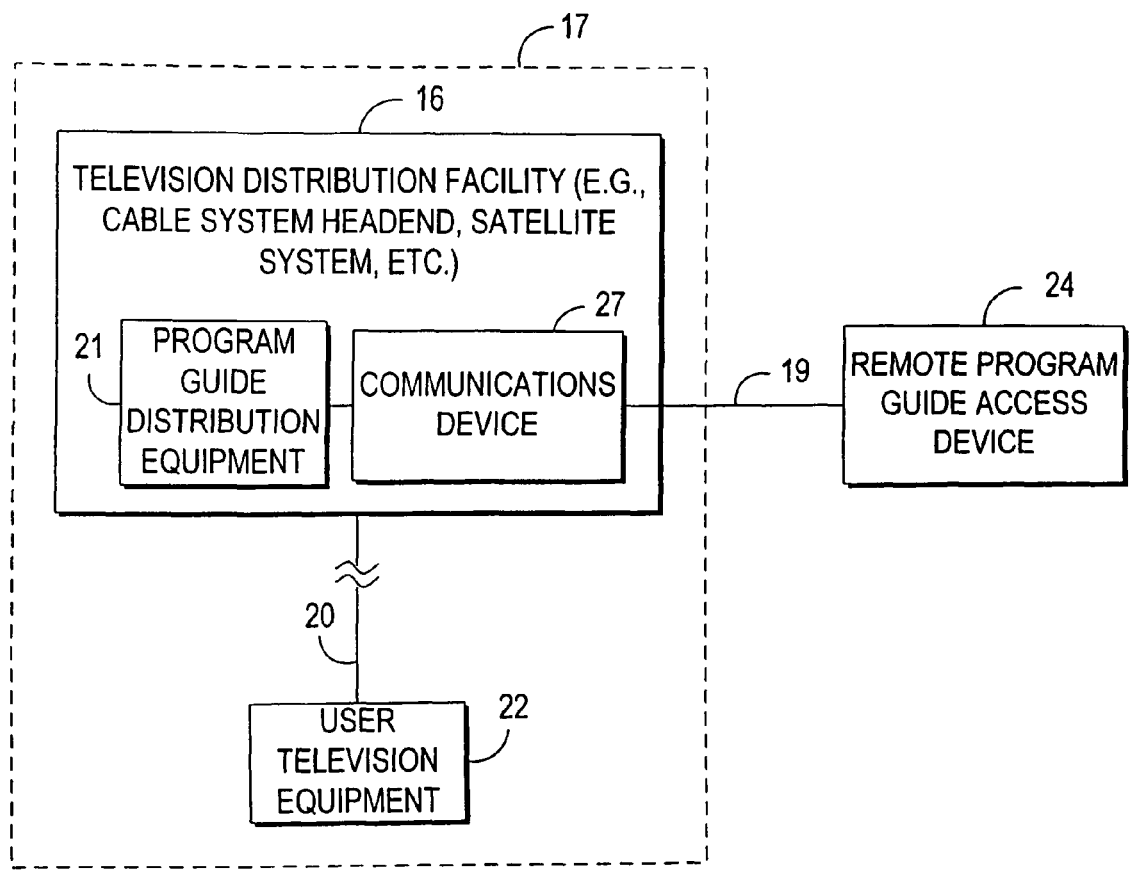

FIGS. 2a and 2b show illustrative arrangements for interactive television program guide equipment 17 and remote program guide access device 24 in systems in which program guide data is provided to user television equipment 22 using a non client-server based approach. For example, program guide data may be provided by television distribution facility 16 to user television equipment 22 in a continuous stream or may be transmitted at a suitable time interval (e.g., once per hour). If transmitted continuously, it may not be necessary to store data locally at user television equipment 22. Rather, user television equipment 22 may extract data "on the fly" as it is needed. If desired, television distribution facility 16 may poll user television equipment 22 periodically for certain information (e.g., pay program account information or information regarding programs that have been purchased and viewed using locally-generated authorization techniques).

In the system configuration of FIG. 2a, remote program guide access device 24 is connected to user television equipment 22. Television distribution facility 16 may distribute program guide data to user television equipment 22. User television equipment 22 may transfer the program guide data to remote program guide access device 24. User television equipment 22 may also transfer additional data that may be necessary for allowing remote program guide access device 24 to access various functions of the interactive program guide (e.g., reminder information, parental control settings, favorite channel settings, user profiles, etc.). Any suitable distribution scheme may be used. For example, user television equipment 22 may provide the data to remote program guide access device 24 continuously, periodically, using a client-server based approach, using a polling scheme, or using any other suitable approach. Remote program guide access device 24 may store the data if suitable for a particular transmission scheme.

In the system configuration of FIG. 2b, remote program guide access device 24 is connected to television distribution facility 16 via communications device 27. In this approach television distribution facility 16 may distribute program guide data to remote program guide access device 24 directly. Television distribution facility 16 may also distribute additional data from user television equipment 22 that may be necessary for allowing remote program guide access device 24 to access various functions of the interactive program guide (e.g., reminder information, parental control settings, favorite channel settings, user profiles, etc.). Television distribution facility 16 may provide the data to remote program guide access device 24 continuously, periodically, using a client-server based approach, using a polling scheme, or using any other suitable approach. Remote program guide access device may store the data if suitable for a particular transmission scheme.

Figure 2C:
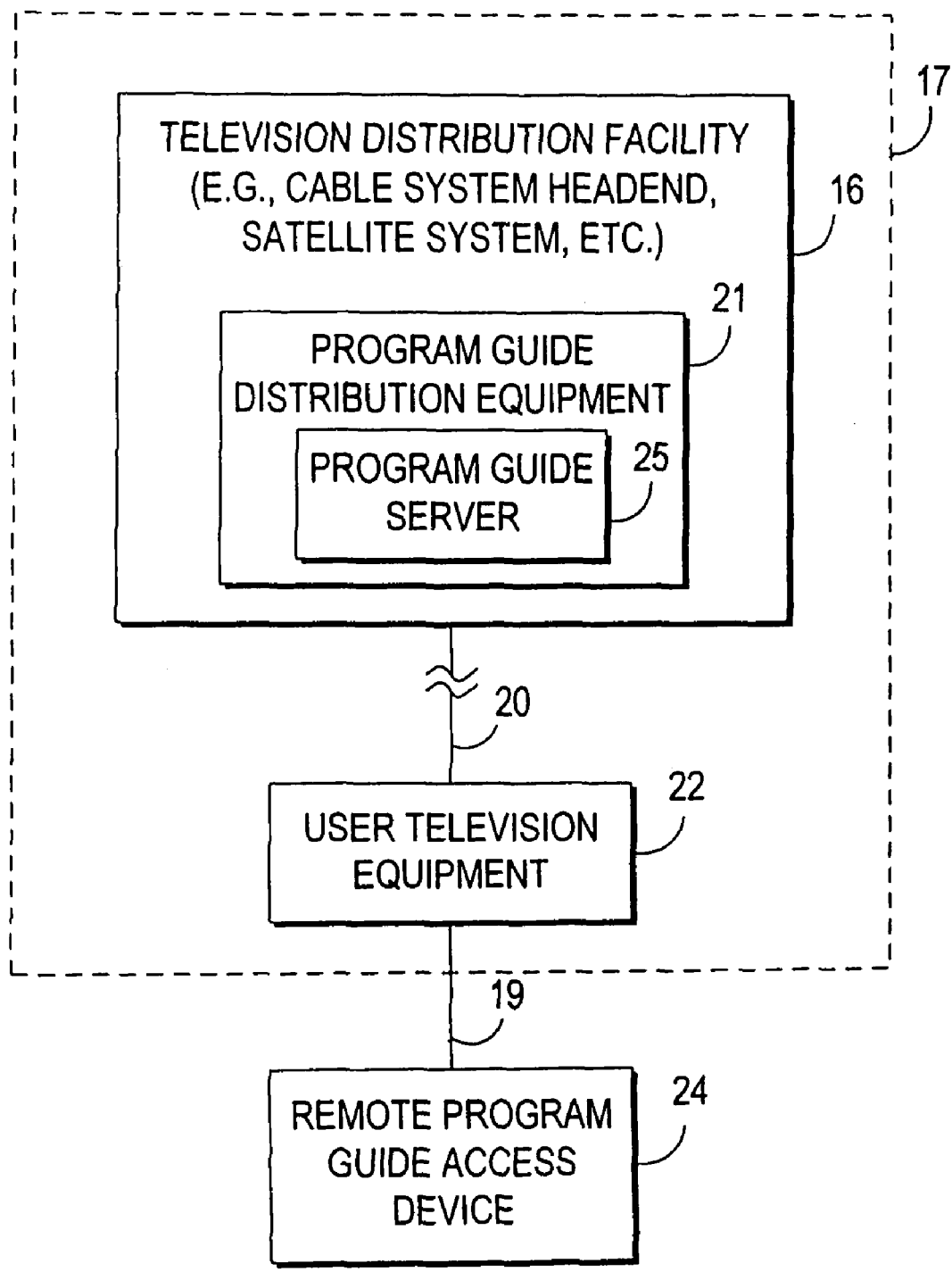
Figure 2D:
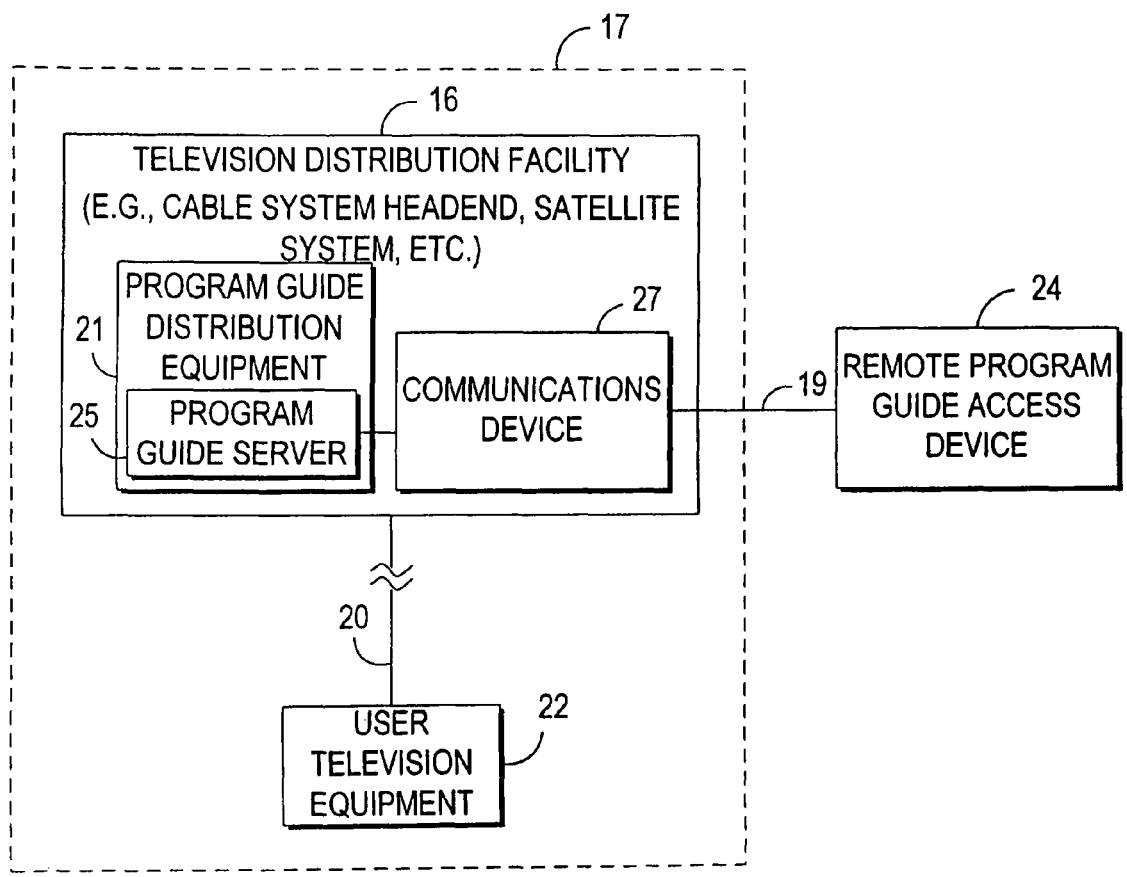

FIGS. 2c and 2d show illustrative arrangements for interactive television program guide equipment 17 and remote program guide access device 24 in client-server based interactive program guide systems. As shown in FIGS. 2c and 2d, program guide distribution equipment 21 may include program guide server 25. Program guide server 25 may be any suitable software, hardware, or combination thereof for providing a client-server based program guide. Program guide server 25 may, for example, generate program guide display screens as digital frames and distribute the frames to user television equipment 22 for display by an interactive program guide client implemented on user television equipment 22. In another suitable approach, program guide server 25 may run a suitable database engine, such a SQL server, and provide program guide data in response to queries generated by user television equipment 22. If desired, program guide server 25 may be located at main facility 12 or at some other facility suitable for providing program guide data via a program guide server (not shown).

Remote program guide access device 24 may, for example, communicate with user television equipment 22 over remote access link 19 as shown in FIG. 2c. Requests, commands, or other suitable communications may be provided by remote program guide access device 24 to user television equipment 22 and then forwarded by user television equipment 22 to program guide server 25. Program guide data or display screens provided by program guide server 25 may be forwarded by user television equipment 22 to remote program guide access device 24.

Alternatively, remote program guide access device 24 may, for example, communicate with program guide server 25 over remote access link 19 via communications device 27 as shown in FIG. 2d. Appropriate commands, requests, or other suitable communications may be transmitted by remote program guide access device 24 for processing by program guide server 25. If any changes to program guide settings are made (e.g., a change to the parental control settings), program guide server may, for example, update a local program guide client running on user television equipment 22 with the necessary information.

In the arrangements illustrated in FIGS. 2b and 2d, television distribution facility 16 may have communications device 27 for communicating with remote program guide access device 24 over remote access link 19. Communications device 27 may be, for example, a communications port (e.g., a serial port, parallel port, universal serial bus (USB) port, etc.), modem (e.g., any suitable analog or digital modem, cellular modem, or cable modem), network interface card (e.g., an Ethernet card, token ring card, etc.), wireless transceiver (e.g., an infrared transceiver or other suitable transceiver), or other suitable communications device.

As shown in FIGS. 1 and 2a-2d, interactive television program guide equipment 17 communicates with remote program guide access device 24 via remote access link 19. In practice, remote program guide access device 24 may be connected to user television equipment 22 (as shown in FIGS. 2a and 2c), television distribution facility 16 (as shown in FIG. 2b), connected to both (as indicated in FIG. 1), or may communicate with remote program guide server 25 (as shown in FIG. 2d) via remote access link 19. Remote access link 19 may be any suitable wired or wireless communications path or paths over which digital or analog communications may take place between interactive television program guide equipment 17 and remote program guide access device 24.

Each user has user television equipment 22 for displaying the television program listings information and other program guide data using a local interactive television program guide. There are typically multiple pieces of user television equipment 22 and multiple associated communications paths 20, although only one piece of user television equipment 22 and communications path 20 are shown in FIGS. 2a-2d to avoid overcomplicating the drawing. Television distribution facility 16 may distribute television programming to user television equipment 22 via communications path 20. If desired, television programming may be provided over separate communications paths (not shown).

For clarity, the present invention is illustrated, unless otherwise indicated, in connection with a system arrangement in which program guide data is distributed from a main facility to an interactive television program guide implemented on user television equipment via a television distribution facility. Other suitable systems involve arrangements in which data is distributed to a program guide on user television equipment using other suitable distribution schemes, such as schemes involving data transmission over the Internet or the like. If desired, the interactive television program guide application may be implemented using a client-server architecture in which the primary processing power for the application is provided by a server located at, for example, the television distribution facility or the main facility (e.g., program guide server 25), and user television equipment 22 acts as a client processor as illustrated by FIGS. 2c and 2d. Alternatively, the interactive television program guide may obtain program guide data from the Internet. On-line program guides are described, for example, in Boyer et al. U.S. patent application Ser. No. 08/938,028, filed Sep. 18, 1997, which is hereby incorporated by reference herein in its entirety.

Figure 3:
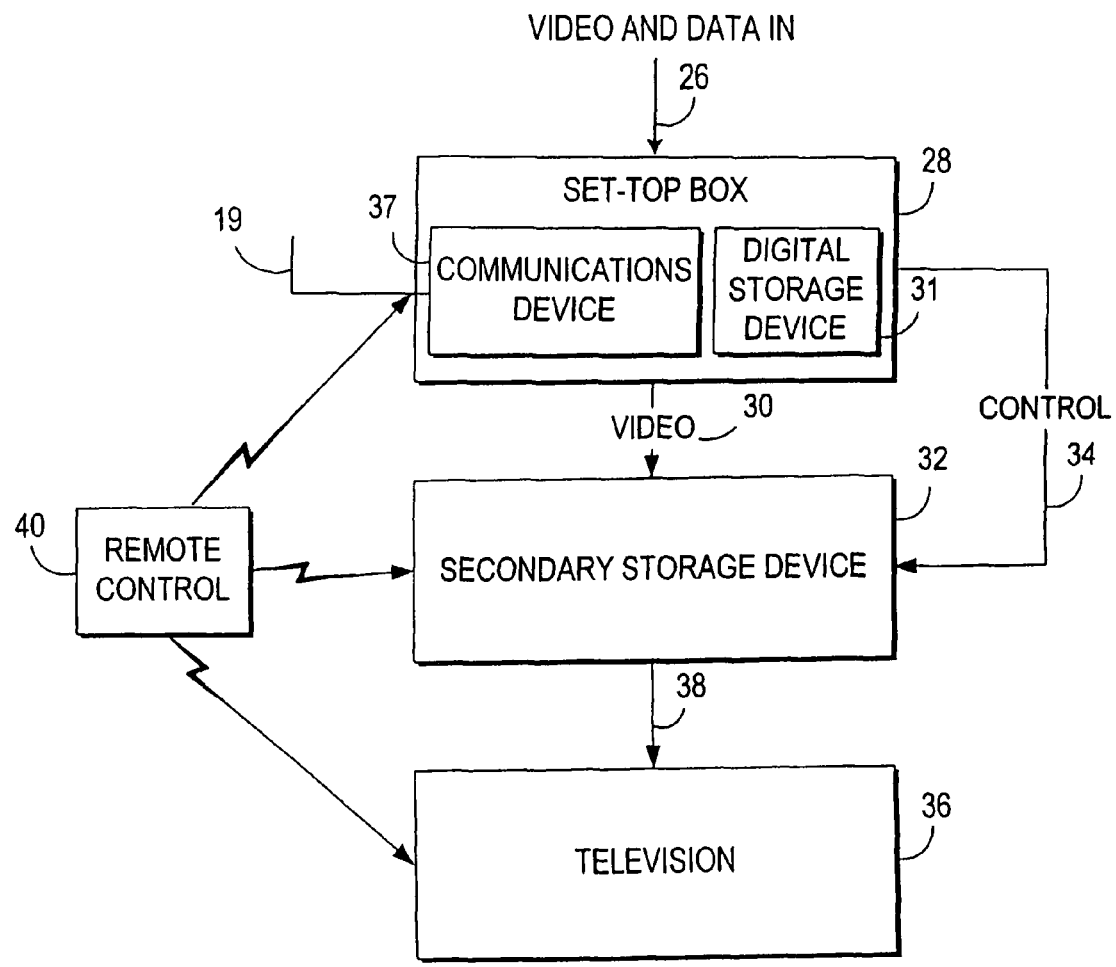
FIG. 3 is an illustrative schematic block diagram of the user television equipment of FIG. 2 in accordance with the principles of the present invention.

An illustrative arrangement for user television equipment 22 is shown in FIG. 3. User television equipment 22 of FIG. 3 receives video and data from television distribution facility 16 (FIG. 1) at input 26. During normal television viewing, the user tunes set-top box 28 to a desired television channel. The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

Secondary storage device 32 can be any suitable type of analog or digital program storage device or player (e.g., a videocassette recorder, a digital video disc (DVD) player, a hard-disk based storage device, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

The interactive television program guide may run on set-top box 28, on television 36 (if television 36 has suitable processing circuitry and memory), on secondary storage device 32 or on optional digital storage device 31 (if they have suitable processing circuitry and memory) or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

If desired, the user may record programs and program data in digital form on optional digital storage device 31. Digital storage device 31 may be a writable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Motion Pictures Expert Group (MPEG) MPEG-2 standard. The resulting data is streamed to digital storage device 31 via an appropriate bus (e.g., a bus using the Institute Electrical and Electronics Engineers (IEEE) 1394 standard), and is stored on digital storage device 31. Digital storage device 31 and secondary storage device 32 may be integrated into a sophisticated set-top box if desired.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which the user has tuned with set-top box 28. Video signals may also be provided to television 36 by set-top box 28 when set-top box 28 is used to play back information stored on digital storage device 31.

Set-top box 28 may have communications device 37 for communicating with remote program guide access device 24 over remote access link 19. Communications device 37 may be, for example, a communications port (e.g., a serial port, parallel port, universal serial bus (USB) port, etc.), modem (e.g., any suitable analog or digital modem, cellular modem, or cable modem), network interface card (e.g., an Ethernet card, token ring card, etc.), wireless transceiver (e.g., an infrared transceiver or other suitable transceiver), or other suitable communications device. Television 36 may also have such a suitable communications device connected to remote access link 19 if desired.

If desired, there may be multiple installations of user television equipment 22 within the home connected via an in-home network. This may provide for coordinating the functionality of multiple guides within the home. Systems in which the functionality of multiple guides are coordinated are described, for example, in concurrently filed Ellis et al. U.S. patent application Ser. No. 09/356,161, filed Jul. 16, 1999, which is hereby incorporated by reference herein in its entirety. In such systems, remote program guide access device 24 may be connected via remote access link 19 to one of the guides and may provide users with the ability to remotely coordinate the functions of all of the guides.

Figure 4:
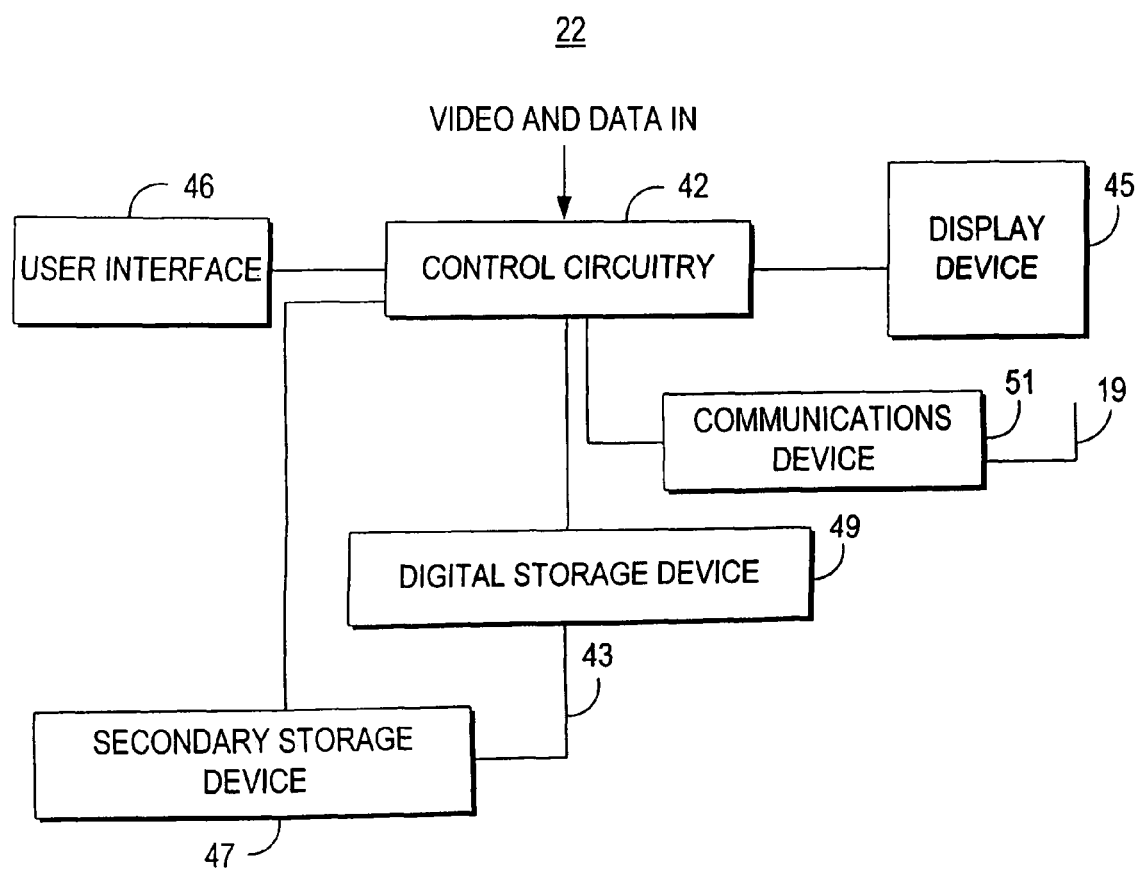
FIG. 4 is a generalized schematic block diagram of portions of the illustrative television equipment of FIG. 3 in accordance with the principles of the present invention.

A more generalized embodiment of user television equipment 22 of FIG. 3 is shown in FIG. 4. As shown in FIG. 4, program guide data from television distribution facility 16 (FIGS. 2a-2d) is received by control circuitry 42 of user television equipment 22. Control circuitry 42 may also send data and commands or requests back to television distribution facility 16. The functions of control circuitry 42 may be provided using the set-top box arrangement of FIGS. 2a and 2b. Alternatively, these functions may be integrated into an advanced television receiver, personal computer television (PC/TV), or any other suitable arrangement. If desired, a combination of such arrangements may be used.

The user controls the operation of user television equipment 22 with user interface 46. User interface 46 may be a pointing device, wireless remote control, keyboard, touch-pad, voice recognition system, or any other suitable user input device. To watch television, the user instructs control circuitry 42 to display a desired television channel on display device 45. Display device 45 may be a television, monitor, or other suitable display device. To access the features of the program guide, the user instructs the program guide implemented on interactive television program guide equipment 17 to generate a main menu or other desired program guide display screen for display on display device 45.

User television equipment 22 of FIG. 4 may also have communications device 51 for supporting communications between user television equipment 22 and remote program guide access device 24 over remote access link 19. Communications device 51 may be a communications port (e.g., a serial port, parallel port, universal serial bus (USB) port, etc.), modem (e.g., any suitable analog or digital standard, cellular, or cable modem), network interface card (e.g., an Ethernet card, Token ring card, etc.), wireless transceiver (e.g., an infrared, radio, or other suitable analog or digital transceiver), or other suitable communications device.

User television equipment 22 may also have secondary storage device 47, digital storage device 49, or any suitable combination thereof for recording programming. Secondary storage device 47 can be any suitable type of analog or digital program storage device (e.g., a videocassette recorder, a digital video disc (DVD), etc.). Program recording and other features may be controlled by control circuitry 42. Digital storage device 49 can be, for example, a writable optical storage device (such as a DVD player capable of handling recordable DVD discs), a magnetic storage device (such as a disk drive or digital tape), or any other digital storage device.

Figure 5:
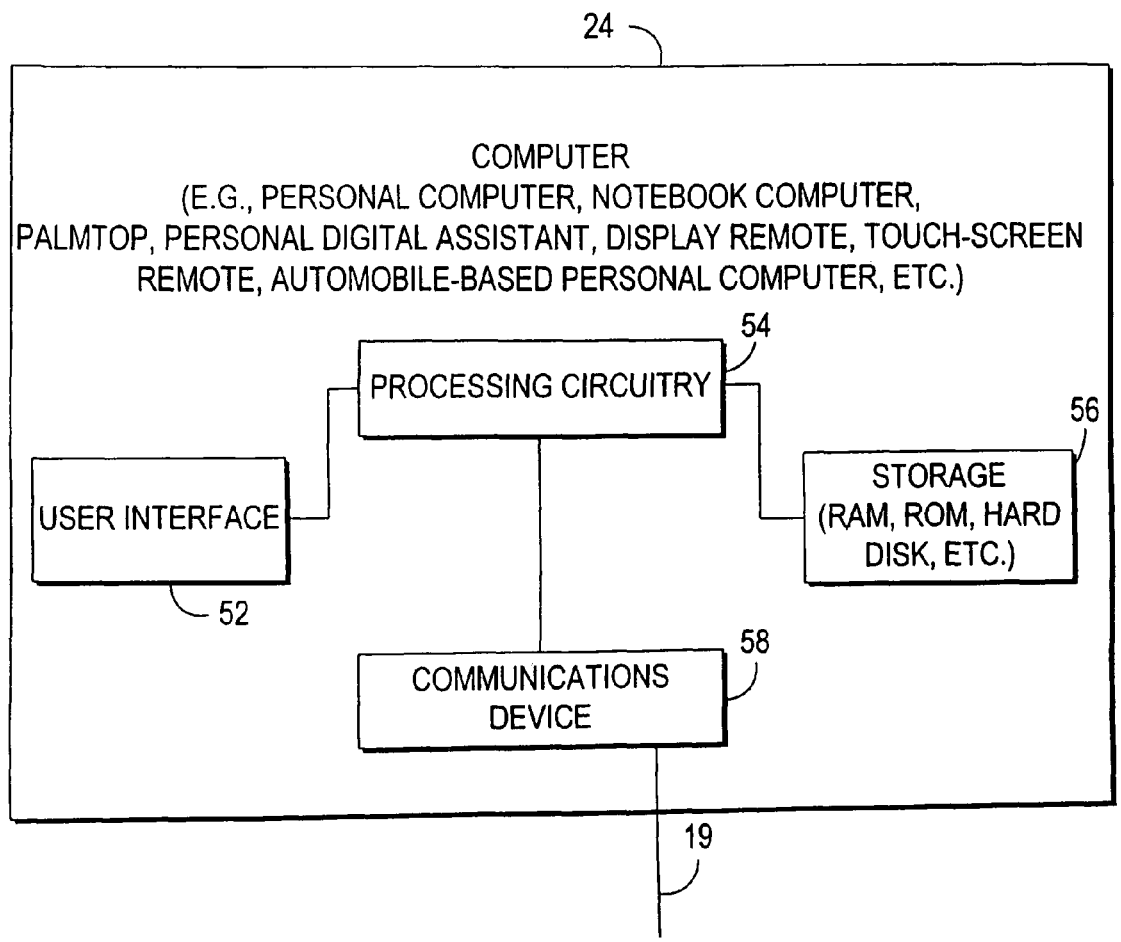
FIG. 5 is a schematic block diagram of an illustrative remote program guide access device in accordance with the principles of the present invention.

An illustrative arrangement for remote program guide access device 24 is shown in FIG. 5. As shown in FIG. 5, remote program guide access device 24 may be any suitable personal computer (PC), portable computer (e.g., a notebook computer), palmtop computer, handheld personal computer (H/PC), display remote, touch-screen remote, automobile PC, personal digital assistant (PDA), or other suitable computer based device. Remote program guide access device 24 may have user interface 52, processing circuitry 54, storage 56, and communications device 58. User interface 52 may be any suitable input or output device or system, and may include a pointing device, keyboard, touch-pad, touch screen, pen stylus, voice recognition system, mouse, trackball, cathode ray tube (CRT) monitor, liquid crystal display (LCD), voice synthesis processor and speaker, or any other suitable user input or output device. Processing circuitry 54 may include any suitable processor, such an Intel 486 or Pentium® microprocessor. Remote program guide access device 24 may also have storage 56. Storage 56 may be any suitable memory or other storage device, such as RAM, ROM, flash memory, a hard disk drive, etc.

Remote program guide access device 24 may also have communications device 58. Communications device 58 may be any device suitable for supporting communications between remote program access device 24 and interactive television program guide equipment 17 over link 19, such as a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, or other suitable analog or digital transceiver), or other suitable communications device.

Remote access link 19 (FIG. 1) may include any suitable transmission medium. Link 19 may include, for example, a serial or parallel cable, a dial-up telephone line, a computer network or Internet link (e.g., 10Base2, 10Base 5, 10BaseT, 100BaseT, 10BaseF, T1, T3, etc.), an in-home network link, an infrared link, a radio frequency link, a satellite link, any other suitable transmission link or suitable combination of such links. Any suitable transmission or access scheme may be used such as standard serial or parallel communications, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), any other suitable transmission or access scheme, or any suitable combination thereof. Preferably remote access link 19 is bidirectional. If desired, however, certain limited program guide functions may be accessed using a unidirectional link. An advantage of using a unidirectional scheme for link 19 is that such schemes are generally less complicated and then less expensive than bidirectional links.

Remote program guide access device 24 and interactive television program guide equipment 17 may communicate over remote access link 19 using any suitable network and transport layer protocols, if desired. Remote program guide access device 24 and interactive television program guide equipment 17 may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, or any other suitable network and transport layer protocols or combination of protocols.

Remote program guide access device 24 may communicate with interactive television program guide equipment 17 using any suitable scheme. Remote program guide access device 24 may, for example, connect to interactive television program guide equipment 17 using a terminal emulation scheme, such as VT100 terminal emulation, and access the interactive television program guide as if it were a "dumb terminal." Remote program guide access device 24 may, for example, run a standard remote access client such as a Windows® Remote Access Services (RAS) client and may connect to a Windows NT® Server process running on interactive television program guide equipment 17. Any suitable combination of hardware and software may be used. In addition to using any of the already mentioned protocols, any number of other access, data-link, network, routing or other protocols may be involved in supporting communications between remote program guide access device 24 and television distribution facility 16 over remote access link 19 (e.g., X.25, Frame Relay, Asynchronous Transfer Mode (ATM), Serial Line Interface (SLIP), point-to-point protocols (PPP), or any other suitable access, data-link, network, routing or other protocol).

Figure 6A:
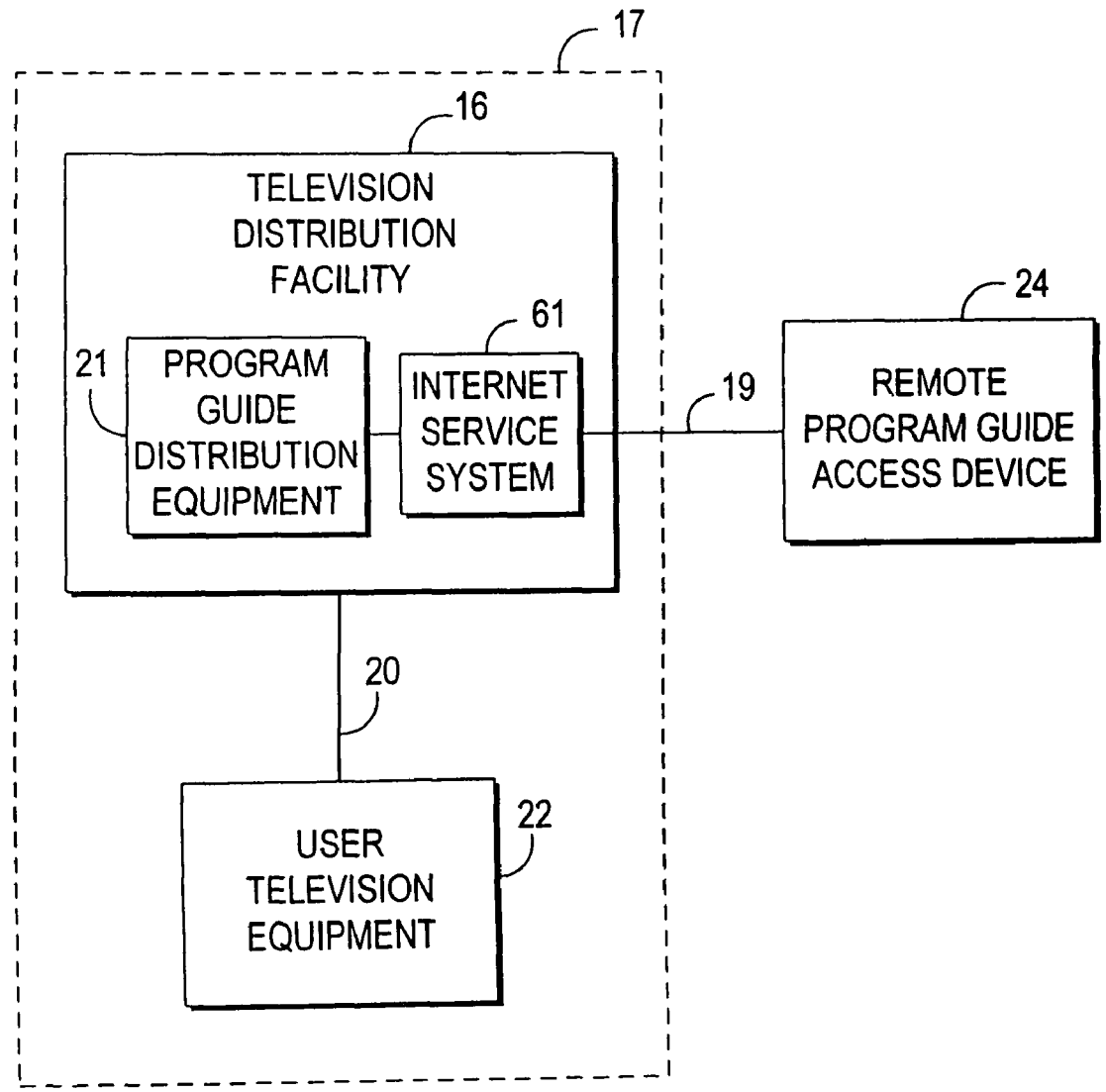
FIGS. 6a, 6b, and 6c are schematic block diagrams of illustrative arrangements for supporting communications between a remote program guide access device and interactive television program guide equipment over an Internet link in accordance with the principles of the present invention.
Figure 6B:
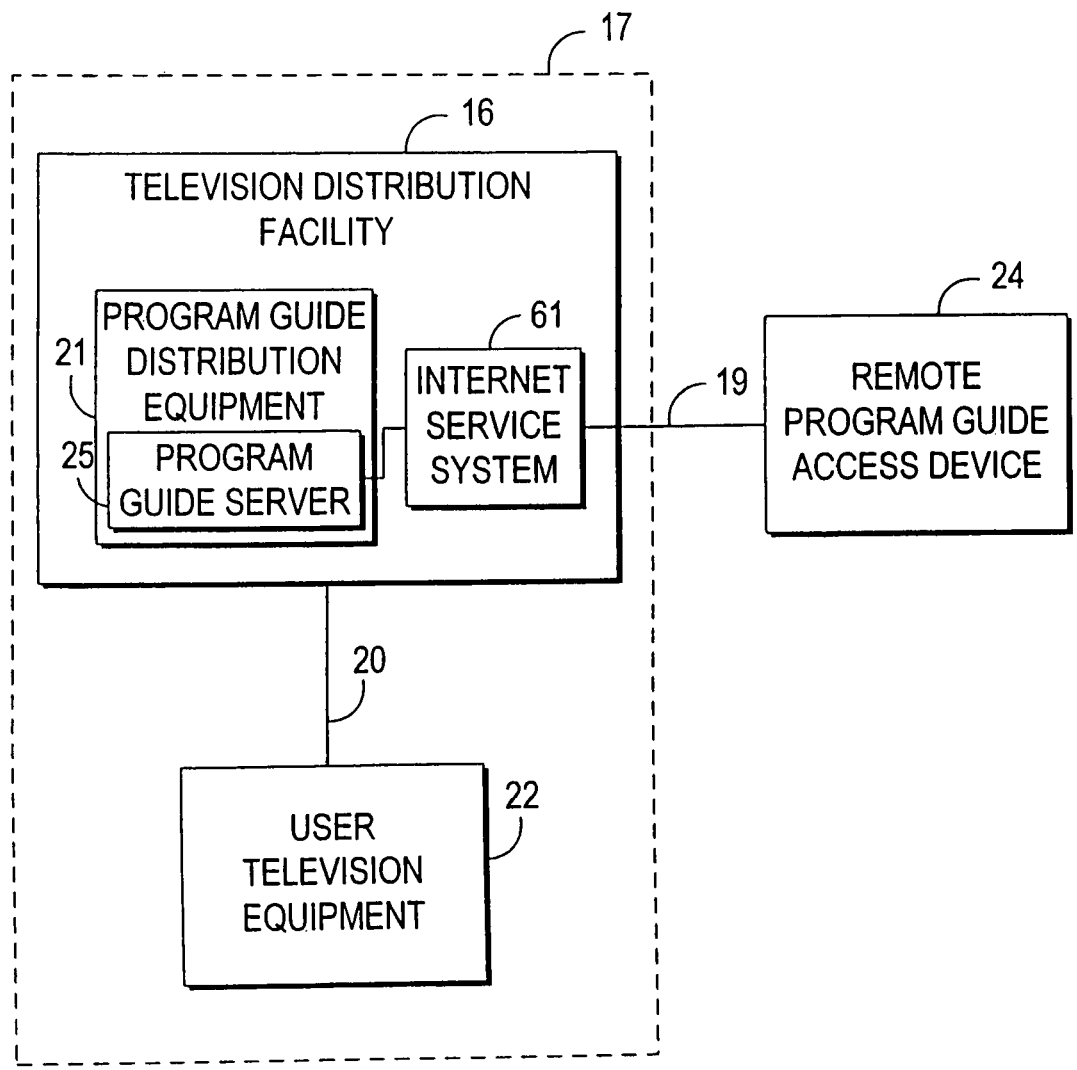

FIGS. 6a and 6b show illustrative arrangements for supporting communications between remote program guide access device 24 and interactive television program guide equipment 17 over an Internet link. Television distribution facility 16 may, for example, include Internet service system

61 for providing Internet-based access to the program guide. Internet service system 61 may be any combination of hardware and software capable of providing an Internet connection to the programming guide. Remote program guide access device 24 may establish an Internet session with Internet service system 61 and thereby obtain program guide data from or set program guide settings with (e.g., set reminders or notifications, view listings, schedule program recording, set favorites, set parental control features, send messages, poll interactive television program guide equipment 17, etc.) the program guide running on interactive program guide equipment 17. If desired, Internet service system 61 may be located at a facility that is separate from television distribution facility 16.

Program guide server 25 may, in turn, interact with the user's client device (e.g., user televison equipment 22). If the program guide is implemented on user television equipment 22 of program guide equipment 17 as shown in FIG. 6a, Internet service system 61 (or other suitable equipment at television distribution facility 16 that is connected to Internet service system 61) may interact with user television equipment 22 directly or via program guide distribution equipment 21 when supporting communications between the program guide and the remote program guide access device. If the program guide implemented on interactive television program guide equipment 17 is a client-server guide as shown in FIG. 6b, Internet service system 61 may interact with program guide server 25 when supporting communications between the program guide and the remote program guide access device 24. Alternatively, Internet service system 61 and program guide server 25 may be the same device or system.

In an illustrative system configuration using Internet service system 61, remote program guide access device 24 is a user's personal computer at work, Internet service system 61 is a web server at a cable system headend, and user television equipment 22 at the user's home contains a set-top box on which the user's program guide is implemented. Using this arrangement, the user may access features of the program guide such as setting reminders or notifications, viewing listings, program recording, setting favorites, parental control, sending messages, polling for status, or any other suitable function. For example, if a child in the user's home desires permission to watch a parentally controlled program while the user is a at work, the user may access a suitable web page provided by Internet service system 61 that allows the user to enter a password and adjust the program guide parental control settings. The changed settings allowing the child access to the desired program are then automatically transferred from Internet service system 61 to user television equipment 22, while the user is still at work.

As another example, the user at work may interact with the program guide on user television equipment 22 via Internet service system 61 to select programs for recording on the user's home videocassette recorder, or to schedule program reminders that will appear on the user's home television or remote program guide access device just before a program is broadcast.

Figure 6C:
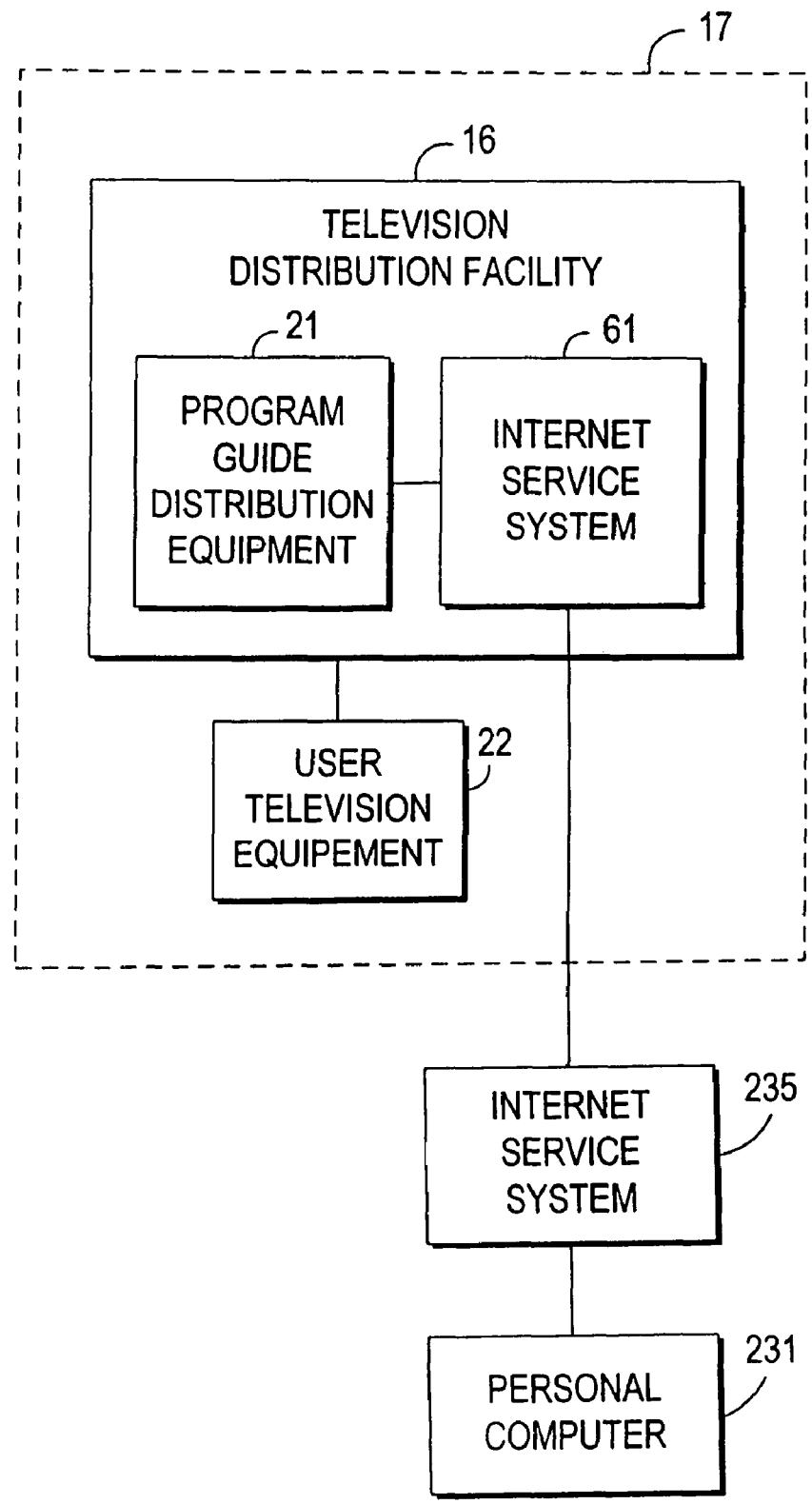

FIG. 6c shows another illustrative arrangement for remote program guide access using the Internet. In the system arrangement of FIG. 6c, users do not directly communicate a local guide via the Internet as with the arrangements of FIGS. 6a and 6b. Instead, users may have personal computer (PC) 231 as their remote access device on which a web browser is implemented for accessing an on-line program guide. On-line program guides are described, for example, in above-mentioned Boyer et al. U.S. patent application Ser. No. 08/938,028, filed Sep. 18, 1997.

Personal computer 231 may be connected to Internet service system 235 via Internet link 233. Internet service system 233 may use any suitable combination of computer hardware and software capable of providing an on-line program guide server application or web site. The user may access a personal web page and set various program guide settings and access various program guide functions. The user may, for example, set favorite channels, set parental control settings, schedule programs for play back or recording by the user's television equipment. After the user has set various program guide settings or accessed various program guide functions via a web page, Internet service system 235 may provide the settings and another program guide information to Internet service system 61 for distribution by program guide server 25 or distribution equipment 21 (as shown) to user television equipment 22. The local guide updates its settings, records programs, plays back programs, or performs any other suitable function accordingly. The local guide may also order pay-per-view programs.

A remote access interactive television program guide may, for example, be implemented on remote program guide access device 24. The remote access interactive television program guide may communicate with the interactive television program guide that is implemented on interactive television program guide equipment 17, herein referred to as a "local" interactive television program guide. The remote access and local guide may, for example, be the same guide but compiled to run on two different platforms and to communicate in a manner or manners discussed herein. Alternatively, the remote access guide may be a client guide that communicates with the local guide (i.e., a server guide). In still another suitable approach, the two guides may be different guides that communicate in a manner or manners discussed disclosed herein. Generally, although not necessarily (e.g., when remote program guide access device 24 is a personal computer as shown in FIG. 6c), the remote access interactive television program guide may have a reduced or limited functionality when compared to the functionality of the local interactive television program guide. Accordingly, the remote access guide may require less processing power and memory of remote program guide access device 24 than the local guide requires of interactive television program guide equipment 17.

Program guide information (e.g., reminder information, listings information, recording information, message information, status information, parental control settings, audio and video, status or polling information, user information, favorites settings, or any other information necessary for remotely providing program guide functionality) may be exchanged, and settings set, between the two interactive television program guides over remote access link 19 using one or more access communications.

Access communications may include, for example, commands, requests, messages, remote procedure calls (e.g., using a proxy-stub pair), or any other suitable client-server or peer-to-peer communication. Access communications may also involve, for example, complex communications between application constructs running on remote program guide access device 24 and interactive television program guide equipment 17. Objects running in the two versions of the program guides, for example, may communicate using an Object Request Broker (ORB). The program guide information may, for example, be encapsulated as component object model (COM) objects and persisted to files that are transmitted over remote access link 19. In another approach, access communications may include HTML formatted markup language documents (e.g., web pages), that are exchanged between remote program guide access device 24 and interactive television program guide equipment via Internet service system 61.

Program guide information may be transferred, and program guide settings set, between remote program guide access device 24 and interactive television program guide equipment 17 using any suitable application layer protocol if desired. If link 19 is an Internet link, for example, program guide functionality may be accessed by, for example, using the Hypertext Transfer Protocol (HTTP). Remote program guide access device 24 and interactive television program guide equipment 17 may, for example, transfer program guide information as files using the File Transfer Protocol (FTP) or Trivial File Transfer Protocol (TFTP), running over a TCP/IP protocol stack. Any suitable file transfer protocol based on any suitable protocol stack may be used.

Remote program guide access device 24 and interactive television program guide equipment 17 may also exchange program guide data and other information as messages using any suitable messaging scheme or messaging application programming interface (API). Program guide data and other information may, for example, be encapsulated into e-mail messages and transferred using the Simple Mail Transfer Protocol (SMTP), Messaging API (MAPI), or other suitable messaging protocol or API.

Remote program guide access device 24 and the interactive television program guide implemented on interactive program guide equipment 17 may exchange access communications to provide the user with access to program guide functionality as if the program guide were running locally on remote program guide access device 24. Remote program guide access device 24 may provide a user with access to any number of program guide functions such as accessing programming information, scheduling reminders for programs, setting and navigating through favorite channels, setting parental control settings, scheduling programming recordings, or any other program guide function to the extent allowed by the resources of remote program guide access device 24. If desired, remote program guide access device 24 may allow the user to perform other program guide functions, such as determining the status of user television equipment 22, sending messages to user television equipment 22, interacting with peripherals connected to user television equipment, and other suitable functions.

When the user wishes to access the features of the program guide via remote program guide access device 24, the user may issue an appropriate command using user interface 52 (FIG. 5). For example, if the user wishes to view programming information, a "guide" key on user interface 52 can be used. If, for example, user interface 52 includes a microphone and uses suitable voice recognition software, the user may speak a predetermined command into the microphone. Such an interface is especially useful in environments where remote program guide access device 24 must be operated without the use of one's hands, as with an automobile PC.

When possible, remote program guide access device 24 may present program guide data and other information to the user as they are normally presented by user television equipment 22. In practice, appropriate differences in presentation may occur depending on the interface devices used in user television equipment 22 and remote program guide access device 24 (e.g., user television equipment 22 may use a television to output listings and remote program guide access device 24 may include a voice recognition and synthesis system to output synthesized voice listings).

When a user indicates a desire to access program guide features by issuing an appropriate command to remote program guide access device 24, remote program guide access device 24 may, for example, access stored program guide information or obtain program guide information from interactive television program guide equipment 17 via remote access link 19 using any of the approaches already described, and generate an appropriate display screen for display using user interface 52. Alternatively, the local interactive television program guide implemented on interactive television program guide equipment 17 may receive one or more access communications from remote program guide access device 24 over link 19, generate the appropriate program guide display screen, and send the program guide display screen back to remote program guide access device 24 for display on user interface 52. In another embodiment, a remote access guide may run on remote program guide access device 24 and issue access communications over remote access link 19 as if it were running as a client locally on interactive television program guide equipment 17. In another embodiment, remote program guide access device 24 may access a web site and view web pages that contain program guide information.

The remote access program guide running on remote program guide access device 24 may provide a user with an opportunity to remotely access program listings. A person driving an automobile, for example, may issue a suitable vocal command that is recognized by interface 52. The remote access program guide may issue one or more access communications to the local program guide, which in turn supplies program listings information back to remote program guide access device 24. User interface 52 may, for example, provide the listings to the user in synthesized voice outputs.

Figure 7:
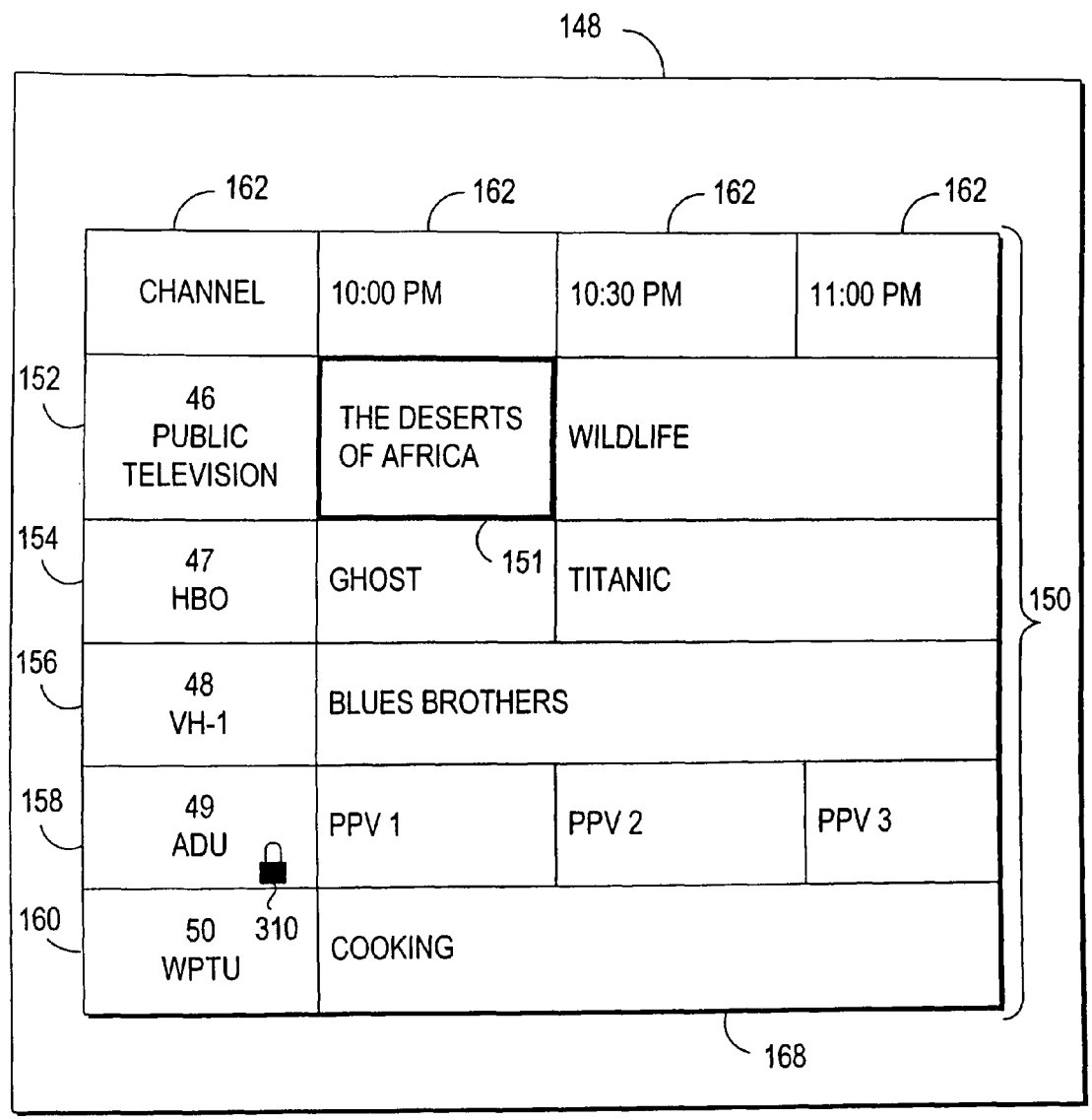

The program listings may also, for example, be displayed in a program listings screen by a suitable display device. A program listings screen may contain one or more lists of programs organized according to one or more organization criteria (e.g., by program type, theme, or any other predefined or user defined and selectable criteria) and sorted in various ways (e.g., alphabetically). One approach is to organize program listings into a program listings grid. As shown in FIG. 7, program listings display screen 148 may contain program listings area 168. Program listings area 168 may display television program listings in any suitable format, such as any suitable list, table, or grid.

FIG. 7 illustrates the display of program listings in program listings grid 150. Program listings grid 150 may be divided into a number of columns 162 which correspond to program broadcast times and which may be equally spaced apart (e.g., in thirty-minute steps). Program listings may be displayed in the grid in sub-sets according to predefined or selectable organization criteria and sorted in various ways. Program listings row 152 contains, for example, selectable program listings for THE DESERTS OF AFRICA and WILDLIFE on channel 46 (Public Television). Program listings row 154 contains, for example, selectable program listings for GHOST and TITANIC on channel 47 (HBO). Program listings row 156 contains, for example, selectable program listings for programs BLUES BROTHERS on channel 48 (VH-1). Program listing row 158 contains selectable program listings for programs, PPV 1, and PPV 2 on channel 49 (ADU). Program listings row 160 contains a selectable program listing for COOKING on channel 50 (WPTU). The programs on each channel are typically different.

Program listings grid 150 may have movable cell highlight region 151, which highlights the current grid cell. The user may position highlight region 151 by entering appropriate commands with user interface 52. For example, if user input interface 52 has a keypad, the user can position highlight region 151 using "up," "down," "left," and "right" cursor keys. Remote program listings may also be panned left, right, up, and down by positioning highlight region 151 using the cursor keys on user interface 52. Alternatively, a touch sensitive screen, trackball, voice commands, or other suitable device may be used to move highlight region 151 or to select program listings without the use of highlight region 151. In still another approach, the user may speak the title of a television program listing into a voice request recognition system which will issue an appropriate command or request to remote program guide access device 24. Any other suitable approach may also be used.

After a user selects a program listing, the remote access program guide may provide the user with the opportunity to access a number of program guide features. For example, the user may access additional information (typically text or graphics, but possibly video if desired) about the listing, schedule an associated program reminder, schedule an associated program for recording by one or more of digital storage device 31 (FIG. 3), secondary storage device 32 (FIG. 3), storage 56 (FIG. 5), or program guide server 25.

Program listings may also be displayed for the user in a list. FIG. 8 illustrates a program listings display screen having a program listings list displayed in accordance with the principles of the present invention. Scrollable program listings lists may display program listings in subsets according to predefined or user-selected organization criteria. Any suitable organization criteria and sorting scheme may be used. Scrollable program listings list 170 of FIG. 8, for example, organizes program listings according to program type and then sorts the listings alphabetically in each subset. The television program listings display screen of FIG. 8 also has movable cell highlight region 171 for moving within the list and selecting listings.

The remote access program guide may also provide a user with the opportunity to remotely schedule program reminders when the user indicates a desire to set a program reminder (e.g., by pressing a "reminder" button on user interface 52, selecting an on screen "reminder" button, issuing an appropriate vocal command, etc.). The remote access program guide may transmit one or more access communications to the local interactive television program guide implemented on interactive television program guide equipment 17 to schedule the reminder. Alternatively, the remote access program guide may, for example, store a reminder locally on storage 56 of remote program guide access device 24 (FIG. 5). Information indicating the user who set the reminder may also be stored on interactive program guide equipment 17 or storage 56. Reminders may also be scheduled by a user with the local guide, transmitted to remote program guide access device 24, and displayed by the remote access guide on remote program guide access device 24.

At an appropriate time before the selected program is scheduled to air (e.g., a predefined user-selectable number of minutes, hours or days), a reminder may be issued by the local or remote interactive television program guides, or both. The reminder may be issued on all remote program guide access devices 24 available to the user, and may be displayed (e.g., in the form of a pop-up window or message) on user television equipment 22. If a reminder for a program is to be displayed on the user's home television, the reminder may be displayed just before the beginning of the program. If a reminder for a program is to be displayed on remote program guide access device 24, the reminder may be displayed much earlier (e.g., several hours before the program).

Figure 9:
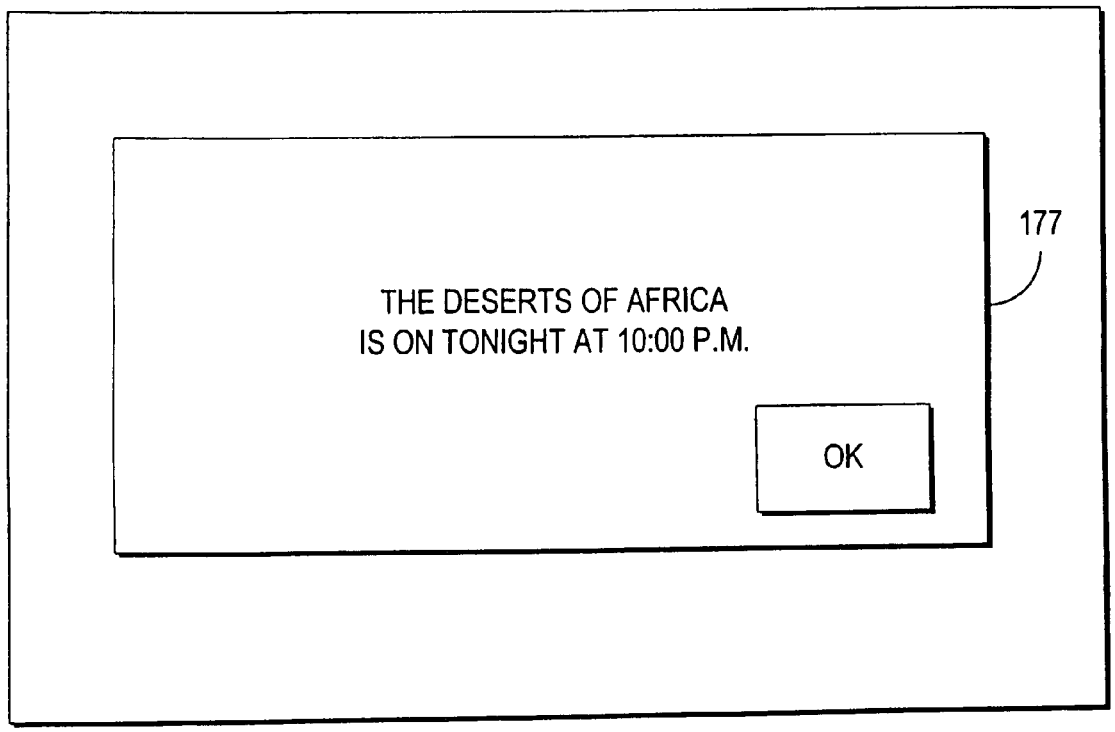
FIG. 9 is an illustrative program reminder for display by interactive television program guide equipment or a remote program guide access device in accordance with the principles of the present invention.

In another approach, reminders may be sent as e-mail messages from the interactive television program guide to remote program guide access device 24. Interactive program guide systems in which reminders are sent to users via e-mail are described, for example, in Boyer et al. U.S. patent application Ser. No. 08/987,740, filed Dec. 9, 1997, which is hereby incorporated by reference herein in its entirety. In still another approach, user interface 52 may include an alphanumeric pager (among other suitable devices for providing bi-directional communications with the program guide via remote access link 19). The interactive program guide implemented on interactive television program guide equipment 17 may phone an automatic paging service (e.g., by using a suitable modem and communications software), and issue a message similar to the one contained in notification 177. An illustrative reminder 177 for display on display device 45 (FIG. 4) or user interface 52 (FIG. 5) is shown in FIG. 9.

The remote access program guide may also provide a user with the opportunity to remotely access and adjust the parental control settings of the local interactive television program guide implemented on interactive television program guide equipment 17. The remote access program guide, for example, may provide users with an opportunity to block potentially objectionable programs or channels using a parental control code (e.g., a personal identification number (PIN) code). Users my also selectively unlock blocked channels or programs. If desired, the user may remotely access parental control settings related to blocking the display of potentially objectionable program listings.

The remote access program guide may obtain parental control information (e.g., which channels, services, programs, genres or types of program listings may be locked, maximum rating information, PIN information, etc.), from the local program guide implemented on interactive television program guide equipment 17 over remote access link 19 in any suitable manner. Remote program guide access device 24 may, if desired, store parental control information on storage 56. Information indicating the user who accessed and adjusted parental control settings may be stored by the program guide or remote program guide access device 24.

Remote program guide access device 24 may provide a user with the opportunity to remotely parentally control television programming by, for example, providing the user with the opportunity to select a television program listing and issue an appropriate command using user interface 52 (e.g., by pressing a displayed "lock" button, using a pointing device or touch sensitive screen, issuing an appropriate vocal command, etc.). Remote program guide access device 24 may indicate to a user that a channel, service, program, or genre is locked by, for example, generating an appropriate notice, icon, synthesized voice response, message, or any other suitable indication. FIGS. 7 and 8 illustrate the use of lock icon 310 for indicating, for example, that television service ADU is locked.

The remote access program guide may also provide users with an opportunity to remotely access interactive television program guide functionality related to user preferences or "favorites" settings. For example, remote program guide access device 24 may access features for setting-up and navigating through favorite channels or programs. Interactive television program guide systems in which program guide data is displayed according to preference profiles are described, for example, in Ellis et al. U.S. patent application Ser. No. 09/034,934, filed Mar. 4, 1998, which is hereby incorporated by reference herein in its entirety.

The remote access program guide may obtain information on the user's preferences (e.g., which channels or programs are favorites, favorite themes, likes and dislikes etc.) from the local interactive television program guide implemented on interactive television program guide equipment 17 in any suitable manner. The remote access program guide may, if desired, store favorites information on storage 56 (FIG. 5), may provide the user with an opportunity to remotely adjust channel settings and other preferences based on the favorites information. Remote program guide access device 24 may transmit changed or new favorites information to interactive television program equipment 17 via remote access link 19 using one or more access communications. Information indicating the user who changed the profiles may also be stored by the local or remote access program guides.

The information on the user's preferences may be used by the local and remote access interactive program guides to navigate through favorite channels and display television program listings. FIG. 10 shows an illustrative program listings display screen that may be displayed by the remote access program guide on remote program guide access device 24 using user interface 52. The display screen includes a number of channels that have been selected as favorites (e.g., channels 2, 4, 7, 47 and 48). Alternatively, remote program guide access device 24 may, for example, display television program listings in a grid, table, or list while highlighting favorite channels or preferred programs. A user may be provided with the opportunity to "scroll" between favorite listings or channels by issuing an appropriate command using user interface 52. In still another suitable approach, remote program guide access device 24 may display program guide data for only those programs or channels that are of interest to users as defined by the profiles.

User preference profiles may also be used to limit the amount of data provided to remote program guide access device 24 and thereby tend to minimize the bandwidth requirements of remote access link 19. Data filtering may be performed, for example, by the local interactive guide according to the user profiles when transferring data to remote program guide access device 24. Only data for those programs or channels that are of interest to the user may be transferred if desired. Alternatively, data filtering may be performed, for example, by program guide server 25 or Internet service system 61.

The remote access program guide may also provide the user with the opportunity to remotely schedule recordings using the local interactive program guide. The user may, for example, select a program listing using user interface 52 (FIG. 5) and issue an appropriate command (e.g., pushing an on-screen "button," issuing an appropriate voice command, etc.). The remote access program guide may respond by sending one or more access communications to the local interactive program guide implemented on interactive television program guide equipment 17 with the remote program guide access device 24 to record the program associated with the selected listing when the program is aired. The local program guide may store the program on secondary storage device 32, digital storage device 31, or on storage 56 of remote program guide access device 24. Information indicating the user who scheduled a program for recording may also be stored by the program guide or remote program guide access device 24. If the programming is stored on storage 56, it may be transmitted to remote program guide access device 24 in any suitable format (e.g., as National Television Standards Committee (NTSC) video, as MPEG-2 files, etc.), and may be converted to a digital format by a suitable analog to digital converter in remote program guide access device 24 if necessary (not shown). Any suitable transmission scheme may be used, such as using FTP if files are transferred, for example, across an Internet link. Programs may also be recorded by program guide server 25. Program guide systems in which user selected programs are stored by a program guide server are described, for example, in above-mentioned Ellis et al. U.S. patent application Ser. No. 09/332,244, filed Jun. 11, 1999.

If desired, program series may be recorded. Interactive television program guide systems in which program series are recorded are described, for example, in Knudson et al. U.S. patent application Ser. No. 09/330,792, filed Jun. 11, 1999, which is hereby incorporated by reference herein in its entirety.

Program guide information may also be stored by the remote access interactive television program guide on storage 56. User settings and profiles, video clips, and detailed descriptive information may also be stored. Storing programming or data on storage 56 may be appropriate in situations, for example, where the data is required to be maintained across a power outage, or if the volume of data that the interactive program guide must store during normal operation is more than interactive television program guide equipment 17 can handle.

The remote access program guide may also provide a user with an opportunity to remotely order pay-per-view programs and packages. The remote access program guide may, for example, provide the user with an opportunity to select a pay-per-view program or package listing using user interface 52 (e.g., by using a pointing device, touch sensitive screen, or issuing a voice command to select a pay-per-view program listing). In response to the user command, remote program guide access device 24 may obtain pay-per-view information (e.g., price, ordering information, time, event code, etc.) from the interactive television program guide running on interactive television program guide equipment 17, via remote access link 19. Alternatively, the pay-per-view information may have been provided to remote program guide access device 24 by the local guide, program guide server 25, or Internet Service system 61.

The remote access program guide may provide the pay-per-view information to the user using user interface 52, and may provide the user with the opportunity to order the pay-per-view selection. Once the user issues an appropriate command to remote program guide access device 24 to order the pay-per-view selection, the remote access guide on remote program guide access device 24 may indicate to the local guide implemented interactive program guide equipment 17 (e.g., via one or more access communications) the program that the user wishes to order. The local interactive program guide may respond by ordering the pay-per-view program from television distribution facilitating 16 or some other distribution facility. Alternatively, the remote access program guide may order the pay-per-view program from television distribution facility 16 (or some other distribution facility) and indicate the ordered pay-pay-view to the local guide so that ordering related functions may be coordinated.

Remotely ordering pay-per-view programs via the local interactive guide as opposed to ordering pay-per-view programs directly from a headend by phone, internet, or impulse ordering using the remote access guide may allow the local program guide to perform functions that it would not ordinarily be able to perform. Ordering a pay-per-view through the local guide as opposed to directly from television distribution facility 16 may allow the local guide to, for example, parentally control the ordering of a program, inform the user that the program is about to start, inform the user that the user has missed an ordered pay-per-view program, provide the user with an opportunity to reorder the program, or any other suitable function associated with ordering a pay-per-view program.

The remote access program guide may also provide the user with an opportunity to remotely access video and audio (either together or separately) that is being distributed to the local interactive television program guide or which has been stored by the local interactive television program guide on user television equipment 22 or at a remote server. In response to an appropriate user command on user interface device 56, the remote access program guide may, for example, query the interactive television program guide for media directory information stored on digital storage device 31 or secondary storage device 32. Interactive television program guides which store programming using a digital media directory are described, for example, in the previously mentioned Ellis et al. U.S. patent application Ser. No. 09/157,256.

The remote access program guide may provide the user with the opportunity to select a directory entry or may, for example, provide the user with an opportunity to select a program listing of a television program that is being broadcast. In response to either selection, the remote access program guide may issue an appropriate access communication to the interactive television program guide to play back or tune to the selection and transmit it back to remote program guide access device 24 over remote access link 19. Remote program guide access device 24 may play the video or audio for the user. In one approach, for example, remote program guide access device 24 may provide a user with the opportunity to access audio from a digital music channel which is received by interactive television program guide equipment 17, and play the audio on a speaker or by using an audio device that may be contained in user interface 52 (e.g., a car stereo).

Video and audio may be transmitted from interactive television program guide equipment 17 to remote program guide access device 24 over remote access link 19 in any suitable format (e.g., as NTSC video, as MPEG-2 files, using the M-bone, etc.), and may be converted to a digital format if necessary by a suitable analog to digital converter in remote program guide access device 24 (not shown). Any suitable transmission scheme may be used.

The remote access program guide may also provide a user with the opportunity to poll the local interactive television program guide to determine the status of interactive television program guide equipment 17 or, more specifically, user television equipment 22. For example, the remote access program guide may obtain information regarding whether the interactive television program guide is in use, what channel user television equipment 22 is tuned to, the title of the current program, the rating of the current program, the status of remote access link 19, available devices, etc. Any suitable scheme may be used, such as using a Simple Network Management Protocol (SNMP) approach in which a management client process runs as part of the interactive television program guide implemented on interactive television program guide equipment 17, and in which a management server process runs on remote program guide access device 24.

Figure 11:
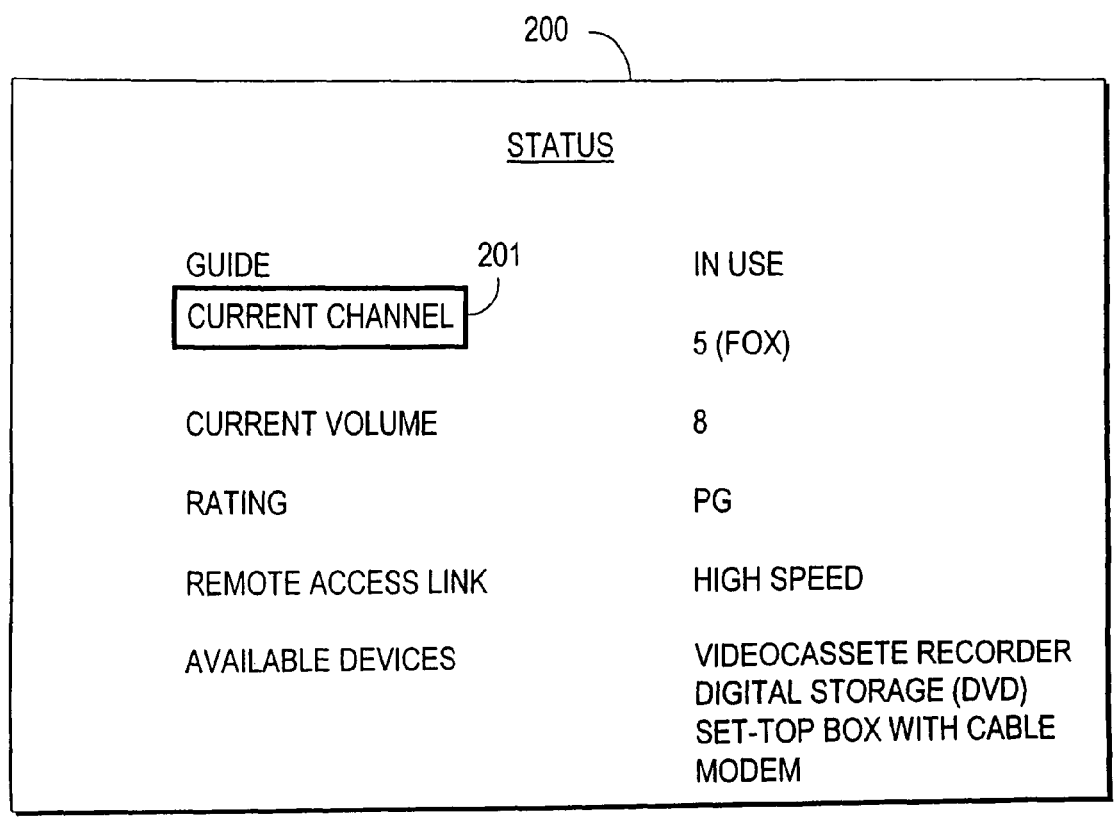
FIG. 11 is an illustrative status display screen for display by a remote program guide access device in accordance with the principles of the present invention.

When the user issues an appropriate command using user interface device 56 (e.g., by pressing a button on a key pad, selecting an on-screen option or button, issuing an appropriate voice command, etc.), the remote access program guide may respond by issuing an access communication to the interactive program guide over remote access link 19 using remote program guide access device 24. The interactive program guide may respond by transmitting the desired status information back to remote program guide access device 24 over remote access link 19, or by transmitting a display screen (if appropriate). The remote access program guide may indicate the status of interactive television program guide equipment 17 on remote program guide access device 24 using any suitable indicator (e.g., a display screen, synthesized voice responses, etc.). An illustrative status display screen 200 for display using user interface 52 is shown in FIG. 11.

The remote access program guide may also provide a user with an opportunity to control user television equipment 22 remotely. A user may, for example, position highlight region 201 over a setting, select the setting, and change its value. The user may, for example, change the current channel, the current volume, or control user television equipment 22 in any other suitable manner.

The remote access program guide may also provide a user with the opportunity to send audio, graphical, and text messages to the local interactive program guide for playing or display by user television equipment 22. For example, the remote access program guide may receive a voice message from the user using user interface device 24. That voice message may be converted to a digital signal by an analog-to-digital converter in remote program guide access device 24 if necessary, and sent to the interactive television program guide over remote access link 19. Once received, the local interactive television program guide may play (or display) the message on user television equipment 22. If desired, messages created by a user on the local interactive television program guide or by an operator of television distribution facility 16 may be sent to remote program guide access device 24. The remote access program guide may in turn provide the messages to the user using remote program guide access device 24.

FIGS. 12-24 are illustrative flow charts of steps involved in providing remote access to functions of a local interactive television program guide in accordance with the principles of the present invention. The steps shown in FIGS. 12-24 are illustrative and may be performed in any suitable order. Moreover, in practice it may be desirable to combine or delete various steps or combinations of steps shown in the flow charts.

Figure 12:
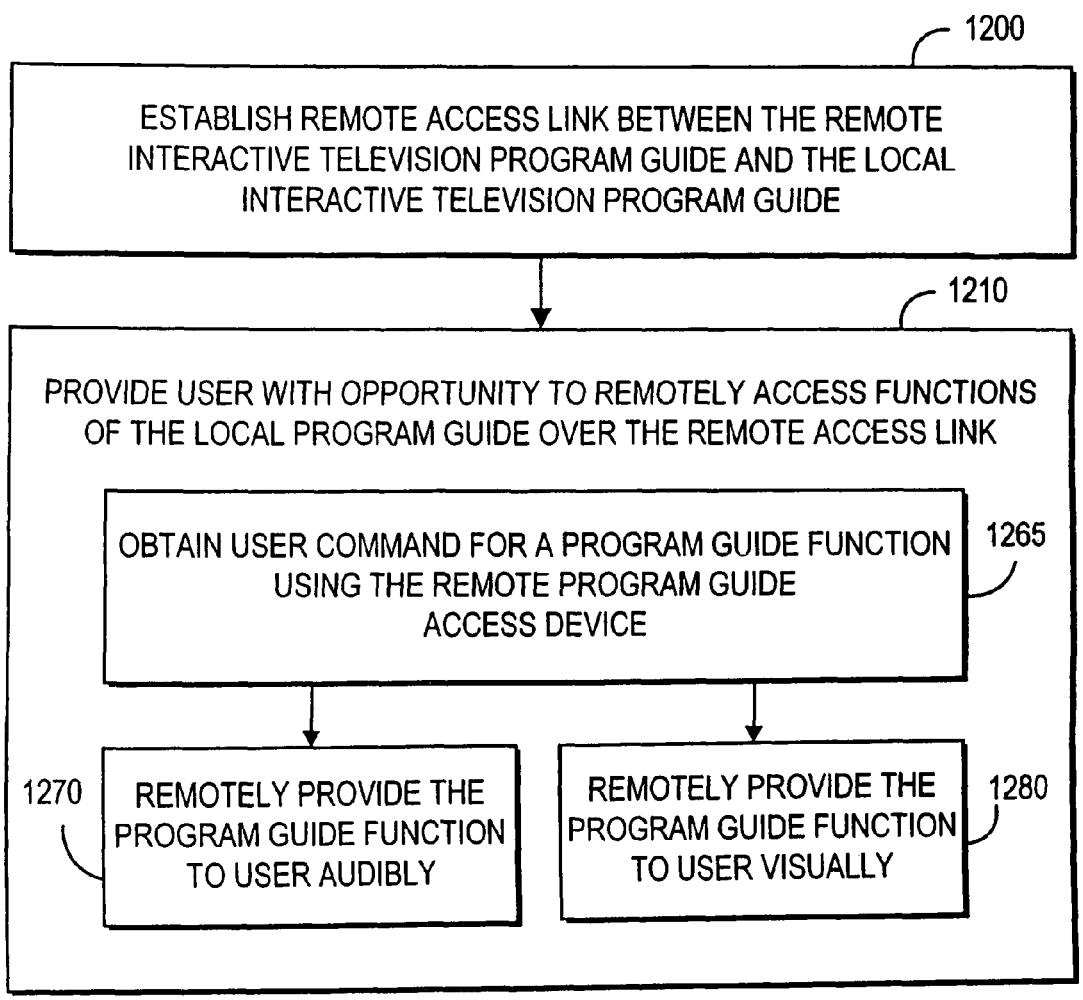
FIGS. 12-23 are illustrative flow charts of steps involved in providing remote access to interactive television program guide features in accordance with the principles of the present invention.

FIG. 12 shows illustrative steps involved in providing remote access to the various program guide functions. At step 1200, a remote access link is established between the remote access program guide implemented on remote program guide access device 24 and the interactive television program guide implemented on interactive television program guide equipment 17 using remote access link 19. At step 1210, the remote access program guide provides the user with the opportunity to remotely access functions of the interactive program guide over the remote access link.

The remote access program guide may, for example, obtain a user command from the user that indicates a desired program guide function using remote program guide access device 24 (substep 1265) and then remotely provide the indicated program guide function to the user. A user may indicate a desired function by entering an appropriate command using user interface 52. The user may, for example, enter a command using a keyboard, speak a command into a microphone, select an on-screen button using a pointing device, or any other suitable approach.

The indicated program guide function may be remotely provided to the user audibly (substep 1270) using, for example, a speaker, car stereo, or other device capable of producing sounds that suitably indicate to the user program guide information. Alternatively, the indicated program guide function may be remotely provided to the user visually (at substep 1280), for example, by using a monitor, LCD, or other display device.

Establishing the remote access link between the remote access program guide and the local interactive television program guide implemented on interactive television program guide equipment 17 as indicated by step 1200 and providing the user with an opportunity to remotely access functions of the local interactive television program guide over remote access link 19 (step 1210) may depend on the configuration of the interactive television program guide system. FIGS. 13a-13e show illustrative variations of steps 1200 and 1210 of FIG. 12 for establishing remote access link 19 and for providing the user with remote access to program guide functions for the illustrative systems 10 of FIGS. 2a-2d and FIGS. 6a-6c.

Figure 13A:
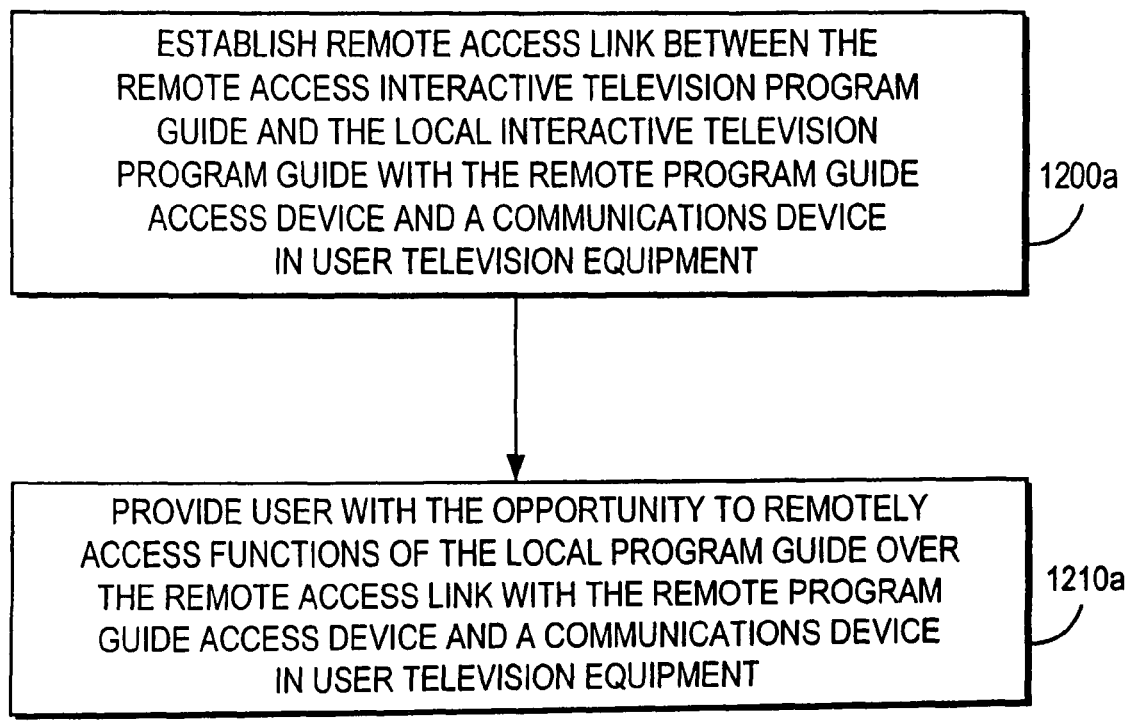
Figure 13B:
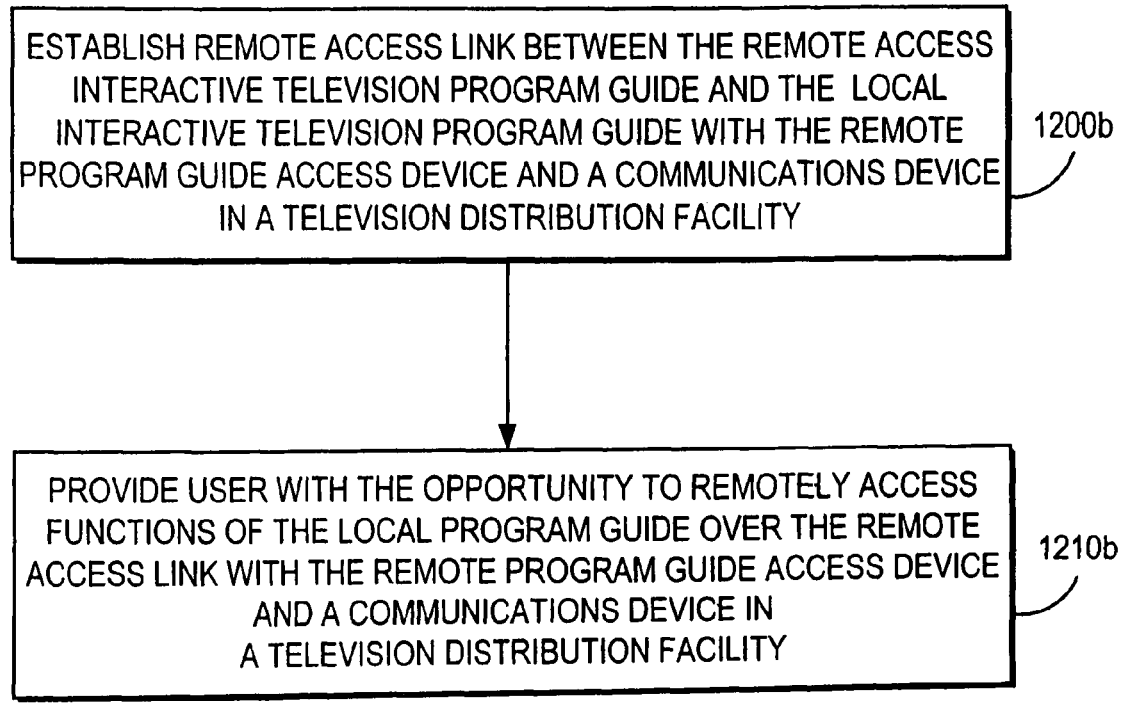

FIG. 13a illustrates steps involved in establishing remote access link 19 and for providing the user with remote access to program guide functions in the systems of FIGS. 2a and 2c. In these systems, remote access link 19 may be established between the remote access program guide and the interactive television program guide via a communications device in user television equipment 22 (Step 1200a). The local interactive television program guide may be wholly implemented on user television 22 as in system 10 of FIG. 2a, or may be partially implemented on user television equipment 22 as, for example, an interactive program guide client, as in system 10 of FIG. 2c. At step 1210a, remote program guide access device 24 may provide the user with the opportunity to remotely access the functions of the local interactive television program guide over the remote access link with a communications device.

Remote access link 19 may be established between the remote access program guide and the interactive television program guide via remote program guide access device 24 and a communications device in television distribution facility 16 or other location for a system configured as shown in FIG. 2d. Providing remote access to the functions of the local interactive television program guide in such a system may, for example, involve the steps shown in FIG. 13b. At step 1200b, for example, remote access link 19 may be established with a communications device in television distribution facility 16. The remote access program guide may, for example, provide the user with the opportunity to remotely access functions of the program guide with a communications device in the television distribution facility 16 at step 1210b.

Figure 13C:
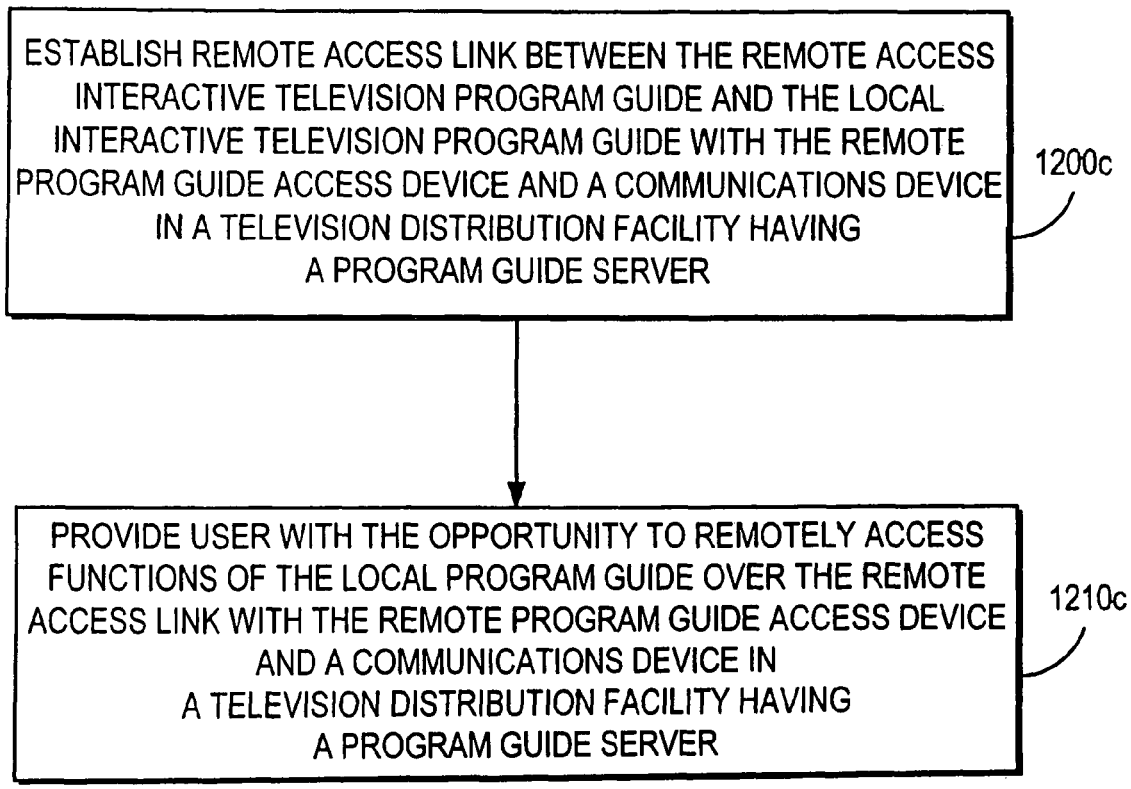

If television distribution facility 16 includes a program guide server as shown in FIG. 2c, remote access link 19 may be established between the remote access program guide and the interactive television program guide via remote program guide access device 24 and a communications device in television distribution facility 16 as indicated by step 1200c of FIG. 13c. At step 1210c remote program guide access device 24 may, for example, provide the user with the opportunity to remotely access the functions of the program guide over remote access link 19 with a communications device in distribution facility 16.

Figure 13D:
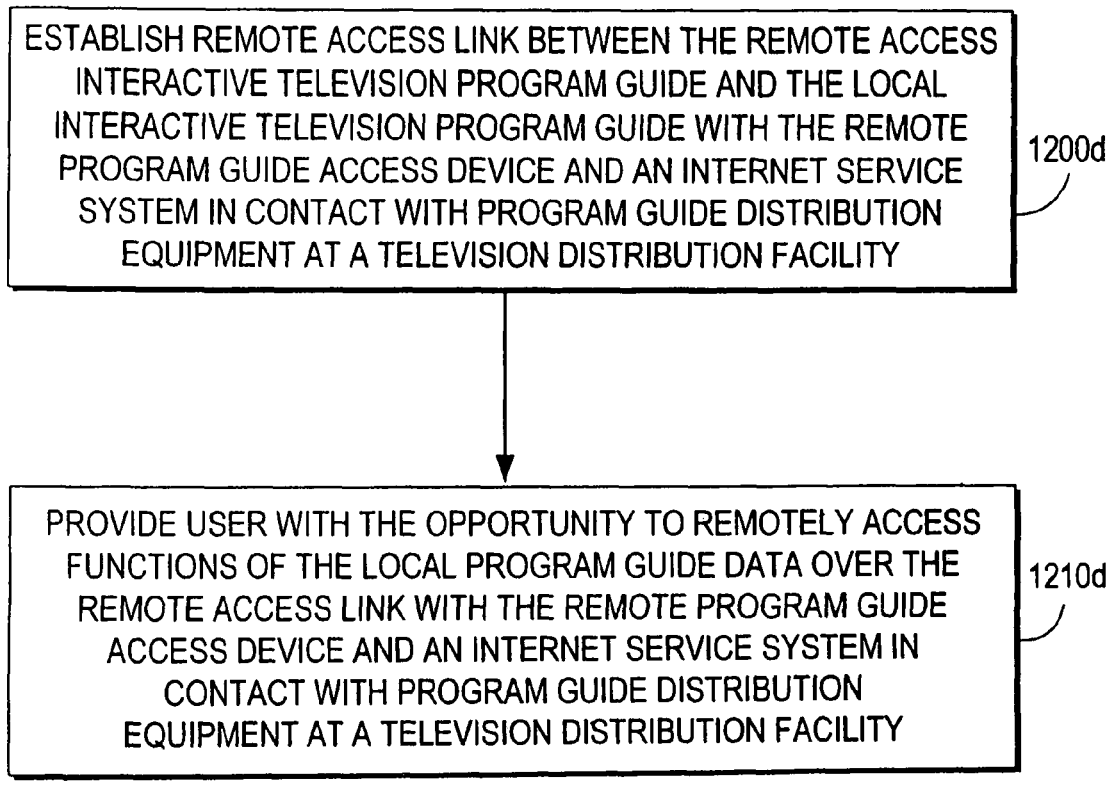
Figure 13E:
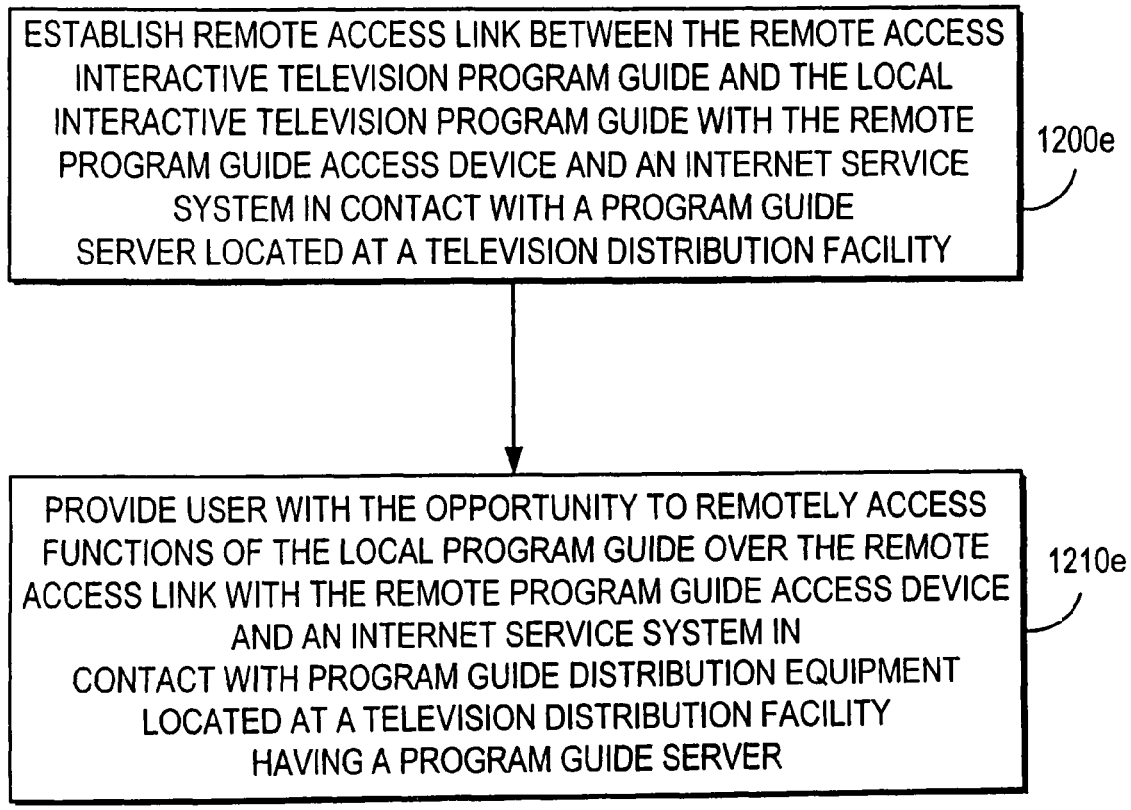

Steps involved in establishing remote access link 19 in on-line program guide systems that communicate with the remote access program guide such as in systems 10 of FIGS. 6a and 6b are shown in FIGS. 13d and 13e. In the on-line program guide system of FIG. 6a, for example, remote access link 19 may be established between the local interactive television program guide and the remote access program guide with Internet service system 61 (step 1200d, FIG. 13d). In the client-server on-line program guide system of FIG. 6b, for example, remote access link 19 may be established between the local interactive television program guide and the remote access program guide with an Internet service system in contact with program guide server 25 (step 1200e, FIG. 13e). The remote access program guide may provide the user with the opportunity to remotely access the functions of the program guide at steps 1210d and 1210e of FIGS. 13d and 13e, respectively.

Figure 14:
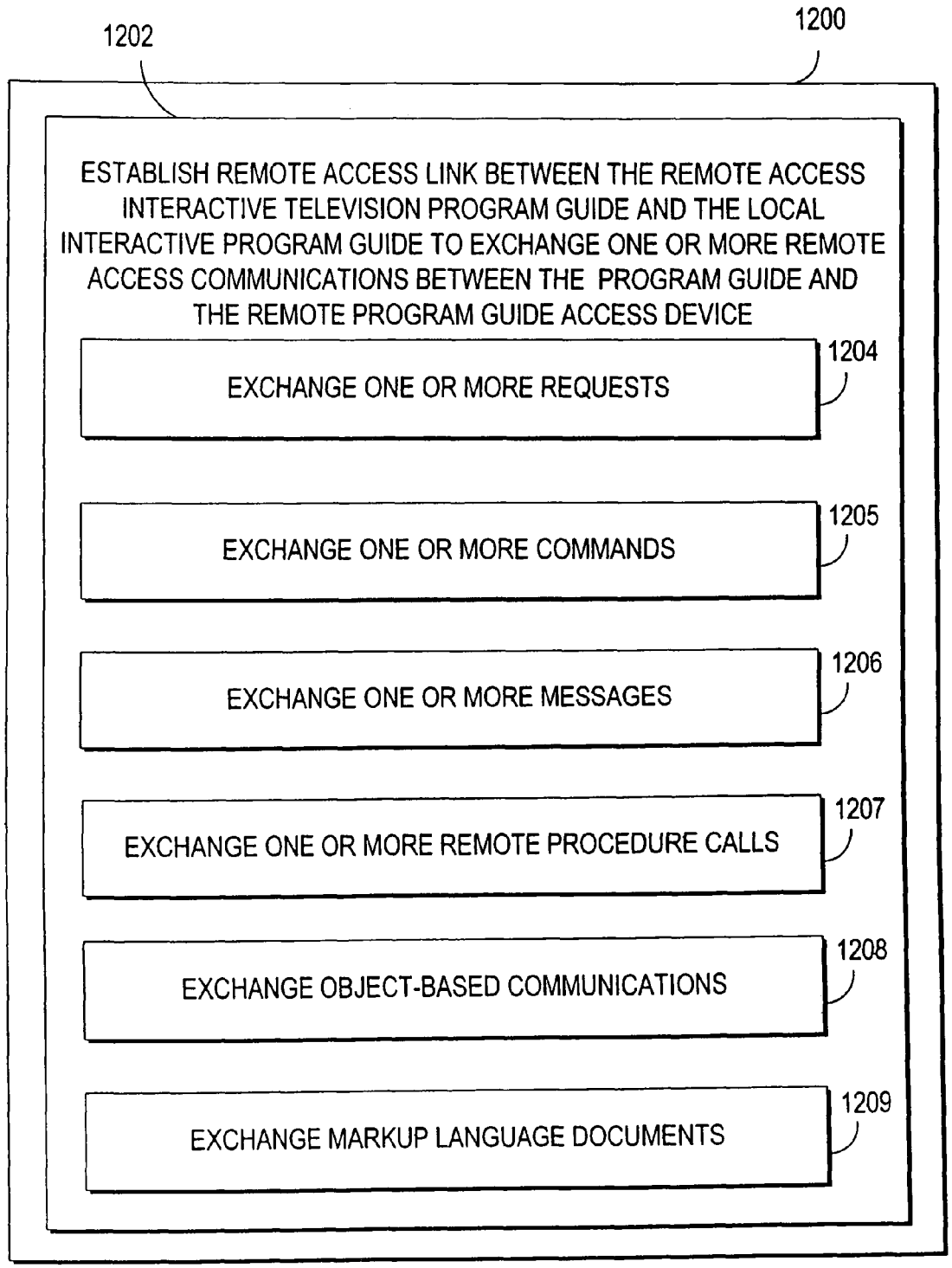

Establishing remote access link 19 at step 1200 of FIG. 12 may also involve exchanging one or more access communications between the interactive television program guide implemented on interactive television program guide equipment 17 and the remote access program guide implemented on remote program guide access device 24, as indicated by substep 1202 of FIG. 14. Access communicators may include any client-server or peer-to-peer communication construct suitable for providing program guide information across remote access link 19. Access communications may include, for example, requests, commands, messages, or remote procedure calls, as indicated by substeps 1204, 1205, 1206, and 1207, respectively.

Access communications may also involve complex communications between application constructs running on remote program guide access device 24 and interactive television program guide equipment 17. Access communications may, for example, be object based, as indicated by substep 1208. Objects running in two program guides, for example, may communicate using an Object Request Broker (ORB). The program guide information may, for example, be encapsulated as component object model (COM) objects and persisted to files that are transmitted over remote access link 19. Access communications may also include, for example, HTML formatted markup language documents (e.g., Web pages), that are exchanged between remote program guide access device 24 and interactive television program guide equipment 17 via Internet service system 61, as indicated by substep 1209.

FIGS. 15-23 are flowcharts of illustrative steps involved in providing remote access to a number of specific program guide functions. Remote access to the functions may be provided in any interactive television program guide system, such as a system 10 having the arrangements of interactive television program guide equipment 17 shown in FIGS. 2a-2d and FIGS. 6a and 6b. The steps shown in FIGS. 12-14 are not shown in the flowcharts of FIGS. 15-23 to avoid over-complicating the drawings, although any suitable combination or combinations of the steps of the flowcharts of FIGS. 12-23 may be used in practice.

Figure 15:
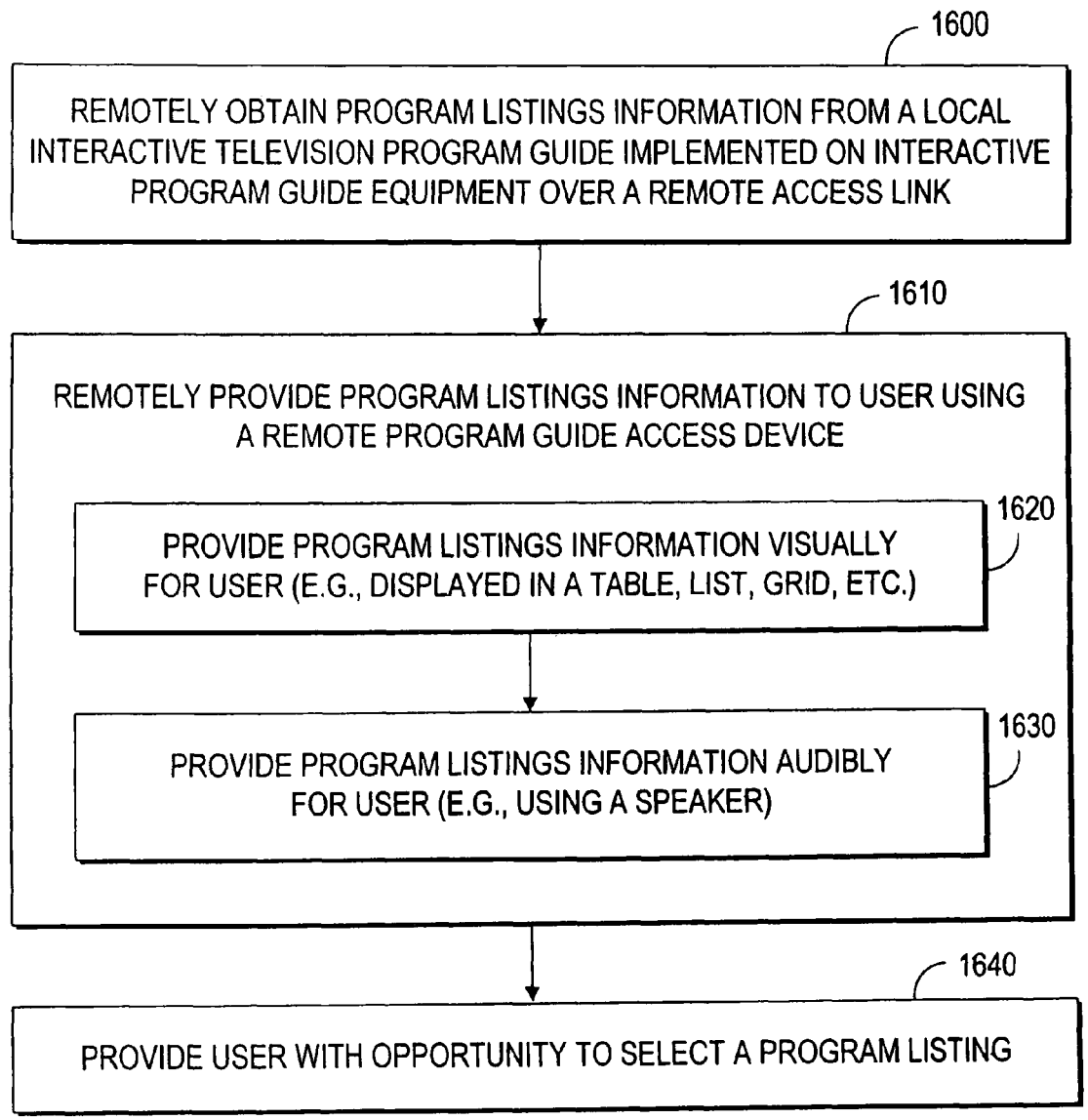

FIG. 15 shows illustrative steps involved in remotely providing program listings information to a user. At step 1600, program listings information is remotely obtained from the local interactive television program guide implemented on interactive television program guide equipment 17 via remote access link 19. The remote access program guide may, for example, obtain this information on startup, periodically, continuously, on demand in response to a suitable user command, or using any other suitable scheme using remote program guide access device 24.

At step 1610, the program listings information may be provided to the user. The program listings information may be displayed for the user by the remote access program guide in a table, listing grid, or other suitable construct, using user interface 52 (substep 1620). Alternatively, program listings information may be provided audibly for the user by using, for example, a speaker (substep 1630).

At step 1640, the remote access program guide may provide the user with the opportunity to select a program listing. In response to such a selection, the remote access program guide may provide the user with the opportunity to access other remote program guide features for the listing (e.g., displays additional info, schedule a program reminder, record, parental control, order the program if it is a pay-per-view program, etc.).

Figure 16:
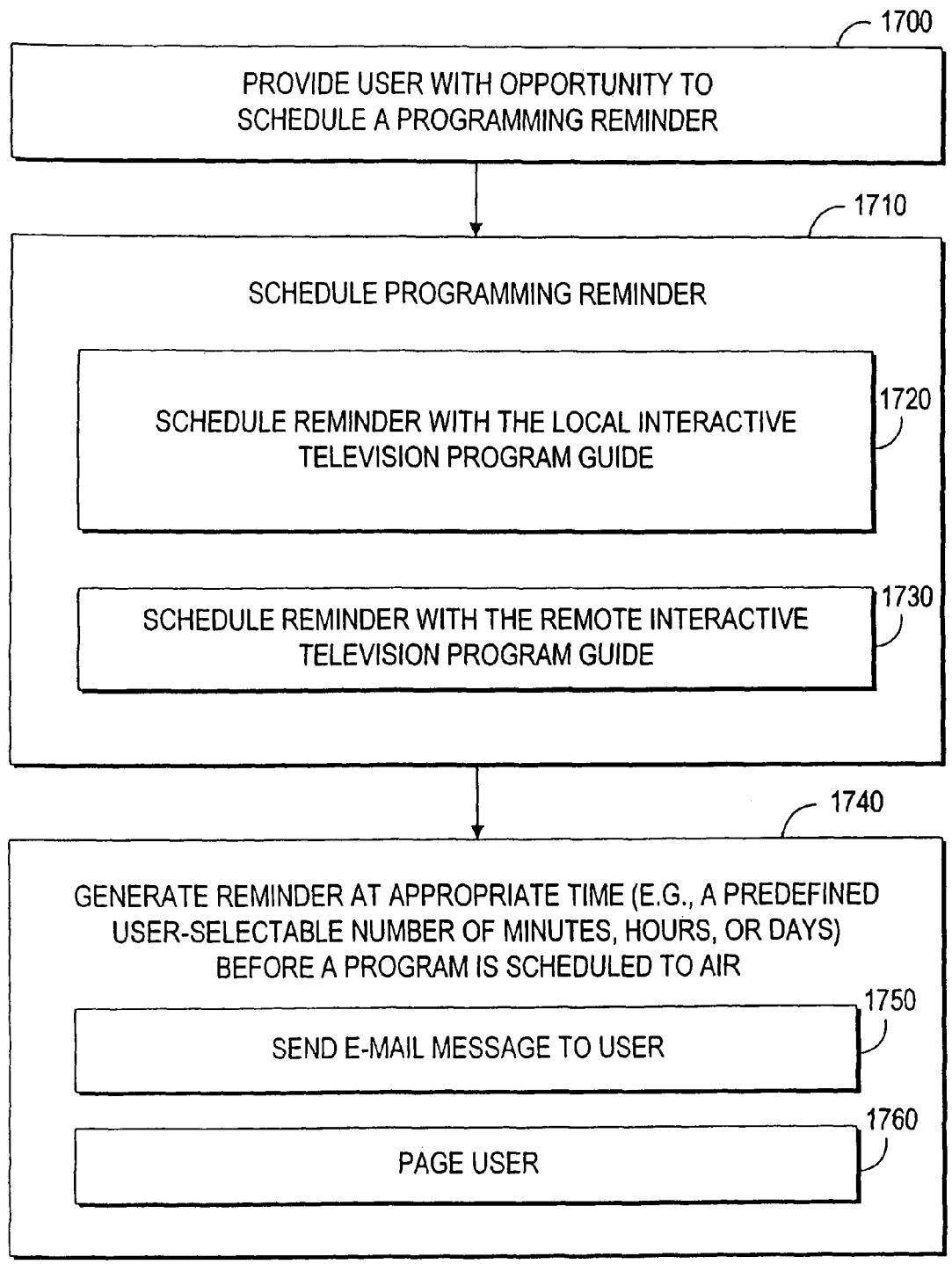

FIG. 16 shows illustrative steps involved in providing the user with remote access to the program reminder feature of a local interactive television program guide. At step 1700, a user is provided with an opportunity to schedule a programming reminder. The user may be provided with an opportunity to remotely schedule a programming reminder with the local guide or with the remote access guide. This opportunity, may, for example, be provided in response to the user selection of a program listing. At step 1710, the program reminder is scheduled by the local guide or the remote access guide. The program reminder may be scheduled with the local interactive television program guide (substep 1720), may be stored by the remote access interactive television program guide (substep 1730), or both.

At step 1740, the program reminder is generated at an appropriate time (e.g., a predefined or user-selectable number of minutes, hours, or days) before a program is scheduled to air. The reminder may be generated by the local interactive television program guide implemented on interactive television program guide equipment 17, or may be generated by the remote interactive television program guide. The program reminder may, for example, be sent to the user via e-mail or alphanumeric page, as indicated by substeps 1750 and 1760 respectively.

Figure 17:
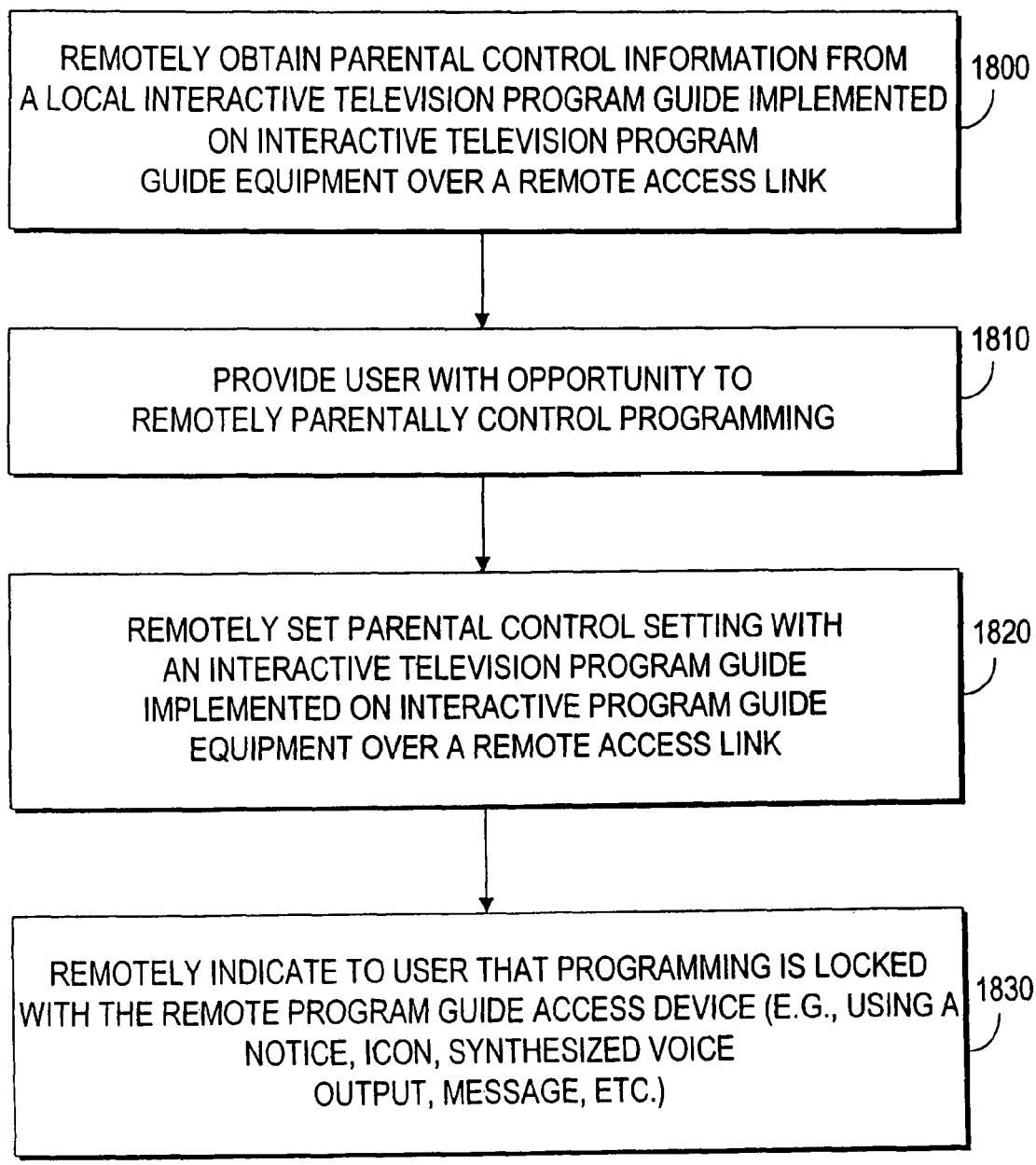

FIG. 17 shows illustrative steps involved in providing a user with remote access to the parental control features of the local interactive television program guide implemented on interactive television program guide equipment 17. At step 1800, parental control information is remotely obtained. This may occur, for example, on startup, periodically, continuously, on demand in response to a suitable user command, or using any other suitable scheme.

The remote access program guide may provide the user with the opportunity to parentally control programming (e.g., by program, channel, theme, time, etc.) in any suitable manner (step 1810). At step 1820, the remote access program guide remotely sets a parental control setting with the interactive television program guide via remote access link 19. Remote program guide access device 24 may use, for example, one or more access communications sent over remote access link 19 to exchange the parental control settings with interactive television program guide 17.

Programming may be locked locally by a user via user television equipment 22, or may have been locked remotely by the remote access program guide. The remote access program guide may indicate to a user that programming is locked (e.g., by program, channel, theme, etc.) with remote program guide access device 24 at step 1830. Remote program guide access device 24 may use, for example, a notice, icon, synthesized voice output, message, or any other suitable indicator.

Figure 18:
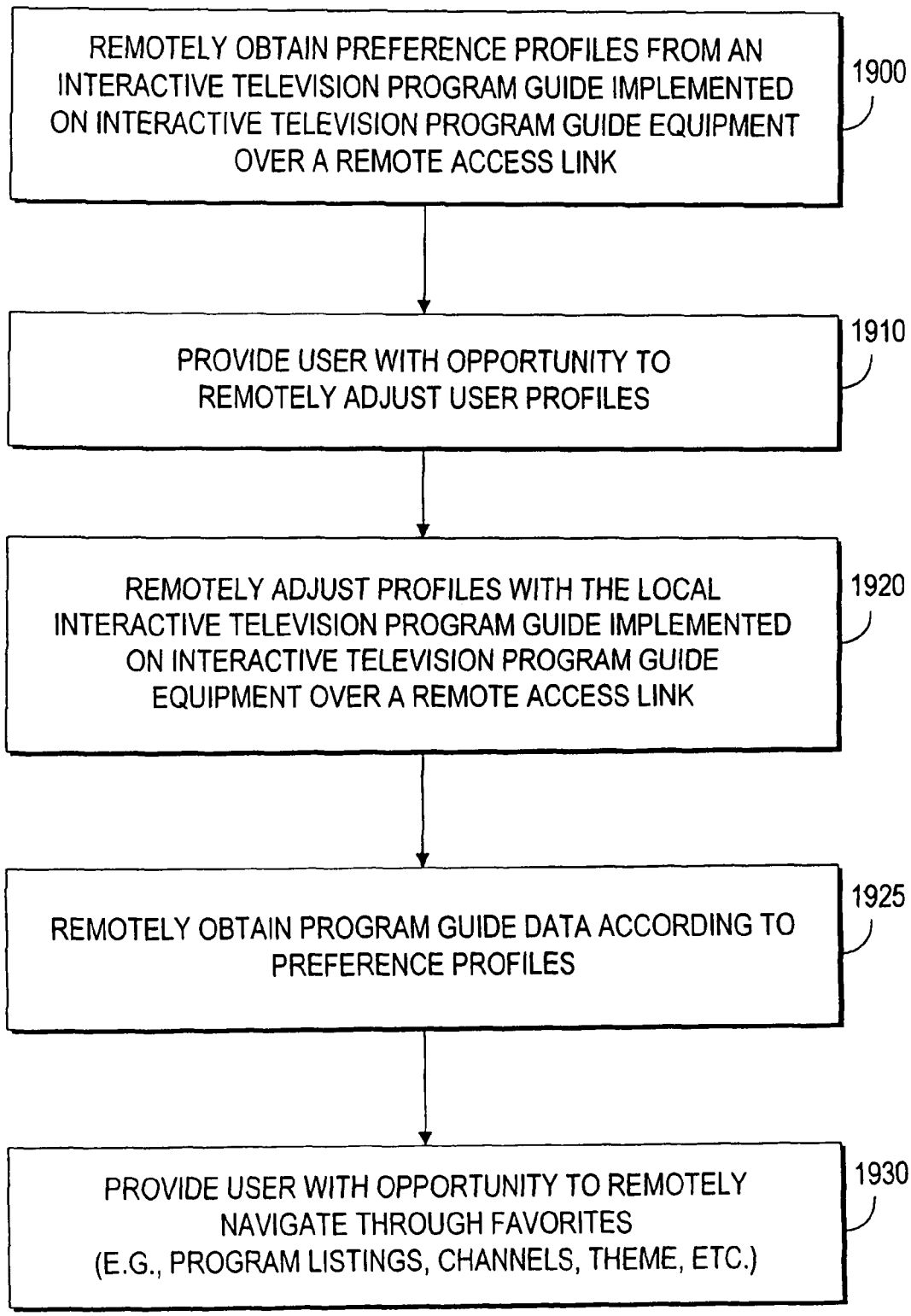

FIG. 18 shows illustrative steps involved in providing a user with remote access to the favorites and user profile functions of the interactive television program guide implemented on interactive television program guide equipment 17. At step 1900, user preference profiles are remotely obtained from the local interactive television program guide by the remote access interactive television program guide via remote access link 19. The information or profiles may be obtained, for example, on startup, periodically, continuously, on demand in response to a suitable user command, or using any other suitable scheme.

The remote access program guide may provide the user with the opportunity remotely adjust user profiles (step 1910). The user may, for example, add or delete favorite channels, themes, indicate likes or dislikes, etc. At step 1920, the remote access program guide remotely adjusts user profiles with the local interactive television program guide. This may be accomplished by, for example, remote program access device 24 exchanging one or more access communications with interactive television guide equipment 17 via remote access link 19. The one or more access communications may indicate one or more user profiles or favorites information. At step 1925, the remote program guide obtains program guide data according to the preference profiles.

At step 1930, remote program guide access device 24 may provide the user with the opportunity to remotely navigate through favorites. Remote program guide access device 24 may, for example, have obtained program listings information (step 1600, FIG. 15), sorted the information according to the favorites information, and displayed only listings for a favorite channel or theme. Alternatively, remote program guide access device 24 may, for example, display television program listings in a grid, table, or list while highlighting favorite channels. A user may be provided with the opportunity to "jump" between favorite listings or channels by issuing an appropriate command using user interface 52.

Figure 19:
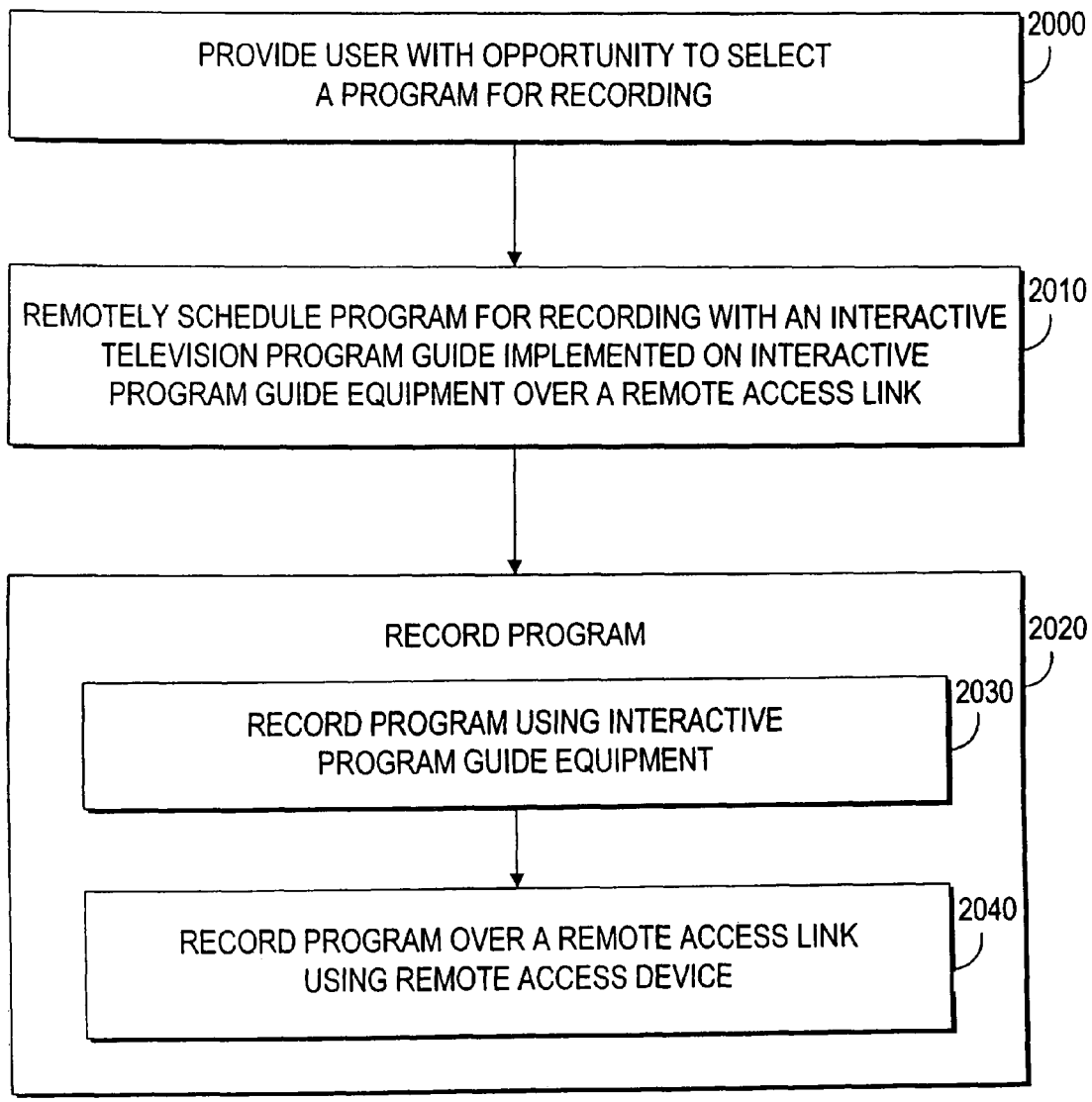

FIG. 19 shows illustrative steps involved in providing a user with remote access to program recording. At step 2000, the remote access program guide provides the user with the opportunity to select a program for recording. This opportunity may be provided in response to the user indicating a desire to record programming by, for example, selecting a program listing (step 1640, FIG. 15) and issuing a suitable command. In response, the remote access program guide remotely schedules the program for recording with the local interactive television program guide implemented on interactive television program guide equipment 17 (step 2000). Remote program guide access device 24 may exchange, for example, one or more access communications with interactive television program guide equipment 17 that are sent over remote access link 19.

At an appropriate time, the program is recorded (step 2020). As indicated by substeps 2030 and 2040, the program may be recorded by the local interactive program guide on interactive television program guide equipment 17 (e.g., digital storage device 31 or secondary storage device 32 of user television equipment 22 (FIG. 3), or on program guide server 25, or may be recorded by remote program guide access device 24 on storage 56 (FIG. 5) or program guide server 25. If the program is recorded by remote program guide access device 24, the programming may, for example, be digitized and transmitted as a MPEG-2 data stream over remote access link 19 using access communications.

Figure 20:
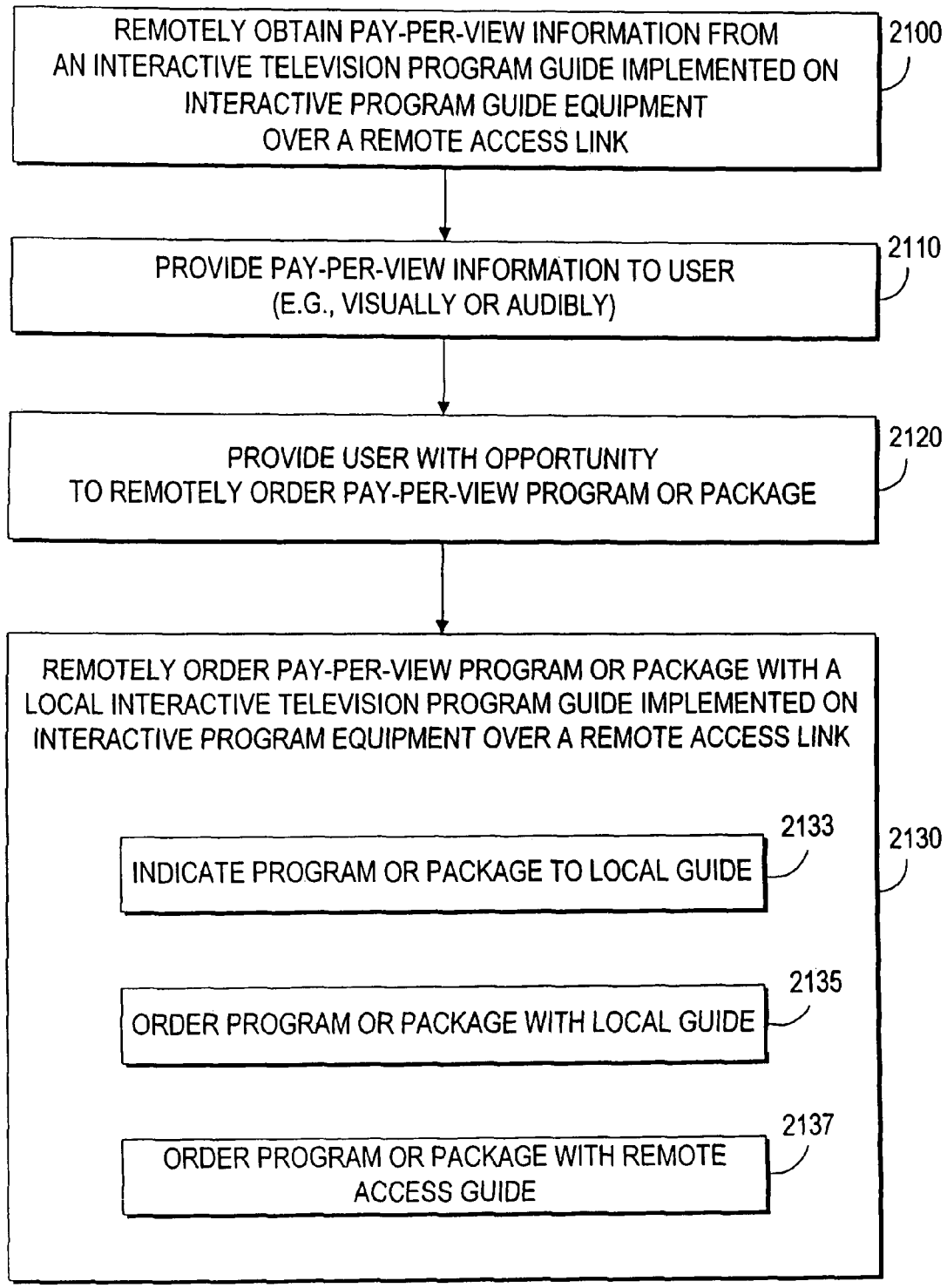

FIG. 20 shows illustrative steps involved in providing the user with remote access to remotely order pay-per-view programs and packages using the local interactive television program guide implemented on interactive television program guide equipment 17. At step 2100, the remote access program guide obtains pay-per-view information (e.g., price, ordering information, time, event code, selections in a package, etc.), from the interactive program guide implemented on interactive television program guide equipment 17 via remote access link 19. The pay-per-view information may be obtained on startup, periodically, continuously, on demand in response to a suitable user command, or using any other suitable scheme. The pay-per-view information is provided to the user by the remote access program guide using user interface 52 of remote program guide access device 24 in any suitable fashion (step 2110).

At step 2120, the remote access program guide provides the user with the opportunity to remotely order a pay-per-view program or package. This opportunity may be provided, for example, in response to the user selecting a pay-per-view program listing or package listing (e.g., step 1640, FIG. 15). At step 2130, the remote access program guide remotely orders the pay-per-view program or package by indicating the program or package to the local interactive television program guide by, for example, exchanging one or more access communications over remote access link 19 (step 2133). The access communications may contain the pay-per-view information for the selected pay-per-view program or package. The local guide may order the program or package at step 2135. Alternately, the remote access program guide may order the pay-per-view program (step 2137).

The way in which the remote access program guide orders the pay-per-view program using the local interactive television program guide may depend on the configuration of the system. If the system is configured as shown in FIGS. 2a and 2c, the remote access program guide may, for example, provide the pay-per-view information to the interactive television program guide implemented at least partially on user television equipment 22. The interactive television program guide may, in turn, order the pay-per-view program with television distribution facility 16. If the system is configured as shown in FIGS. 2b and 2d, the remote access program guide may, for example, provide the pay-per-view information to the interactive television program guide via separate communications device 27. If the system is configured as shown in FIGS. 6a and 6b, the remote access program guide may provide the pay-per-view information via Internet service system 61.

Figure 21:
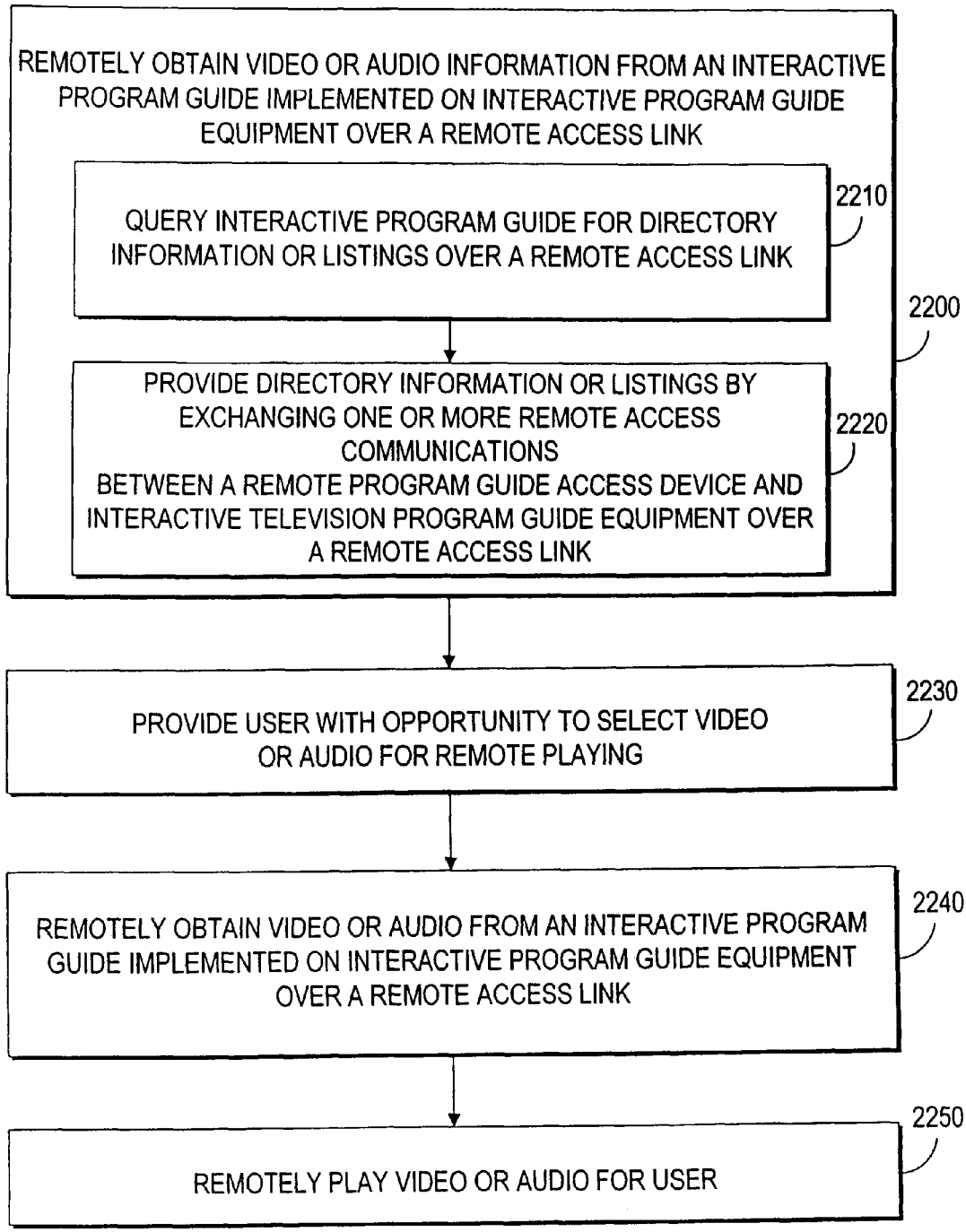

FIG. 21 shows illustrative steps involved in providing a user with access to remotely-played video or audio. At step 2200, the remote access program guide may obtain video or audio information from the interactive television program guide implemented on interactive television program guide equipment 17 via remote access link 19. This may occur, for example, in response to the user selecting a video or audio listing displayed by remote program guide access device 24.

Substeps 2210 and 2220 show illustrative steps involved in obtaining directory information used in providing a user with audio and video information. The remote access program guide may query the local interactive television program guide implemented on interactive television program guide equipment 17 for directory information using one or more access communications that are sent over remote access link 19 (step 2210). The directory information may be contained, for example, in a media library directory for a media library that is stored on user television equipment 22, or by television distribution facility 16. The directory information may be provided back to the remote access program guide by exchanging one or more remote access communications between interactive television program guide equipment 17 and remote program guide access device 24 over remote access link 19, as is indicated by substep 2220. Step 2210 may be skipped and step 2220 performed when, for example, directory information or listings are provided to the remote access guide ahead of time.

At step 2230, the remote access program guide may provide the user with the opportunity to select a video or audio for remote playing. The user may select a video or audio by, for example, selecting a listing that is indicated to the user by user interface 52. The user may be provided with an opportunity to play a program in real-time via the local and remote guides, or to play a stored program. In response, the remote access program guide may obtain the selected video or audio from the local interactive television program guide using access communications that are sent over remote access link 19. The access communications may contain the video or audio in a suitable analog or digital format. At step 2250, remote program guide access device 24 remotely plays the video or audio for the user using user interface 52. Selected video may be displayed, for example, on a suitable monitor, LCD, or other suitable display device. Selected audio may be played for the user using any suitable speaker. Audio may, for example, be played by a car stereo if remote program guide access device 24 is an automobile PC.

Figure 22:
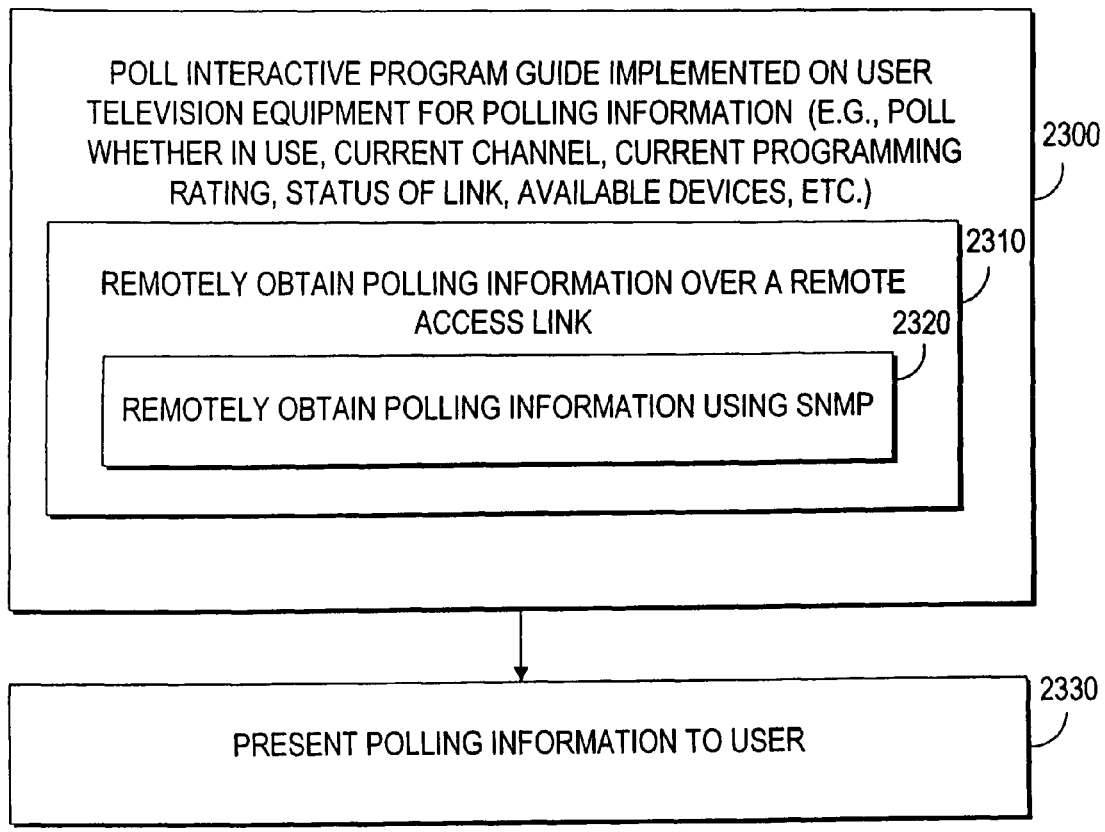

FIG. 22 shows illustrative steps involved in providing the user with the opportunity to remotely poll the local interactive television program guide implemented on interactive television program guide equipment 17. At step 2300, the remote access program guide may poll the interactive television program guide for polling information. The polling information may indicate, for example, whether user television equipment 22 is in use, the current channel user television equipment 22 is tuned to, the current programming rating, current program title, the status of remote access link 19 or communications paths 20, the available devices of user television equipment 22, or any other status related information.

Step 2300 may include substeps 2310 and 2320 for obtaining the polling information. At substep 2310, remote program guide access device 24 may obtain the polling information. Polling information may be obtained on startup, periodically, continuously, on demand in response to a suitable user command, or using any other suitable scheme. More particularly, status information may be obtained using SNMP (substep 2320), if desired. If SNMP is used to obtain polling information, for example, the access communications may include commands and protocol data units (PDUs). Other suitable network management protocols may also be used. At step 2330, remote program guide access device 24 may present the polling information to the user in any suitable method. The polling information may be displayed, for example, in a status display screen such as status display screen 200 of FIG. 11. Polling information may, for example, be output to the user via synthesized voice outputs that are played using a speaker and voice synthesis hardware and software.

Figure 23:
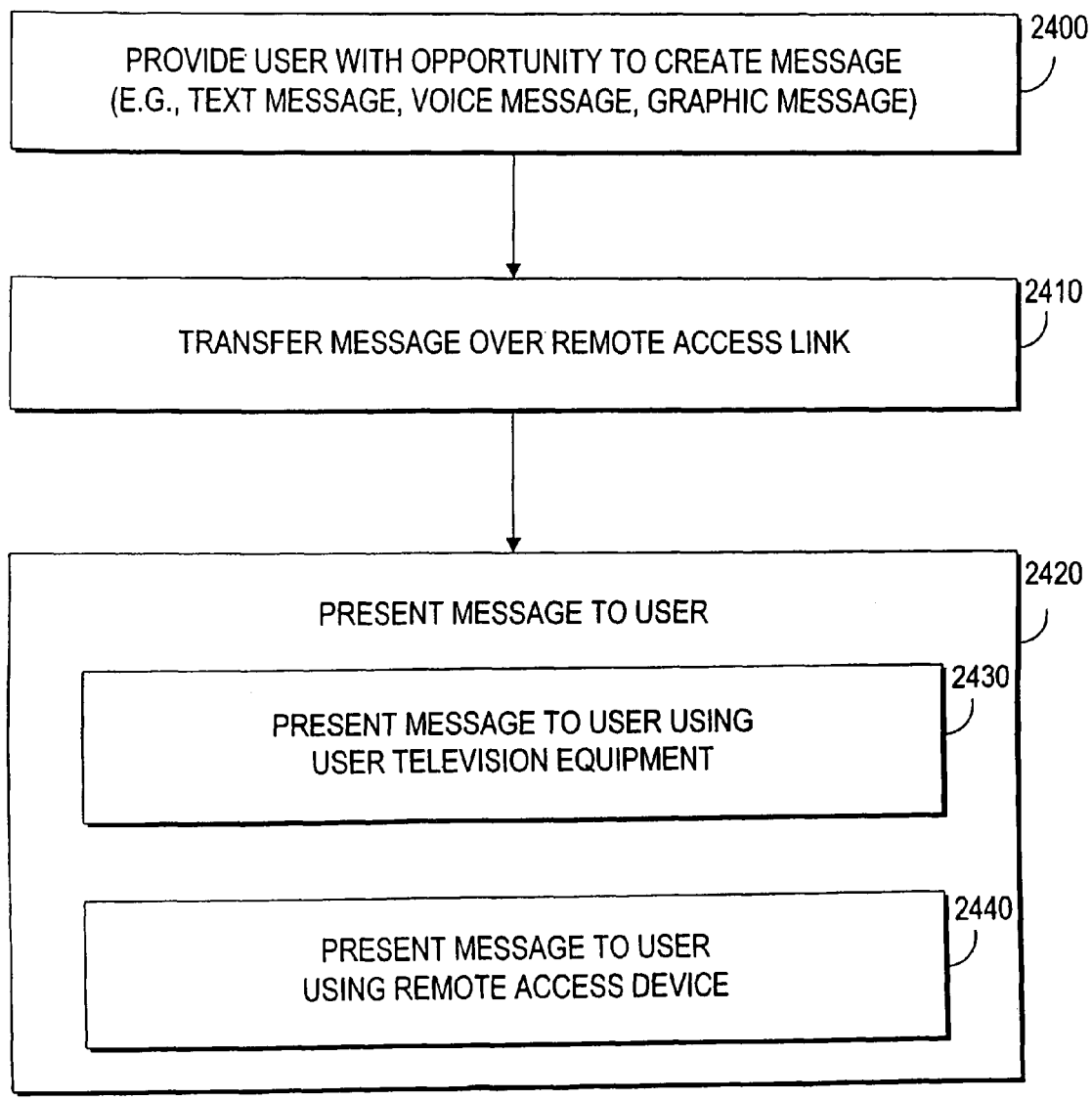

FIG. 23 shows illustrative steps involved in providing the user with the opportunity to create messages and send them between the local interactive television program guide implemented on interactive television program guide equipment 17 and the remote access program guide. At step 2400, the user is provided with the opportunity to create a message. The user may create the message with the local interactive television program guide using, for example, user interface 46 of user television equipment 22 (FIG. 4), or the user may create the message using user interface 52 of remote program guide access device 24.

The message may include any suitable text, graphics, or audio. The user may, for example, speak an audio message into a microphone. The audio message may be digitized and stored in an access communication for transfer over remote access link 19. Alternatively, the user may input a text message using a suitable text input device (e.g., a keyboard). However the message is created and whatever its content, the message is transferred over remote access link 19 using one or more access communications. The message may be transferred from the interactive television program guide to the remote access program guide, or from the remote access program guide to the local interactive television program guide, depending on where the message was created and its intended destination. At step 2410, the message may be presented to the user by user television equipment 22 (e.g., substep 2430), or by remote program guide access device 24 (e.g., substep 2440).

The discussion thus far has focused on implementing the invention with an interactive television program guide. The invention may also be applied to non-program-guide interactive television applications. Local non-program-guide applications run on user television equipment such as a set-top box and corresponding remote access non-program-guide application may run on a remote access device. Interactive television applications may be stand-alone applications, portions of an operating system, or any suitable combination thereof.

Figure 24:
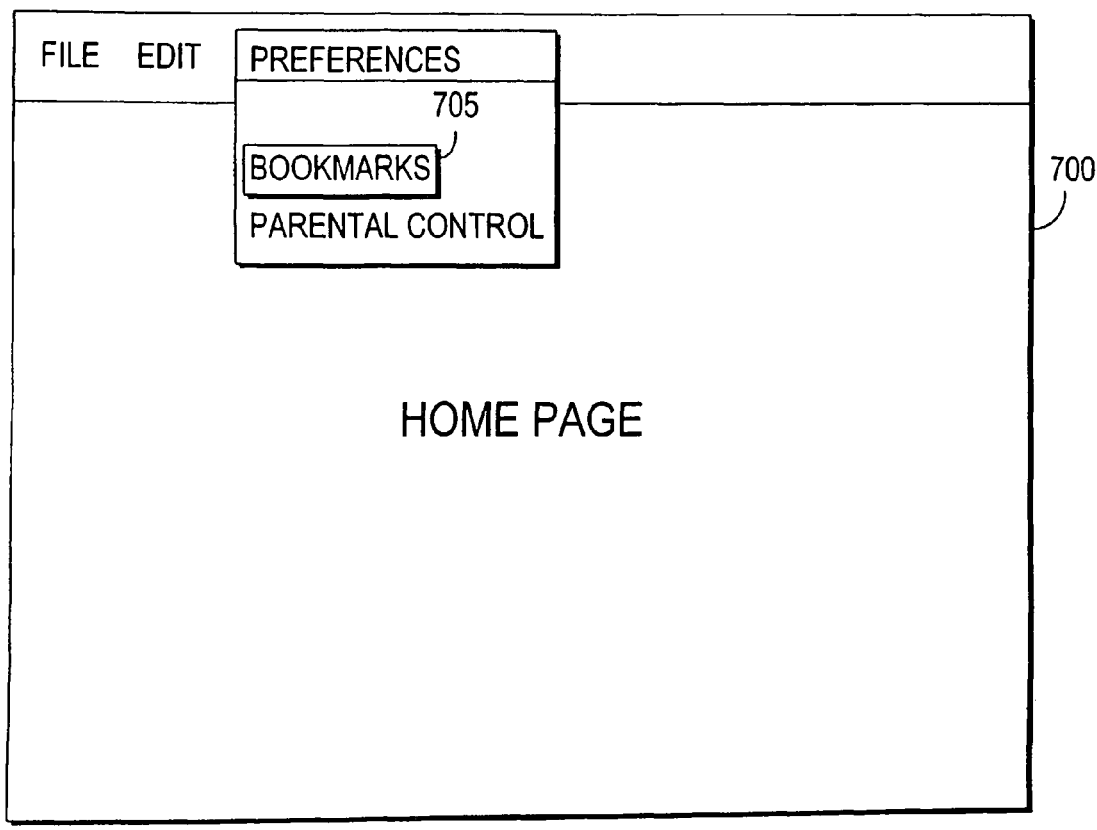
FIG. 24 is an illustrative Internet browser screen for display by a remote access device in accordance with the principles of the present invention.

One non-program-guide application that may be implemented on a set-top box in accordance with the present invention is an Internet browser. An Internet browser may have settings such as bookmarks, parental control settings, and general preferences that control how the browser functions. As shown in FIG. 24, a remote access device may provide the user with access to a browser application by displaying, for example, browser screen 700 of a remote access browser application. Browser screen 799 may have a bookmark option 705. A user may, for example, select bookmark option 705 and add a bookmark (i.e., a record of the address of the current web site that can be used to access the site). After the user adds a bookmark with a remote access Internet browser, the remote access Internet browser may exchange one or more access communications with a local Internet browser to add the bookmark to the local browser.

Figure 25:
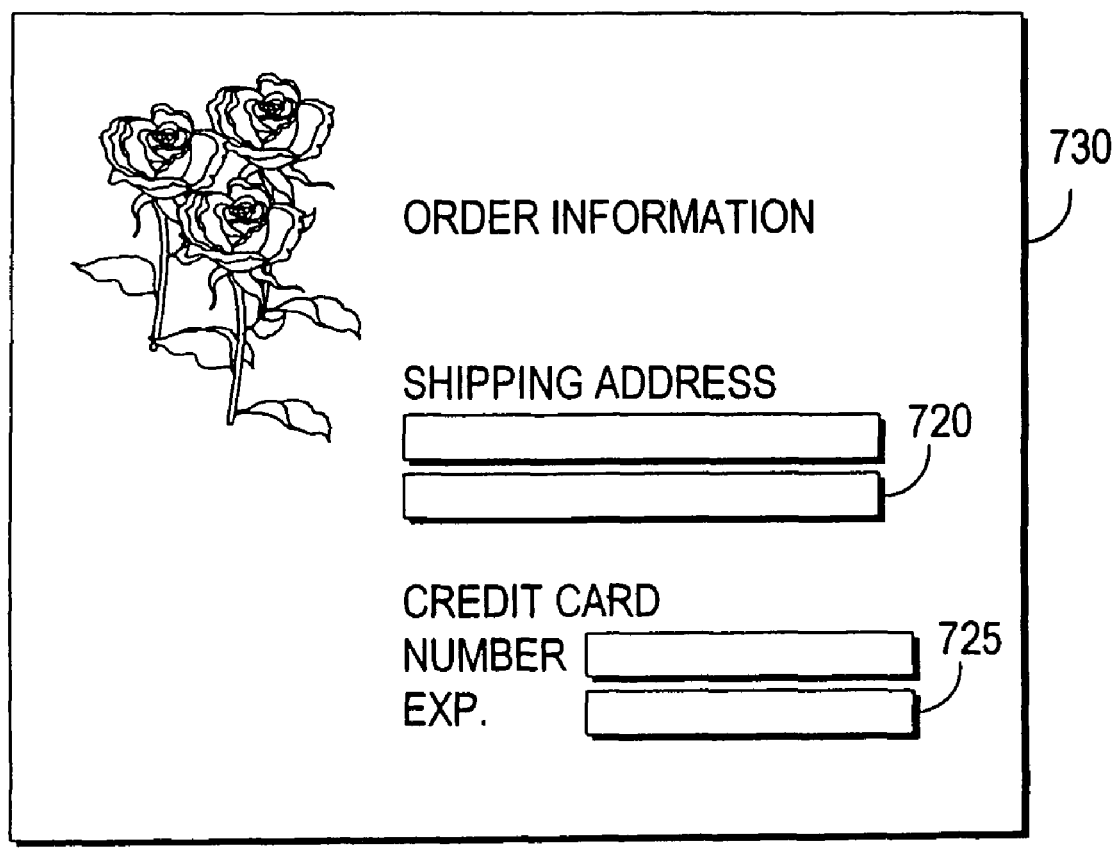
FIG. 25 is an illustrative shopping data entry screen for display by a remote access device in accordance with the principles of the present invention.

Another application that may be implemented or a set-top box in accordance with the present invention is a shopping application. A shopping application may have settings such as a default shipping address and credit card number. As shown in FIG. 25, a remote access shopping application screen 730 may have settings such as a shipping address 720, and credit card number 725. A user may, for example, add a shipping address and credit card information. After a user adds shipping and credit card information with the remote access shopping application, the remote access application may exchange one or more access communications with a local shopping application to provide the information to the local application.

Figure 26:
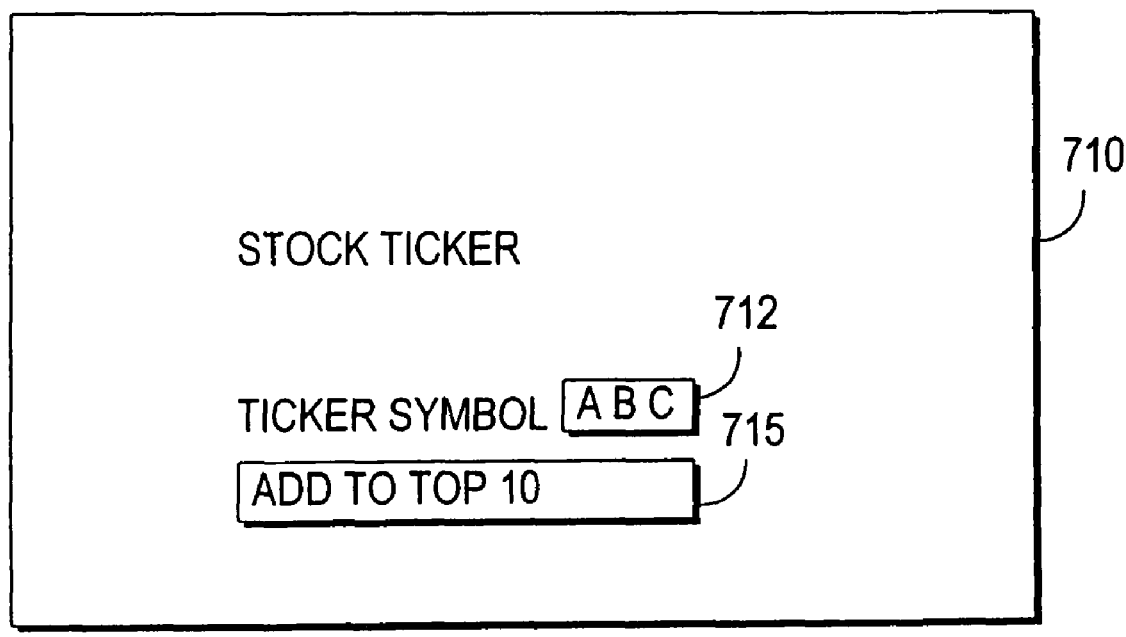
FIG. 26 is an illustrative stock ticker data entry screen for display by a remote access device in accordance with the principles of the present invention.

Another non-program-guide application that may be implemented on a set-top box and accessed via a remote access device in accordance with the present invention is a stock ticker. A stock ticker may have settings such as settings indicating the top ten stocks in which the user is interested. As shown in FIG. 26, a remote access device may display a remote access stock ticker settings screen 710. Stock ticker settings screen 710 may have, for example, ticker symbol 712 and a top ten stocks option 715. A user may, for example, add a top stock. By exchanging one or more access communications, the remote access stock ticker application can make the top ten stock settings effective on a local stock ticker application.

A chat application may be implemented on a set top box. Chat applications are services that allow users to exchange chat messages with other users in real time. A chat application may be implemented as a stand-alone chat application or as part of another application such as a program guide application. Chat applications that may be implemented on user television equipment are described in DeWeese et al. U.S. patent application Ser. No. 09/356,270, filed Jul. 16, 1999, which is hereby incorporated by reference herein in its entirety. A user may remotely adjust settings associated with a chat application such as the size of a chat window, an address book, or whether to filter potentially offensive messages. After the user adjusts chat settings with a remote access chat application running on a remote access device, the remote access chat application may remotely adjust the settings of a local chat application by, for example, exchanging one or more access communications with the local chat application over a remote access link.

If desired, the settings of an e-mail application running on a set-top box may be adjusted remotely. Set-top based messaging systems are described, for example, in concurrently filed McKissick et al. U.S. patent application Ser. No. 09/356,245, filed Jul. 16, 1999, which is hereby incorporated by reference herein in its entirety. Users may, for example, remotely add to or change an address book. When the user adjusts e-mail settings with a remote access e-mail application running on a remote access device, the remote access e-mail application may remotely adjust the settings of a local e-mail application by, for example, exchanging one ore more access communications with the local e-mail application over a remote access link.

The foregoing is merely illustrative of the principles of this invention and various modifications can be made by those skilled in the art without departing from the scope and spirit of the invention.

What is claimed is:

1. A method for accessing video programs over an Internet link, the method comprising:

receiving a plurality of video programs with user television equipment, wherein the user television equipment outputs to a first display device, and the user television equipment is located at user site;

providing the user with the opportunity to select a video program from the plurality of video programs over the Internet link using a remote access device, wherein:

the remote access device outputs to a second display device which is different from the first display device;

the remote access device is remote from the user television equipment; and the remote access device communicates with the user television equipment over the Internet link;

in response to receiving, at the user television equipment, a user selection of the video program from the remote access device over the Internet link, directing the user television equipment to access the video program; and providing, from the user television equipment, the selected video program over the Internet link to the remote access device for output to the second display;

wherein providing the user with the opportunity to select a video program from the plurality of video programs over the Internet link using the remote access device further comprises:

receiving a generated television guide screen that identifies at least one video program;

providing the generated television guide screen to the remote access device over the Internet link; and receiving a user selection of the at least one video program from the remote access device.

2. The method of claim 1, wherein directing the user television equipment to access the video program comprises directing the user television equipment to tune to channel of the video program.

3. The method of claim 1 further comprising displaying at least one video program listing on the remote access device for at least one of the plurality of video programs.

4. The method of claim 1 further comprising:

receiving a user request from the remote access device to view a different video program;

in response to receiving the user request, directing the user television equipment to access the different video program; and providing the different video program over the Internet link to the remote access device.

5. The method of claim 4 wherein:

receiving a user request to view a different video program comprises receiving a user request to view a different video program on a different channel;

directing the user television equipment to access the different video program comprises directing the user television equipment to access the different video program on the different channel; and providing the different video program to the remote access device comprises providing video of the different channel to the remote access device.

6. The method of claim 1, wherein the selected video program is a recorded video program.

7. The method of claim 1, wherein a remote access interactive program guide is implemented on the remote access device.

8. The method of claim 1, wherein a local interactive program guide is implemented on the user television equipment.

9. The method of claim 1, wherein the remote access device and the second display device is in a different geographical location than the user television equipment and first display device.

10. A method for accessing a video program over an Internet link, the method comprising:

receiving, at a remote access device, a television guide screen generated by a user television equipment over the Internet link, wherein:

the user television equipment outputs to a first display device and the user television equipment is located at user site;

the remote access device is remote from the user television equipment; and the remote access device communicates with the user television equipment over the Internet link;

displaying on a second display device of the remote access device the television guide screen that is received from the user television equipment over the Internet link, wherein the second display device is different from the first display device;

receiving a user selection of a channel for viewing with a remote access device based on the television guide screen displayed on the second display device;

transmitting, from the remote access device, an instruction over the Internet link to the user television equipment to tune to the selected channel;

receiving, at the remote access device, from the user television equipment video of the selected channel over the Internet link; and displaying the video of the selected channel received from the user television equipment over the Internet link on the second display device of the remote access device.

11. The method of claim 10, further comprising displaying at least one on-screen option for controlling the user television equipment over the Internet link.

12. The method of claim 11, wherein the at least one on-screen option comprises at least one of changing the selected channel, controlling the volume, and recorded video program playback options.

13. The method of claim 10, further comprising:

receiving a user selection to change the video of the currently selected channel with the remote access device;

transmitting an instruction to the user television equipment to change the currently selected channel over the Internet link;

receiving video of a newly tuned channel with the remote access device; and displaying the video of the newly tuned channel with the remote access device.

14. The method of claim 13, wherein receiving a user selection to change the currently selected channel further comprises receiving a user selection of an on-screen option displayed on the remote access device to change the currently displayed video of the selected channel.

15. The method of claim 10, wherein the generated television guide screen comprises at least one selectable channel option.

16. The method of claim 15, wherein the at least one selectable channel option is displayed as a listing of channels.

17. The method of claim 16, wherein the listing of channels is a listing of favorite channels.

18. The method of claim 10, wherein the remote access device is one of a personal computer, a portable computer, a palmtop computer, a handheld personal computer, and a personal digital assistant.

19. The method of claim 10, wherein the video corresponding to the selected channel is received by the user television equipment over a communication link different from the Internet link.

20. The method of claim 19, wherein the communication link is a broadcast link, and the selected channel is one of a plurality of television channels broadcast by the communication link.

21. A method for providing a video program to a remote access device over an Internet link, the method comprising:

providing, to a remote access device, a television guide screen generated by user television equipment over the Internet link, wherein:

the user television equipment outputs to a first display device and the user television equipment is located at user site, the remote access device is remote from the user television equipment; and the remote access device communicates with the user television equipment over the Internet link, wherein the remote access device outputs to a second display device which is different from the first display device;

receiving, at the remote access device, a user selection of a channel for viewing from the television guide screen being displayed on the second display device;

receiving, at the user television equipment, the user selection of a channel for viewing from the remote access device over the Internet link;

tuning the user television equipment to the selected channel; and transmitting, from the user television equipment, video corresponding to the selected channel to the remote access device over the Internet link.

22. The method of claim 21, wherein transmitting the video corresponding to the selected channel to the remote access device over the Internet link further comprises:

converting the video corresponding to the selected channel to a format suitable for transmission over the Internet link; and transmitting the converted video to the remote access device over the Internet link.

23. The method of claim 21, wherein providing a generated television guide screen from the user television equipment to the remote access device over the Internet link further comprises providing a generated television guide screen that comprises at least one on-screen option for controlling the user television equipment over the Internet link.

24. The method of claim 23, wherein the at least one on-screen option comprises at least one of changing the selected channel, controlling volume, and recorded video program playback options.

25. The method of claim 21, further comprising:
receiving a user selection from the remote access device to change the currently displayed video of the selected channel to a new channel;
tuning the user television equipment from the currently selected channel to the new channel; and
transmitting video of the new channel to the remote access device over the Internet link.

26. The method of claim 21, wherein the generated television guide screen comprises at least one selectable channel option.

27. The method of claim 26, wherein that at least selectable channel option is a channel icon.

28. The method of claim 26, wherein the at least one selectable channel option is displayed as a listing of channels.

29. The method of claim 21, wherein the remote access device is one of personal computer, a portable computer, a palmtop computer, a handheld personal computer, and a personal digital assistant.

30. A method for accessing a video program over an Internet link, the method comprising:
transmitting, with control circuitry to a remote access device over an Internet link a video guide screen;
receiving, with the control circuitry from the remote access device over an Internet link, a user selection of the video program based on the video guide screen being displayed on a second display device, wherein:
the control circuitry is coupled to a device that outputs to a first display device and the remote access device outputs to a second display device which is different from the first display device, wherein the control circuitry and the device are located at user site;
the remote access device is remote from the control circuitry; and
the remote access device communicates with the control circuitry over the Internet link;
in response to receiving the user selection of the video program with the control circuitry, directing the device to access the video program; and
transmitting the selected video program that is accessed to the remote access device over the Internet link for output to the second display device.

31. A method for accessing a video program over an Internet link, the method comprising:
receiving, at a remote access device over the Internet link, a video guide screen generated using control circuitry, wherein:
the control circuitry is coupled to a device that outputs to a first display device, wherein the control circuitry and the device are located at user site;
the remote access device is remote from the control circuitry; and
the remote access device communicates with the control circuitry over the Internet link;
displaying on a second display device of the remote access device the video guide screen that is received from the control circuitry over the Internet link, wherein the second display device is different from the first display device;
receiving a user selection of a channel for viewing with a remote access device based on the video guide screen being displayed on the second display device;
transmitting, from the remote access device, an instruction over the Internet link to the control circuitry to tune to the selected channel in response to the user selection of a channel for viewing;
receiving, at the remote access device from the control circuitry, video corresponding to the selected channel over the Internet link; and
displaying the video corresponding to the selected channel on the second display device of the remote access device.

32. A method for providing a video program to a remote access device over an Internet link, the method comprising:
transmitting, from control circuitry to a remote access device over the Internet link, a video guide screen generated by the control circuitry, wherein:
the control circuitry is coupled to a device that outputs to a first display device, wherein the control circuitry and the device are located at user site;
the remote access device is remote from the control circuitry;
the remote access device outputs to a second display device which is different from the first display device; and
the remote access device communicates with the control circuitry over the Internet link;
receiving, with the control circuitry over the Internet link, a user selection of a channel for viewing from the remote access device based on the video guide screen being displayed on the second display device;
using the control circuitry to tune to the selected channel; and
transmitting, over the Internet link, video corresponding to the selected channel from the control circuitry to the remote access device for display on the second display device.

33. A method for accessing an interactive program guide over an Internet link, the method comprising:
generating, with control circuitry, a first interactive program guide screen of the interactive program guide implemented using the control circuitry, for displaying a plurality of program identifiers, wherein the control circuitry is located at user site;
transmitting, over the Internet link, from the control circuitry to a remote access device the first interactive program guide screen for display on the remote access device, wherein:
the control circuitry is coupled to a first display device screen;
the remote access device outputs to a second display device which is different from the first display device; and
the remote access device communicates with the control circuitry over the Internet link;
receiving, with the control circuitry, a user command corresponding to a selection of a function of the interactive program guide over the Internet link from the remote access device based on the first interactive program guide screen;
in response to receiving the user command with the control circuitry from the remote access device, directing the control circuitry to generate a second interactive program guide screen corresponding to the selected function of the interactive program guide; and
transmitting, over the Internet link, from the control circuitry to the remote access device the second interactive program guide screen for display on the second display device of the remote access device;

in response to receiving a selection of a video program from the second interactive program guide screen, instructing the control circuitry to access the selected video program; and transmitting the accessed video program over the Internet link for display on the second display device.

34. A method for accessing an interactive program guide over an Internet link, comprising:

receiving, with a remote access device over the Internet link, a first interactive program guide screen of the interactive program guide implemented using control circuitry, wherein:

the first interactive program guide screen is generated using the control circuitry the control circuitry is coupled to a first display device, wherein the control circuitry is located at user site;

the remote access device communicates with the control circuitry over the Internet link; and the remote access device outputs to a second display device which is different from the first display device;

displaying, on the remote access device, the first interactive program guide screen received from the control circuitry over the Internet link;

receiving a user command over the Internet link corresponding to a selection of a function of the interactive program guide with the remote access device based on the first interactive program guide screen that is received from the control circuitry over the Internet link;

transmitting, from the remote access device, an instruction over the Internet link to the control circuitry to cause the control circuitry to generate a second interactive program guide screen of the interactive program guide corresponding to the selected function of the interactive program guide;

receiving, over the Internet link, the second interactive program guide screen with the remote access device from the control circuitry; and displaying, on the second display device of the remote access device, the second interactive program guide screen that is received from the control circuitry over the Internet link;

in response to receiving a selection of a video program from the second interactive program guide screen, instructing the control circuitry to access the selected video program; and transmitting the accessed video program over the Internet link for display on the second display device.

35. A method for providing an interactive program guide to a remote access device over an Internet link, the method comprising:

transmitting, from control circuitry over the Internet link to the remote access device, a first interactive program guide screen of the interactive program guide implemented using the control circuitry, wherein the first interactive program guide screen is generated using the control circuitry, the control circuitry is located at user site, and wherein the remote access device communicates with the control circuitry over the Internet link;

receiving, with the control circuitry from the remote access device over the Internet link, a user command corresponding to a selection of a function of the interactive program guide based on the first interactive program guide screen, wherein the control circuitry is coupled to a first display device and the remote access device outputs to a second display device which is different from the first display device; and in response to receiving the user command with the control circuitry, generating a second interactive program guide screen corresponding to the selected function of the interactive program guide; and transmitting, from the control circuitry over the Internet link to the remote access device, the second interactive program guide screen for display on the second display device of the remote access device;

in response to receiving a selection of a video program from the second interactive program guide screen, instructing the control circuitry to access the selected video program; and transmitting the accessed video program over the Internet link for display on the second display device.

* * * * *

UNITED STATES PATENT AND TRADEMARK OFFICE
CERTIFICATE OF CORRECTION

| | | |
|---|---|---|
| PATENT NO. | : 7,913,278 B2 | Page 1 of 1 |
| APPLICATION NO. | : 11/820587 | |
| DATED | : March 22, 2011 | |
| INVENTOR(S) | : Michael D. Ellis et al. | |

It is certified that error appears in the above-identified patent and that said Letters Patent is hereby corrected as shown below:

Claim 12, column 29, line 63, after "controlling" delete "the".

Claim 33, column 32, line 50, change "device" to --device;--.

Claim 33, column 32, line 51, delete "screen;".

Signed and Sealed this
Twenty-seventh Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,913,278 B2 | Page 1 of 1 |
| APPLICATION NO. | : 11/820587 | |
| DATED | : March 22, 2011 | |
| INVENTOR(S) | : Michael D. Ellis et al. | |

It is certified that error appears in the above-identified patent and that said Letters Patent is hereby corrected as shown below:

Claim 10, column 29, line 46, change "with a" to --with the--.

Signed and Sealed this
Twenty-fourth Day of July, 2012

David J. Kappos
*Director of the United States Patent and Trademark Office*